US012754753B2

(12) United States Patent
Biswas et al.

(10) Patent No.: US 12,754,753 B2
(45) Date of Patent: Oct. 6, 2026

(54) TRANSLATION OF API REQUESTS FOR CONNECTION BETWEEN NETWORK MANAGEMENT SYSTEM AND MANAGED DATACENTERS

(71) Applicant: VMware LLC, Palo Alto, CA (US)

(72) Inventors: Sudipta Biswas, Bangalore (IN); Rajiv Mordani, Fremont, CA (US); Aditya Prakash Vaja, San Francisco, CA (US); Monotosh Das, Bangalore (IN)

(73) Assignee: VMware LLC, Palo Alto, CA (US)

( * ) Notice: Subject to any disclaimer, the term of this patent is extended or adjusted under 35 U.S.C. 154(b) by 539 days.

(21) Appl. No.: 18/195,834

(22) Filed: May 10, 2023

(65) Prior Publication Data

US 2024/0152376 A1 May 9, 2024

(30) Foreign Application Priority Data

Nov. 6, 2022 (IN) ............................. 202241063337
Jan. 25, 2023 (IN) ............................. 202341005137
Jan. 25, 2023 (IN) ............................. 202341005151

(51) Int. Cl.
*G06F 9/455* (2018.01)
*H04L 41/0893* (2022.01)
(Continued)

(52) U.S. Cl.
CPC ...... *G06F 9/45558* (2013.01); *H04L 41/0893* (2013.01); *H04L 67/10* (2013.01);
(Continued)

(58) Field of Classification Search
CPC .. G02B 6/2938; G02B 6/4248; G02B 6/4251; G02B 6/4422; G02B 6/44265;
(Continued)

(56) References Cited

U.S. PATENT DOCUMENTS 5,842,043 A 11/1998 Nishimura
6,219,699 B1 4/2001 McCloghrie et al.
(Continued)

FOREIGN PATENT DOCUMENTS

CA 3119423 A1 3/2018
CN 102124456 A 7/2011
(Continued)

OTHER PUBLICATIONS

PCT International Search Report and Written Opinion, PCT/US2023/032963, Dec. 1, 2023, 12 pages.
(Continued)

*Primary Examiner* — Wei Y Mui
(74) *Attorney, Agent, or Firm* — Kim & Stewart LLP

(57) ABSTRACT

Some embodiments provide a method for a connection server that handles a connection between a network management system in a public cloud and a datacenter belonging to a datacenter group managed by the network management system. The method receives an API request, having a first format, for a local network manager located at the datacenter. The method translates the API request into a second format used by the connection between the network management system and the datacenter. The connection is a type that (i) allows for the connection server to push data onto the connection when the connection is initiated by a connection agent at the datacenter and (ii) uses the second format. The method sends the translated API request in the second format to the connection agent via the connection. The connection agent translates the API request into the first format for execution at the local network manager.

21 Claims, 40 Drawing Sheets

(51) Int. Cl.
*H04L 67/10* (2022.01)
*G06F 9/54* (2006.01)

(52) U.S. Cl.
CPC ................ *G06F 2009/4557* (2013.01); *G06F 2009/45595* (2013.01); *G06F 9/541* (2013.01)

(58) Field of Classification Search
CPC ............ G02B 6/44465; G02B 6/44528; G02B 6/3897; G02B 6/443; G02B 6/4446; H04B 10/25754; H04J 14/0282; H04J 14/03; H04L 45/62; H04L 41/0893; H04L 41/0894; H04L 41/0895; H04L 67/10; H04L 67/55; H04Q 11/0067; H04Q 2011/0069; G06F 2009/4557; G06F 2009/45595; G06F 9/45558; G06F 9/541
See application file for complete search history.

(56) References Cited

U.S. PATENT DOCUMENTS 6,347,374 B1 2/2002 Drake et al.
6,615,230 B2 9/2003 Nishimura
7,079,544 B2 7/2006 Wakayama et al.
7,260,716 B1 8/2007 Srivastava
7,502,884 B1 3/2009 Shah et al.
7,539,745 B1 5/2009 Wang et al.
7,802,000 B1 9/2010 Huang et al.
7,965,699 B1 6/2011 Accardi et al.
8,054,832 B1 11/2011 Shukla et al.
8,149,734 B2 4/2012 Lu
8,479,275 B1 7/2013 Naseh
8,611,351 B2 12/2013 Gooch et al.
8,625,616 B2 1/2014 Vobbilisetty et al.
8,660,129 B1 2/2014 Brendel et al.
8,707,417 B1 4/2014 Liang et al.
9,069,599 B2 6/2015 Martinez et al.
9,215,213 B2 12/2015 Bansal et al.
9,294,270 B2 3/2016 Wainner et al.
9,311,122 B2 4/2016 Guay et al.
9,330,161 B2 5/2016 D'Amato et al.
9,432,215 B2 8/2016 Stabile et al.
9,571,304 B2 2/2017 Koponen et al.
9,602,312 B2 3/2017 Koponen et al.
9,672,054 B1 6/2017 Gupta et al.
9,672,060 B2 6/2017 Behere et al.
9,825,851 B2 11/2017 Agarwal et al.
9,847,938 B2 12/2017 Chanda et al.
9,876,711 B2 1/2018 Chu et al.
9,906,560 B2 2/2018 Jain et al.
9,912,616 B2 3/2018 Shen et al.
9,923,811 B2 3/2018 Agarwal et al.
9,977,688 B2 5/2018 Nipane et al.
10,091,028 B2 10/2018 Koponen et al.
10,110,417 B1 10/2018 Hankins et al.
10,120,668 B2 11/2018 Palavalli et al.
10,129,142 B2 11/2018 Goliya et al.
10,135,675 B2 11/2018 Yu et al.
10,142,127 B2 11/2018 Cherian et al.
10,162,656 B2 12/2018 Palavalli et al.
10,187,302 B2 1/2019 Chu et al.
10,193,708 B2 1/2019 Koponen et al.
10,205,771 B2 2/2019 Palavalli et al.
10,241,820 B2 3/2019 Lambeth et al.
10,243,797 B2 3/2019 Lambeth et al.
10,243,834 B1 3/2019 Shekhar et al.
10,243,846 B2 3/2019 Jiang et al.
10,243,848 B2 3/2019 Agarwal et al.
10,257,049 B2 4/2019 Fried et al.
10,298,489 B2 5/2019 Williams et al.
10,326,639 B2 6/2019 Stabile et al.
10,333,959 B2 6/2019 Katrekar et al.
10,339,123 B2 7/2019 Venkatesh et al.
10,412,018 B1 9/2019 Feng et al.
10,560,343 B1 2/2020 Cartsonis et al.
10,579,945 B2 3/2020 Gaurav et al.
10,587,479 B2 3/2020 Shakimov et al.
10,601,637 B2 3/2020 Stabile et al.
10,601,705 B2 3/2020 Hira et al.
10,616,279 B2 4/2020 Nimmagadda et al.
10,637,800 B2 4/2020 Wang et al.
10,673,752 B2 6/2020 Agarwal et al.
10,693,833 B2 6/2020 Mathew et al.
10,832,224 B2 11/2020 Palavalli et al.
10,862,753 B2 12/2020 Hira et al.
10,880,158 B2 12/2020 Lambeth et al.
10,880,170 B2 12/2020 Wang et al.
10,897,420 B1 1/2021 Pianigiani et al.
10,908,938 B2 2/2021 Palavalli et al.
10,942,788 B2 3/2021 Palavalli et al.
10,999,154 B1 5/2021 Ahrenholz et al.
11,057,275 B1 7/2021 Arunachalam et al.
11,088,902 B1 8/2021 Palavalli et al.
11,088,916 B1 8/2021 Chandrashekhar et al.
11,088,919 B1 8/2021 Chandrashekhar et al.
11,115,301 B1 9/2021 Margarian et al.
11,133,958 B2 9/2021 Torvi et al.
11,153,170 B1 10/2021 Chandrashekhar et al.
11,182,163 B1 11/2021 Beals et al.
11,258,668 B2 2/2022 Chandrashekhar et al.
11,303,557 B2 4/2022 Chandrashekhar et al.
11,316,773 B2 4/2022 Dubey et al.
11,336,486 B2 5/2022 Sharma et al.
11,336,556 B2 5/2022 Chandrashekhar et al.
11,343,227 B2 5/2022 Vaidya et al.
11,343,283 B2 5/2022 Vaidya et al.
11,374,817 B2 6/2022 Chandrashekhar et al.
11,374,850 B2 6/2022 Chandrashekhar et al.
11,381,456 B2 7/2022 Manzanilla et al.
11,394,634 B2 7/2022 Chandrashekhar et al.
11,438,238 B2 9/2022 Chandrashekhar et al.
11,496,392 B2 11/2022 Agarwal et al.
11,509,522 B2 11/2022 Palavalli et al.
11,528,214 B2 12/2022 Chandrashekar et al.
11,601,474 B2 3/2023 Vaidya et al.
11,683,233 B2 6/2023 Rogozinsky et al.
11,736,383 B2 8/2023 Chandrashekhar et al.
12,143,268 B2 11/2024 Garty
2002/0029270 A1 3/2002 Szczepanek
2002/0093952 A1 7/2002 Gonda
2002/0131414 A1 9/2002 Hadzic
2003/0046347 A1 3/2003 Nishimura
2003/0167333 A1 9/2003 Kumar et al.
2003/0185151 A1 10/2003 Kurosawa et al.
2003/0185152 A1 10/2003 Nederveen et al.
2003/0188114 A1 10/2003 Lubbers et al.
2003/0188218 A1 10/2003 Lubbers et al.
2004/0042454 A1 3/2004 Zabihi et al.
2004/0052257 A1 3/2004 Abdo et al.
2005/0083953 A1 4/2005 May
2005/0190757 A1 9/2005 Sajassi
2005/0235352 A1 10/2005 Staats et al.
2005/0288040 A1 12/2005 Charpentier et al.
2006/0002370 A1 1/2006 Rabie et al.
2006/0069594 A1 3/2006 Yamasaki
2006/0092976 A1 5/2006 Lakshman et al.
2006/0179243 A1 8/2006 Fields et al.
2006/0179245 A1 8/2006 Fields et al.
2006/0193252 A1 8/2006 Naseh et al.
2006/0193300 A1 8/2006 Rawat et al.
2006/0195896 A1 8/2006 Fulp et al.
2006/0221720 A1 10/2006 Reuter
2006/0251120 A1 11/2006 Arimilli et al.
2006/0287842 A1 12/2006 Kim
2006/0291447 A1 12/2006 Siliquini et al.
2007/0058631 A1 3/2007 Mortier et al.
2007/0130295 A1 6/2007 Rastogi et al.
2007/0217419 A1 9/2007 Vasseur
2007/0219653 A1 9/2007 Martin
2007/0239987 A1 10/2007 Hoole et al.
2008/0013474 A1 1/2008 Nagarajan et al.
2008/0049646 A1 2/2008 Lu
2008/0104302 A1 5/2008 Carpio
2008/0133729 A1 6/2008 Fridman et al.

(56) References Cited

U.S. PATENT DOCUMENTS

2008/0151863 A1 6/2008 Lawrence et al.
2008/0225853 A1 9/2008 Melman et al.
2008/0268847 A1 10/2008 Mukherjee et al.
2008/0301379 A1 12/2008 Pong
2009/0037367 A1 2/2009 Wein
2009/0070337 A1 3/2009 Romem et al.
2009/0193297 A1 7/2009 Williams et al.
2009/0241192 A1 9/2009 Thomas
2009/0279536 A1 11/2009 Unbehagen et al.
2009/0279545 A1 11/2009 Moonen
2009/0292858 A1 11/2009 Lambeth et al.
2009/0296726 A1 12/2009 Snively et al.
2010/0153701 A1 6/2010 Shenoy et al.
2010/0232435 A1 9/2010 Jabr et al.
2010/0250744 A1 9/2010 Hadad et al.
2010/0250784 A1 9/2010 Henry et al.
2010/0257263 A1 10/2010 Casado et al.
2010/0275199 A1 10/2010 Smith et al.
2010/0322255 A1 12/2010 Hao et al.
2011/0032898 A1 2/2011 Kazmi et al.
2011/0047218 A1 2/2011 Nojima et al.
2011/0051714 A1 3/2011 Somes
2011/0085559 A1 4/2011 Chung et al.
2011/0085569 A1 4/2011 Gnanasekaran et al.
2011/0090905 A1 4/2011 Mueller et al.
2011/0103260 A1 5/2011 Jeyatharan et al.
2011/0164752 A1 7/2011 Wainner et al.
2011/0188509 A1 8/2011 Kern et al.
2011/0231602 A1 9/2011 Woods et al.
2011/0299413 A1 12/2011 Chatwani et al.
2012/0014386 A1 1/2012 Xiong et al.
2012/0084406 A1 4/2012 Kumbalimutt
2012/0093035 A1 4/2012 Kidambi et al.
2012/0120964 A1 5/2012 Koponen et al.
2012/0147898 A1 6/2012 Koponen et al.
2012/0163388 A1 6/2012 Goel et al.
2012/0226799 A1 9/2012 Kapur et al.
2012/0236734 A1 9/2012 Sampath et al.
2012/0257634 A1 10/2012 Martillo et al.
2012/0275328 A1 11/2012 Iwata et al.
2013/0018947 A1 1/2013 Archer et al.
2013/0024579 A1 1/2013 Zhang et al.
2013/0042242 A1 2/2013 Kagan
2013/0044636 A1 2/2013 Koponen et al.
2013/0044641 A1 2/2013 Koponen et al.
2013/0044752 A1 2/2013 Koponen et al.
2013/0044761 A1 2/2013 Koponen et al.
2013/0058250 A1 3/2013 Casado et al.
2013/0058335 A1 3/2013 Koponen et al.
2013/0058350 A1 3/2013 Fulton
2013/0058354 A1 3/2013 Casado et al.
2013/0058358 A1 3/2013 Fulton et al.
2013/0060819 A1 3/2013 Lambeth et al.
2013/0060940 A1 3/2013 Koponen et al.
2013/0074065 A1 3/2013 McNeeney et al.
2013/0103817 A1 4/2013 Koponen et al.
2013/0125120 A1 5/2013 Zhang et al.
2013/0132533 A1 5/2013 Padmanabhan et al.
2013/0144992 A1 6/2013 Barabash et al.
2013/0159637 A1 6/2013 Forgette et al.
2013/0212212 A1 8/2013 Addepalli et al.
2013/0215769 A1 8/2013 Beheshti-Zavareh et al.
2013/0254328 A1 9/2013 Inoue et al.
2013/0286833 A1 10/2013 Torres et al.
2013/0287026 A1 10/2013 Davie
2013/0301425 A1 11/2013 Udutha et al.
2013/0301501 A1 11/2013 Olvera-Hernandez et al.
2013/0301646 A1 11/2013 Bogdanski et al.
2013/0308641 A1 11/2013 Ackley
2014/0006354 A1 1/2014 Parkison et al.
2014/0006357 A1 1/2014 Davis et al.
2014/0006465 A1 1/2014 Davis et al.
2014/0007239 A1 1/2014 Sharpe et al.
2014/0064104 A1 3/2014 Nataraja et al.
2014/0075002 A1 3/2014 Pradhan et al.
2014/0136908 A1 5/2014 Maggiari et al.
2014/0146817 A1 5/2014 Zhang
2014/0169365 A1 6/2014 Sundaram et al.
2014/0172740 A1 6/2014 McCormick et al.
2014/0201218 A1 7/2014 Catalano et al.
2014/0208150 A1 7/2014 Abuelsaad et al.
2014/0211661 A1 7/2014 Gorkemli et al.
2014/0241356 A1 8/2014 Zhang et al.
2014/0250220 A1 9/2014 Kapadia et al.
2014/0269435 A1 9/2014 McConnell et al.
2014/0301391 A1 10/2014 Krishnan et al.
2014/0304355 A1 10/2014 Kamath et al.
2014/0307744 A1 10/2014 Dunbar et al.
2014/0334495 A1 * 11/2014 Stubberfield ......... H04L 49/354 370/401
2014/0337500 A1 11/2014 Lee
2014/0351396 A1 11/2014 Stabile et al.
2015/0009797 A1 1/2015 Koponen et al.
2015/0010012 A1 1/2015 Koponen et al.
2015/0016276 A1 1/2015 Decusatis et al.
2015/0063364 A1 3/2015 Thakkar et al.
2015/0085862 A1 3/2015 Song
2015/0100704 A1 4/2015 Davie et al.
2015/0103842 A1 4/2015 Chandrashekhar et al.
2015/0103843 A1 4/2015 Chandrashekhar et al.
2015/0106804 A1 4/2015 Chandrashekhar et al.
2015/0117256 A1 4/2015 Sabaa et al.
2015/0154330 A1 6/2015 Yachide et al.
2015/0229641 A1 8/2015 Sun et al.
2015/0234668 A1 8/2015 Ravinoothala et al.
2015/0237014 A1 8/2015 Bansal et al.
2015/0263946 A1 9/2015 Tubaltsev et al.
2015/0264135 A1 9/2015 Kandula et al.
2015/0312274 A1 10/2015 Bishop et al.
2015/0312326 A1 10/2015 Archer et al.
2015/0326467 A1 11/2015 Fullbright et al.
2015/0381494 A1 12/2015 Cherian et al.
2016/0057014 A1 2/2016 Thakkar et al.
2016/0094396 A1 3/2016 Chandrashekhar et al.
2016/0094661 A1 3/2016 Jain et al.
2016/0134528 A1 5/2016 Lin et al.
2016/0210209 A1 7/2016 Verkaik et al.
2016/0226700 A1 8/2016 Zhang et al.
2016/0226762 A1 8/2016 Zhang et al.
2016/0226822 A1 8/2016 Zhang et al.
2016/0226959 A1 8/2016 Zhang et al.
2016/0226967 A1 8/2016 Zhang et al.
2016/0277289 A1 9/2016 Madabushi et al.
2016/0352588 A1 12/2016 Subbarayan et al.
2016/0373530 A1 12/2016 Duda
2016/0380815 A1 12/2016 Agarwal et al.
2016/0380891 A1 12/2016 Agarwal et al.
2016/0380925 A1 12/2016 Agarwal et al.
2016/0380973 A1 12/2016 Sullenberger et al.
2017/0005988 A1 1/2017 Bansal et al.
2017/0034052 A1 2/2017 Chanda et al.
2017/0034129 A1 2/2017 Sawant et al.
2017/0041347 A1 2/2017 Nagaratnam et al.
2017/0048110 A1 2/2017 Wu et al.
2017/0048130 A1 2/2017 Goliya et al.
2017/0063633 A1 3/2017 Goliya et al.
2017/0063794 A1 3/2017 Jain et al.
2017/0063822 A1 3/2017 Jain et al.
2017/0093617 A1 3/2017 Chanda et al.
2017/0093636 A1 3/2017 Chanda et al.
2017/0104720 A1 4/2017 Bansal et al.
2017/0126431 A1 5/2017 Han et al.
2017/0126551 A1 5/2017 Pfaff et al.
2017/0163442 A1 6/2017 Shen et al.
2017/0163532 A1 6/2017 Tubaltsev et al.
2017/0163598 A1 6/2017 Shen et al.
2017/0163599 A1 6/2017 Shen et al.
2017/0171055 A1 6/2017 Wang et al.
2017/0249195 A1 8/2017 Sadana et al.
2017/0250912 A1 8/2017 Chu et al.
2017/0264483 A1 9/2017 Lambeth et al.
2017/0288981 A1 10/2017 Hong et al.
2017/0289033 A1 10/2017 Singh et al.
2017/0302531 A1 10/2017 Maes

(56) References Cited

U.S. PATENT DOCUMENTS

| | | | |
|---|---|---|---|
| 2017/0310641 | A1 | 10/2017 | Jiang et al. |
| 2017/0317954 | A1 | 11/2017 | Masurekar et al. |
| 2017/0317969 | A1 | 11/2017 | Masurekar et al. |
| 2017/0317971 | A1 | 11/2017 | Dubey et al. |
| 2017/0318113 | A1 | 11/2017 | Ganichev et al. |
| 2017/0324645 | A1 | 11/2017 | Johnsen et al. |
| 2017/0331711 | A1 | 11/2017 | Duda |
| 2017/0344444 | A1 | 11/2017 | Costa-Roberts et al. |
| 2018/0062880 | A1 | 3/2018 | Yu et al. |
| 2018/0062881 | A1 | 3/2018 | Chandrashekhar et al. |
| 2018/0062923 | A1 | 3/2018 | Katrekar et al. |
| 2018/0062944 | A1 | 3/2018 | Altman et al. |
| 2018/0063036 | A1 | 3/2018 | Chandrashekhar et al. |
| 2018/0063195 | A1 | 3/2018 | Nimmagadda et al. |
| 2018/0083835 | A1 | 3/2018 | Cole et al. |
| 2018/0123877 | A1 | 5/2018 | Saxena et al. |
| 2018/0123903 | A1 | 5/2018 | Holla et al. |
| 2018/0157537 | A1 | 6/2018 | Chen et al. |
| 2018/0191682 | A1 | 7/2018 | Liu et al. |
| 2018/0234337 | A1 | 8/2018 | Goliya et al. |
| 2018/0234459 | A1 | 8/2018 | Kung et al. |
| 2018/0309718 | A1 | 10/2018 | Zuo |
| 2018/0373961 | A1 | 12/2018 | Wang et al. |
| 2019/0014040 | A1 | 1/2019 | Yerrapureddy et al. |
| 2019/0069335 | A1 | 2/2019 | Wu |
| 2019/0109669 | A1 | 4/2019 | Zachman et al. |
| 2019/0158537 | A1 | 5/2019 | Miriyala |
| 2019/0190780 | A1 | 6/2019 | Wang et al. |
| 2019/0207847 | A1 | 7/2019 | Agarwal et al. |
| 2019/0245888 | A1 | 8/2019 | Martinez et al. |
| 2019/0260610 | A1 | 8/2019 | Dubey et al. |
| 2019/0260630 | A1 | 8/2019 | Stabile et al. |
| 2019/0297114 | A1 | 9/2019 | Panchalingam et al. |
| 2019/0303326 | A1 | 10/2019 | Desai et al. |
| 2019/0334765 | A1 | 10/2019 | Jain et al. |
| 2019/0342175 | A1 | 11/2019 | Wan et al. |
| 2019/0363975 | A1 | 11/2019 | Djernaes |
| 2019/0379731 | A1 | 12/2019 | Johnsen et al. |
| 2020/0007392 | A1 | 1/2020 | Goyal |
| 2020/0007582 | A1 | 1/2020 | Dixit et al. |
| 2020/0007584 | A1 | 1/2020 | Dixit et al. |
| 2020/0014662 | A1 | 1/2020 | Chanda et al. |
| 2020/0021541 | A1 | 1/2020 | Chanda |
| 2020/0034220 | A1* | 1/2020 | Shekhar .................. H04L 67/02 |
| 2020/0057669 | A1 | 2/2020 | Hutcheson et al. |
| 2020/0076684 | A1 | 3/2020 | Naveen et al. |
| 2020/0106744 | A1 | 4/2020 | Miriyala et al. |
| 2020/0162325 | A1 | 5/2020 | Desai et al. |
| 2020/0162337 | A1 | 5/2020 | Jain et al. |
| 2020/0169496 | A1 | 5/2020 | Goliya et al. |
| 2020/0195607 | A1 | 6/2020 | Wang et al. |
| 2020/0257549 | A1 | 8/2020 | Vlaznev et al. |
| 2020/0296035 | A1 | 9/2020 | Agarwal et al. |
| 2020/0304427 | A1 | 9/2020 | Sandler et al. |
| 2020/0358693 | A1 | 11/2020 | Rawlins |
| 2020/0366741 | A1 | 11/2020 | Kancherla et al. |
| 2020/0409563 | A1 | 12/2020 | Parasnis et al. |
| 2021/0036889 | A1 | 2/2021 | Jain et al. |
| 2021/0067556 | A1 | 3/2021 | Tahan |
| 2021/0117249 | A1 | 4/2021 | Doshi et al. |
| 2021/0117251 | A1* | 4/2021 | Cristofi ................. G06F 21/554 |
| 2021/0117908 | A1 | 4/2021 | Coles et al. |
| 2021/0126641 | A1 | 4/2021 | Yan et al. |
| 2021/0168197 | A1 | 6/2021 | Jones et al. |
| 2021/0194729 | A1 | 6/2021 | Semwal et al. |
| 2021/0311960 | A1 | 10/2021 | Rogozinsky et al. |
| 2021/0314192 | A1 | 10/2021 | Chandrashekhar et al. |
| 2021/0314193 | A1 | 10/2021 | Chandrashekhar et al. |
| 2021/0314212 | A1 | 10/2021 | Chandrashekhar et al. |
| 2021/0314215 | A1 | 10/2021 | Manzanilla et al. |
| 2021/0314219 | A1 | 10/2021 | Gujar et al. |
| 2021/0314225 | A1 | 10/2021 | Chandrashekhar et al. |
| 2021/0314226 | A1 | 10/2021 | Chandrashekhar et al. |
| 2021/0314227 | A1 | 10/2021 | Chandrashekhar et al. |
| 2021/0314228 | A1 | 10/2021 | Chandrashekhar et al. |
| 2021/0314235 | A1 | 10/2021 | Chandrashekhar et al. |
| 2021/0314251 | A1 | 10/2021 | Dubey et al. |
| 2021/0314256 | A1 | 10/2021 | Chandrashekhar et al. |
| 2021/0314257 | A1 | 10/2021 | Chandrashekhar et al. |
| 2021/0314258 | A1 | 10/2021 | Chandrashekhar et al. |
| 2021/0314289 | A1 | 10/2021 | Chandrashekhar et al. |
| 2021/0314291 | A1 | 10/2021 | Chandrashekhar et al. |
| 2021/0350008 | A1 | 11/2021 | Sofia et al. |
| 2021/0367834 | A1 | 11/2021 | Palavalli et al. |
| 2022/0103429 | A1 | 3/2022 | Vaidya et al. |
| 2022/0103430 | A1 | 3/2022 | Vaidya et al. |
| 2022/0103514 | A1 | 3/2022 | Vaidya et al. |
| 2022/0103521 | A1 | 3/2022 | Vaidya et al. |
| 2022/0103598 | A1 | 3/2022 | Vaidya et al. |
| 2022/0191126 | A1 | 6/2022 | Dubey et al. |
| 2022/0210487 | A1 | 6/2022 | Hassler |
| 2022/0255896 | A1 | 8/2022 | Jain et al. |
| 2022/0279420 | A1 | 9/2022 | Akkipeddi et al. |
| 2022/0311707 | A1 | 9/2022 | Patel et al. |

FOREIGN PATENT DOCUMENTS

| | | | |
|---|---|---|---|
| CN | 102986172 | A | 3/2013 |
| CN | 103650433 | A | 3/2014 |
| CN | 103890751 | A | 6/2014 |
| CN | 110061899 | A | 7/2019 |
| EP | 1154601 | A1 | 11/2001 |
| EP | 1290856 | A2 | 3/2003 |
| EP | 1635506 | A1 | 3/2006 |
| EP | 1868318 | A1 | 12/2007 |
| EP | 3016331 | A1 | 5/2016 |
| EP | 3485610 | A1 | 5/2019 |
| WO | 2010028364 | A1 | 3/2010 |
| WO | 2011140028 | A1 | 11/2011 |
| WO | 2012113444 | A1 | 8/2012 |
| WO | 2013026049 | A1 | 2/2013 |
| WO | 2013152716 | A1 | 10/2013 |
| WO | 2015054671 | A2 | 4/2015 |
| WO | 2017003881 | A1 | 1/2017 |
| WO | 2018044341 | A1 | 3/2018 |
| WO | 2021206785 | A1 | 10/2021 |
| WO | 2021206786 | A1 | 10/2021 |
| WO | 2021206790 | A1 | 10/2021 |
| WO | 2022066269 | A1 | 3/2022 |

OTHER PUBLICATIONS

European Patent Office, Extended Search Report, Application No. 24153721.6, May 22, 2024, 8 pages.

Author Unknown, "What is a Data Center?," Cyberpedia, Month Unknown 2022, 5 pages, Palo Alto Networks, retrieved from https://www.paloaltonetworks.com/cyberpedia/what-is-a-data-center.

Author Unknown, "Apache Cassandra™ 1.2 Documentation," Jan. 13, 2013, 201 pages, DataStax.

Author Unknown, "OpenFlow Switch Specification, Version 1.1.0 Implemented (Wire Protocol 0x02)," Feb. 28, 2011, 56 pages, Open Networking Foundation.

Berde, Pankaj, et al., "ONOS Open Network Operating System an Open-Source Distributed SDN OS," Dec. 19, 2013, 34 pages.

Das, Saurav, et al., "Simple Unified Control for Packet and Circuit Networks," Month Unknown 2009, 2 pages, IEEE.

Das, Saurav, et al., "Unifying Packet and Circuit Switched Networks with OpenFlow," Dec. 7, 2009, 10 pages, available at http://OpenFlowSwitch.org/downloads/technicalreports/openflow-tr-2009-4-unification.pdf.

Giannakou, Anna, et al., "AI-Safe: A Secure Self-Adaptable Application-Level Firewall for IaaS Clouds," 2016 IEEE 8th International Conference on Cloud Computing Technology and Science, Dec. 12-15, 2016, 8 pages, IEEE, Luxembourg City, LU.

Guo, Yingya, et al., "Traffic Engineering in SDN/OSPF Hybrid Network," The 22nd IEEE International Conference on Network Protocols (ICNP 2014), Oct. 21-24, 2014, 6 pages, IEEE, the Research Triangle, North Carolina, USA.

Hanna, Jeremy, "How ZooKeeper Handles Failure Scenarios," http://.apache.org/hadoop/Zookeeper/FailureScenarios. Dec. 9, 2010, 1 page.

(56) References Cited

OTHER PUBLICATIONS

Heller, Brandon, et al., "The Controller Placement Problem," Hot Topics in Software Defined Networks, Aug. 13, 2012, 6 pages, Helsinki, Finland.
Jin, Xin, et al., "Dynamic Scheduling of Network Updates," SIGCOMM'14, Aug. 17-22, 2014, 12 pages, ACM, Chicago, IL, USA.
Kohila, N., et al., "Data Security in Local Network Using Distributed Firewall," International Journal of Scientific Research in Computer Science Applications and Management Studies, Nov. 2014, 8 pages, vol. 3, Issue 6, ijsrcams.com.
Krishnaswamy, Umesh, et al., "ONOS Open Network Operating System—An Experimental Open-Source Distributed SDN OS," Apr. 16, 2013, 24 pages.
Lebresne, Sylvain, "[Release] Apache Cassandra 1.2 released," Jan. 2, 2013, 1 page.
Loshin, Peter, et al., "What is a data center?," Special Report: Everything You Need to Know About the Log4j Vulnerability, Oct. 2021, 13 pages, retrieved from https://searchdatacenter.techtarget.com/definition/data-center.
Mahalingham, Mallik, et al., "VXLAN: A Framework for Overlaying Virtualized Layer 2 Networks over Layer 3 Networks," draft-mahalingham-dutt-dcops-vxlan-00.txt Internet Draft, Aug. 26, 2011, 20 pages, Internet Engineering Task Force.
Mahalingham, Mallik, et al., "VXLAN: A Framework for Overlaying Virtualized Layer 2 Networks over Layer 3 Networks," draft-mahalingham-dutt-dcops-vxlan-02.txt Internet Draft, Aug. 22, 2012, 20 pages, Internet Engineering Task Force.
Mckeown, Nick, et al., "OpenFlow: Enabling Innovation in Campus Networks," ACM SIGCOMM Computer Communication Review, Apr. 2008, 6 pages, vol. 38, No. 2, ACM.
Non-Published Commonly Owned U.S. Appl. No. 17/869,637, filed Jul. 20, 2022, 38 pages, VMware, Inc.
Non-Published Commonly Owned U.S. Appl. No. 17/869,640, filed Jul. 20, 2022, 37 pages, VMware, Inc.
Non-Published Commonly Owned U.S. Appl. No. 18/118,685, filed Mar. 7, 2023, 43 pages, VMware, Inc.
Non-Published Commonly Owned U.S. Appl. No. 18/118,687, filed Mar. 7, 2023, 43 pages, VMware, Inc.
Non-Published Commonly Owned U.S. Appl. No. 18/195,825, filed May 10, 2023, 115 pages, VMware, Inc.
Non-Published Commonly Owned U.S. Appl. No. 18/195,826, filed May 10, 2023, 114 pages, VMware, Inc.
Non-Published Commonly Owned U.S. Appl. No. 18/195,827, filed May 10, 2023, 114 pages, VMware, Inc.
Non-Published Commonly Owned Related U.S. Appl. No. 18/195,829 with similar specification, filed May 10, 2023, 114 pages, VMware, Inc.
Non-Published Commonly Owned U.S. Appl. No. 18/195,835, filed May 10, 2023, 114 pages, VMware, Inc.
Non-Published Commonly Owned U.S. Appl. No. 18/195,836, filed May 10, 2023, 114 pages, VMware, Inc.
Non-Published Commonly Owned U.S. Appl. No. 18/195,838, filed May 10, 2023, 113 pages, VMware, Inc.
Non-Published Commonly Owned U.S. Appl. No. 18/195,839, filed May 10, 2023, 114 pages, VMware, Inc.
Non-Published Commonly Owned U.S. Appl. No. 18/195,841, filed May 10, 2023, 115 pages, VMware, Inc.
Non-Published Commonly Owned U.S. Appl. No. 18/195,850, filed May 10, 2023, 50 pages, VMware, Inc.
Non-Published Commonly Owned U.S. Appl. No. 18/195,851, filed May 10, 2023, 51 pages, VMware, Inc.
Non-Published Commonly Owned U.S. Appl. No. 18/195,854, filed May 10, 2023, 52 pages, VMware, Inc.
Non-Published Commonly Owned U.S. Appl. No. 18/227,655, filed Jul. 28, 2023, 133 pages, VMware, Inc.
Schuba, Christoph, et al., "Integrated Network Service Processing Using Programmable Network Devices," SMLI TR-2005-138, May 2005, 30 pages, Sun Microsystems, Inc.
Sherwood, Rob, et al., "FlowVisor: A Network Virtualization Layer," Oct. 14, 2009, 15 pages, Openflow-TR-2009-1.
Surantha, Nico, et al., "Secure Kubernetes Networking Design Based on Zero Trust Model: A Case Study of Financial Service Enterprise in Indonesia," Innovative Mobile and Internet Services in Ubiquitous Computing, Jan. 2020, 14 pages, Springer Nature, Switzerland.
Wack, John, et al., "Guidelines on Firewalls and Firewall Policy," Recommendations of the National Institute of Standards and Technology, Special Publication 800-41, Jan. 2002, 75 pages, NIST, Gaithersburg, MD, USA.
Non-Final Office Action mailed Jun. 5, 2025 in U.S. Appl. No. 18/195,829, 74 pages.

* cited by examiner

1300

```
apiVersion: routing.networkmgmt.com/v1
kind: cxnserver
metadata:
    name: cxn_server_1
    namespace: connection_servers
spec:
    slots: 5
    occupied: 2
    site_ids:
    - type: exact
      value: site_x
    - type: prefix
      value: customer_1_site
    serviceName: goldserver
status:
    conditions: […]
```

*Figure 13*

1400

```
apiVersion: projectcontour.io/v1
kind: LBconfig
metadata:
    name: example
spec:
    routes: 5
    - conditions:
        - prefix: /v1/api/request
        - header:
            name: x-header
            exact: site_a
        services:
        - name: server-a
          port: 50001
    - conditions:
        - prefix: /v1/api/request
        - header:
            name: x-header
            exact: site_b
        services:
        - name: server-b
          port: 50001
    - conditions:
        - prefix: /v1/api/request
        - header:
            name: x-header
            exact: site_c
        services:
        - name: server-b
          port: 50001
```

*Figure 14*

TRANSLATION OF API REQUESTS FOR CONNECTION BETWEEN NETWORK MANAGEMENT SYSTEM AND MANAGED DATACENTERS

BACKGROUND

Network management services (e.g., policy management, network monitoring, etc.) have mostly been contained to managing networks at a single datacenter, with recent innovations allowing for certain features to be managed at a higher level in order to enable logical networks that span multiple datacenters. Even in this latter case, the network management system typically operates within one of these datacenters owned by the entity. However, more applications are moving to the cloud. Providing a cloud-based network management system presents numerous challenges that must be overcome.

BRIEF SUMMARY

Some embodiments of the invention provide a cloud-based network management and monitoring system capable of managing multiple tenant networks that are each distributed across one or more datacenters. The tenant networks, in some embodiments, can include multiple different types of datacenters. For instance, a given tenant network may include a combination of on-premises and/or branch datacenters (i.e., physical datacenters using the tenant's infrastructure) as well as virtual datacenters that operate in a public cloud (but with network management components incorporated into the virtual datacenter).

In some embodiments, the network management and monitoring system (hereafter referred to as the network management system) deploys one or more service instances in the cloud for each group of datacenters. These group-specific services may include a policy management service, a network flow monitoring service, and a threat monitoring service. In some embodiments, upon defining a group of datacenters for the network management system to manage, a tenant selects which of these services should be deployed for the group of datacenters, and the network management system deploys instances of these services in the cloud. As the network management system manages multiple different datacenter groups, multiple instances of each service are deployed in the public cloud (i.e., one or more service instances for each datacenter group). Different tenants may specify different sets of network management services for their respective datacenter groups. In fact, a single tenant might have multiple datacenter groups and can define separate (and different) sets of network management services (e.g., a tenant might only want threat monitoring for one of the datacenter groups).

The network management system, in some embodiments, is deployed in a container cluster (e.g., a Kubernetes cluster) within the public cloud. In some such embodiments, each of the different network management services is implemented as a group of microservices. Each service includes multiple microservices that perform different functions within the service. For instance a policy management service (that manages logical network policy for a logical network spanning a group of datacenters) could include a database microservice (e.g., a Corfu database service that stores network policy configuration via a log), a channel management microservice (e.g., for managing asynchronous replication channels that push configuration to each of the datacenters managed by the policy management service), an API microservice (for handling API requests from users to modify and/or query for policy), a span calculation microservice (for identifying which atomic policy configuration data should be sent to which datacenters), among other microservices. Each of the different types of services has its own set of microservices that are deployed in the container cluster for each instance of the service.

In addition to the datacenter-group-specific service instance, the network management system of some embodiments also includes (i) local managers at each of the datacenters managed by the network management system and (ii) multi-tenant services within the public cloud (e.g., within the container cluster implementing the network management system). The local managers are not within the public cloud, but rather operate at each of the datacenters and interact with the network management system service instances that manage their datacenter (as described further below). In some embodiments, for example, the network management system (e.g., a policy management service instance) managing a group of datacenters provides logical network configuration data to the local managers in each group, which in turn are responsible for ensuring that the logical network configuration is realized by physical network elements at their respective datacenters.

The multi-tenant services, in some embodiments, are services that are not specific to any datacenter group, but that instead serve all of the tenants and/or all of the datacenter groups of the network management system. Like the per-group service instances, in some embodiments the multi-tenant services each include numerous microservices that perform different aspects of the service. Unlike the service instances, these multi-tenant services are not instantiated separately for each different group of datacenters. These services do not store data specific to the network policy or network operation for an individual user or datacenter group, but rather handle high-level operations to ensure that the network management services can properly interact with the users and datacenters. Examples of these multi-tenant services include registration and subscription services that help with registering datacenters to the network management system and ensuring that the local managers at those datacenters have the correct licenses to interact with the network management system. The multi-tenant services also include front-end management services in some embodiments that enable the definition of datacenter groups as well as the creation and deployment of the network management service instances. In some embodiments, various ingress processing services handle the processing and routing of incoming data traffic (from both tenants via user interfaces and from the local managers at the datacenters) to the correct service instances (or to other multi-tenant services), and connection servers (described in further detail below) handle connections from multiple datacenters belonging to multiple different datacenter groups (of multiple different tenants).

In some embodiments, the different microservices for a given service instance may be placed on various different nodes within the container cluster. In some embodiments, each of the nodes within the cluster is a virtual machine (VM) or physical host server that hosts one or more microservices (e.g., within Pods), as well as various entities that enable the microservices to run on the node and communicate with other microservices and/or external entities. For instance, in the Kubernetes environment, various entities, in some embodiments, include a set of networking resources and network management agents, as well as standard Kubernetes agents such as a kubelet for managing the containers operating in the Pods. Different embodiments assign a single microservice to each Pod or assign multiple microservices (e.g., that are part of the same service instance) to individual Pods.

In some embodiments, neither the tenant nor the network management system services control the scheduling of microservices to the different nodes of the controller cluster. Instead, the tenant specifies which network management services will be used for a given datacenter group, multi-tenant services specify the microservices needed for these services, and cluster control plane components handle the scheduling of the individual microservices to different nodes. In some embodiments, the cluster scheduler component takes into account the relatedness of the microservices (i.e., that they belong to the same namespace, as described below) when assigning the microservices to nodes, but this is not necessarily dispositive as the scheduler also accounts for other factors (e.g., resources required for each microservice and resources available on the different nodes).

Although the microservices of service instances for different datacenter groups (and therefore for different tenants) are deployed in the same container cluster (and in some cases on the same node), these service instances are isolated so that microservices for service instances serving one datacenter group cannot communicate with microservices for service instances serving any other datacenter groups. In some embodiments, separate namespaces are defined for each individual service instance in the container cluster, with all of the microservices belonging to a given service instance assigned to the namespace for that service instance.

In some embodiments, the container cluster enforces this isolation via the generation of firewall rules for enforcement within the cluster. By assigning each service instance to a separate namespace, the container cluster can enforce the communication policies through the use of simple rules (e.g., block all traffic from resources in a first service instance namespace to resources in a second service instance namespace for a different datacenter group, allow traffic from resources in the first service instance namespace to resources in a third service instance namespace that serves the same datacenter group). In addition, the microservice instances within each namespace are typically allowed to communicate with each other.

It should be noted that the container cluster does not necessarily operate entirely in a single public cloud datacenter. In some embodiments, the cluster is distributed across multiple such public cloud datacenters (e.g., different datacenters of a single public cloud provider). In some such embodiments, the microservices of each service instance are replicated across multiple datacenters, or availability zones (e.g., at least one instance of each microservice executes in each of the availability zones spanned by the cluster).

As noted, a single group of datacenters belonging to a particular tenant may include multiple different types of datacenters. For instance, a given tenant network may include a combination of on-premises and/or branch datacenters (i.e., physical datacenters using the tenant's infrastructure) as well as virtual datacenters that operate in a public cloud (but with network management components incorporated into the virtual datacenter). In some embodiments, the tenant network can also span to native virtual private clouds (VPCs) within a public cloud.

As noted above, the multi-tenant services operating in the public cloud include ingress processing services, in some embodiments. These ingress processing services include load balancing services and routing services that ensure that traffic from (i) authenticated users and (ii) datacenters managed by the network management system is directed to the correct service instances. In some embodiments, incoming traffic includes a uniform resource locator (URL) path that uniquely identifies a specific service instance. The URL paths used by authenticated users specify both (i) the tenant and/or datacenter group and (ii) the specific service being accessed. In some embodiments, though formatted differently, the URL paths used by local managers at the datacenters also specify the datacenter group and the specific service being accessed.

In some embodiments, at least a subset of the communication between the network management services in the public cloud and the local managers at the datacenters of the various datacenter groups are handled over persistent connections between the local managers and the network management system. The network management services often need to initiate communication with the local managers (e.g., to push configuration updates to the local managers, to pass requests from tenants for specific local managers that are received via a network management system user interface, to query the local managers, etc.). However, the local managers (and other endpoints in the datacenters) are typically not publicly routable because they are behind firewalls and/or network address translation (NAT). Thus, the network management services cannot directly initiate a connection to send requests to the local managers.

However, the network management system in the cloud is publicly reachable, and thus the local managers can initiate connections to the network management system. In some embodiment, when a datacenter is added to a datacenter group managed by the network management system, the local manager initiates a persistent connection to the network management system (i.e., with the local manager as the "client" of the connection). This persistent connection remains open during the time that the datacenter is managed by the network management system and is of a type that allows the "server" (i.e., the network management system) to push requests to the "client" via the connection.

For instance, some embodiments setup a persistent gRPC Remote Procedure Call (gRPC) connection (e.g., a gRPC channel on an HTTP/2 connection over TCP) from each local manager to the network management system (specifically to a connection server within the public cloud that is used to terminate this connection and provide additional functionality, described below). Such a connection can be initiated with the local manager as the client but allows for various services (e.g., a user interface service, the policy management service, etc.) as the server to push requests onto the connection so that these requests are able to reach the local manager.

As mentioned, in some embodiments the local manager initiates this connection to a connection server that is part of the network management system within the public cloud (e.g., within the container cluster). In some embodiments, the network management system deploys multiple connection servers to handle the potentially large volume of connections needed between datacenters and the network management system. In some embodiments, each connection server handles connections for multiple datacenters, potentially belonging to multiple different datacenter groups (e.g., for multiple different tenants).

In some embodiments, when a new datacenter is to be added to a datacenter group (or when the datacenter is one of the initial datacenters defined for a datacenter group), the network management system (e.g., a multi-tenant service of the network management system) transfers an install agent to the datacenter, which enables the installation of a connection agent on the local manager at the datacenter. In some embodiments, the connection agent is an entity that resides on the local manager at the datacenter to initiate and manage the persistent connection with the connection server at the network management system. The configuration for the connection agent includes a connection server network address (in some embodiments, all of the connection servers use the same IP address) as well as a unique datacenter identifier assigned to that datacenter by the network management system.

The connection agent is configured to, upon installation, attempt to connect to the connection server (e.g., to the network address at which the connection server is reachable) in order to register a stream for the connection. In some embodiments, the agent sends stream initiation messages until it receives a return message from the connection server. However, the load balancer will not route the initiation messages to any of the connection servers until a connection server has been selected for the connection and the load balancer statically configured to route data traffic for that connection to the correct connection server.

In some embodiments, the load balancer is statically configured to ensure that requests for a given datacenter (and responses from the datacenter) are always routed to the same connection server instance that handles the connection for that datacenter. Consistent hashing algorithms (e.g., using bloom filters) are often used for similar applications, but are not generally intended for a system in which all of the connections are designed to be persistent rather than timing out. If there is a change in the number of connection server instances across which the connections are balanced, there is usually a time period during which the old connections are routed correctly, but these connections are expected to complete during the course of this time period. After this time period, some connections would be moved (via the hash algorithm used) to a different connection server and thus would need to be re-initiated. In the case of the indefinitely open connections used for communication between the network management system and the local managers in some embodiments, the connections do not come to an end until the datacenter is no longer managed by the network management service (or there is a break in the connection for another reason) and thus a static configuration is used for these load balancers.

In some embodiments, the load balancer and connection servers are managed by a connection server controller. In some embodiments, this controller is actually two components based on Kubernetes design principles—a controller and a controller operator. In addition to attempting to initiate the connection with the connection server, the connection agent at the local manager for a new datacenter also calls an API on this connection server controller as part of the registration process. Within this API call, the connection agent includes the unique datacenter identifier for its datacenter. This datacenter identifier is unique not just within the datacenter group, but across all of the datacenter groups managed by the entire network management system.

Upon receiving the API call, the connection server controller assigns the datacenter (i.e., the connection between the network management system and the datacenter) to one of the existing connection servers. In some embodiments, this assignment is based on which existing connection server has the most availability. When a connection server is instantiated in the cluster, metadata is defined for the connection server that specifies the number of connections that the connection server can handle at a given time. For instance, some embodiments base this number of connections on the CPU and memory allocation for the connection server, while in other embodiments the number of connections is directly assigned by a network administrator. During runtime, the metadata for each connection server indicates this maximum number of connections as well as the current number of connections handled by the connection server. Based on this data, the connection server controller determines to which server the new connection should be assigned (e.g., the server with the highest number of available slots for connections, the server with the lowest percentage of available connections currently assigned to it, or based on a similar metric).

The connection server controller then configures the load balancer for the connection servers to statically forward all traffic that includes the datacenter identifier for this new datacenter to the selected connection server. At this point, a connection initiation message from the connection agent can be forwarded to the connection server, allowing for the connection to be setup between the network management system and the datacenter. As mentioned, the load balancer is statically configured to forward traffic (either directed to the datacenter or coming from the datacenter) based on a datacenter identifier in the traffic.

In some embodiments, the connection server controller modifies the static load balancer configuration by creating a schema (e.g., a custom resource definition) for each connection server and writing the mapping of the datacenter identifier to this schema (e.g., an instance of the custom resource definition) for the selected connection server. This schema is then used to define the configuration for the load balancer.

As described, the connection server is the "server" for the gRPC connection. However, various network management services often need to push data and/or API requests down to the local managers, for which these connections are used. Because the connections are gRPC connections that allow "server push" operations, the connection server that handles the connection to a particular local manager can push requests for that local manager onto the persistent connection (rather than opening a new connection). However, such a request first needs to be routed to the correct connection server.

Thus, when one of the network management services in the public cloud needs to send a request to a particular local manager, that service sends the request to the load balancer. The services are configured to include the datacenter identifier for that local manager in the request. This enables the load balancer to map the datacenter identifier to the connection server that handles the connection for that datacenter and to route the request to that connection server based on the static load balancer configuration (e.g., as opposed to hashing the datacenter identifier and/or other aspects of the request).

Examples of such services sending requests include the policy management service instance providing changes to the policy configuration for a datacenter, the recommendations module of a flow monitoring service providing firewall policy rules based on microsegmentation for a datacenter, or the policy management service querying the local manager for information, among other types of requests. In addition, a backend user interface (UI) service running within the network management system in the cloud can receive UI requests for the local managers (e.g., from an authenticated user interacting with the network management service, requesting specific data from the local manager to populate the user interface) and send these requests to the correct local manager.

When the request reaches the connection server, the connection server also uses the datacenter identifier to identify the correct one of its (oftentimes many) connections and pushes the request onto that connection. In some embodiments, prior to pushing the request onto the connection to the local manager, the connection server converts the request into a different format for the connection. Specifically, in some embodiments the network management services send the requests as Representational State Transfer (REST) APIs in JavaScript Object Notation (JSON) format, which is the format used by the local managers as well. However, gRPC channels carry protocol buffer (protobuf) format data rather than JSON. As such, the connection server of some embodiments translates the requests from JSON to protobuf format prior to pushing the request onto the connection. The connection agent at the local manager translates the request back into JSON for execution at the local manager. In addition, for replies from the local manager (or for data transfer initiated by the local manager), these translations are performed in reverse in some embodiments.

In addition, the connection server stores a finite state machine for each request in some embodiments, in order to track the state of the request. The connection server assigns each request a request identifier, which is provided with the request to the connection agent. When a reply is received at the connection agent from the local manager, the connection agent uses the request identifier in the provision of the reply to the connection server so that the connection server can match the reply to the proper request.

The finite state machine for a request is used by the connection server to track the state of the request and can be accessed (using the request identifier) as needed by the connection server. In some embodiments, the connection server moves a finite state machine for a request to a new state when the request is pushed onto the connection, when the request is acknowledged as received by the connection agent, and when a reply to the request is received from the connection agent. The finite state machine can also be moved to a failure state if a timeout is reached. These finite state machines may be used by the connection servers to respond to queries regarding the requests (e.g., from the services that initiated the request) as well as to determine whether to retry a request after a connection is re-initiated (e.g., because a connection server crashes or is restarted).

While the connections initiated by the connection agents at the local managers are intended to persist as long as their respective datacenters are managed by the network management service, in some cases a connection server may crash or be taken down for some other reason. In this case, the load balancer notifies the connection agent that the connection is down as part of basic TCP connection handling (e.g., a TCP disconnect event message). In some embodiments, the connection server controller listens for these events and assigns the connections previously handled by the now inoperational connection server to other connection servers (instantiating a new connection server if necessary to handle some of the connections). The controller server reconfigures the load balancer to select connection servers based on the datacenter identifiers according to the new assignment such that by the time the connection agents attempt to re-initiate their connections, the load balancer is reconfigured and selects the correct new connection servers for each connection initiation message.

Among the data streamed over the connection between the network management system and the local manager, in some embodiments, are any changes to the policy configuration made at either the datacenters or the central policy manager service instance. In some embodiments, when a datacenter is initially registered to a datacenter group and the policy manager service is implemented for that datacenter group, the local manager at the datacenter provides its local datacenter policy configuration to the centralized policy manager service managing that datacenter from the cloud. A policy configuration for a logical network includes (i) definitions of and configurations for logical network elements, (ii) connections between those logical network elements, as well as (iii) security policy definitions (e.g., definitions of security groups, policy rule specifications, etc.).

The policy manager service incorporates the received local configuration into a global policy configuration alongside any other configurations from other datacenters in the datacenter group. That is, the policy manager service receives local configurations storing logical network policy from each datacenter in a datacenter group (assuming those datacenters exist and have network policy prior to being added to the datacenter group, as opposed to being newly created at the time they are added to the datacenter group) and consolidates these local configurations into a global network policy. This global network policy can be viewed through a UI by a network administrator that logs into the policy manager service instance managing the datacenter group. If any changes are made to the policy at any of the local managers, that local manager provides these updates to the policy manager service instance so that the global configuration is kept up to date.

In some embodiments, a network administrator (e.g., an authenticated user) can make modifications (e.g., adding security policies or logical network elements) to the local configuration of a datacenter at the policy manager service instance. In some embodiments, changes made at the policy manager service instance to the local policy configuration for a given datacenter are pushed (e.g., as a request via the open gRPC connection) to the local manager for that datacenter to be incorporated into the local configuration. In addition, the network administrator can define and modify global policy configuration at the policy manager service instance. Each individual network policy global policy configuration is pushed to all of the datacenters (or a subset of the datacenters if the logical network policy is defined as such) in some embodiments, also via the open gRPC connection.

In some embodiments, the local and global policy configurations are stored as policy trees. Within these policy trees, some embodiments allow the user to define sub-trees (also referred to as "projects") for specific sub-tenants. The network management system allows separate access for these sub-tenants in some embodiments, who are only able to access their portion of the policy configuration. For instance, an organization can create separate policy configuration domains for different divisions within the organization (e.g., human resources, finance, research and development, etc.). Similarly, a service provider (e.g., a telecommunications service provider) can define sub-tenant policy configuration domains for different customers of theirs. A sub-tenant can only access their own policy configuration domain, they cannot view or modify the main policy configuration domain or the policy configuration domains of other sub-tenants (in certain cases a sub-tenant can connect to certain aspects of the main policy configuration domain that are exposed by the main tenant). In some embodiments, the global policy configuration is defined as a default sub-tree that is only accessible to a primary user (e.g., the tenant network administrator) and that the sub-tenants cannot access or modify (though in certain cases some of the elements of the global policy configuration are exposed to sub-tenants so that the sub-tenants can link their network to these elements).

At least some of the network management system services (e.g., the policy management service, the network monitoring service, etc.) provide user interfaces (e.g., graphical user interfaces) that enable the tenant user (e.g., a network administrator) with appropriate credentials to view information stored by the services and interact with the services (e.g., to modify the policy configuration for the network). For instance, the policy manager service of some embodiments provides a user interface that enables a user to view and modify the global configuration as well as local configurations.

In addition, the network monitoring service of some embodiments provides a graphical user interface (GUI) that allows a user to view flow statistics and/or flow topology for a datacenter group (or individual datacenters within that datacenter group) as well as use the flows to auto-generate firewall rules (via microsegmentation techniques). For example, a network monitoring service instance provides a dashboard GUI that provides flow statistics and trends for the datacenter group monitored by that service instance as well as for each individual datacenter within the datacenter group. The network monitoring service analyzes which flows are blocked, allowed, or unprotected (i.e., only match on a default firewall rule and are therefore not allowed or blocked according to a more specific rule), and provides information about the different types of flows within the dashboard GUI.

The network monitoring service of some embodiments also allows users to generate firewall rule recommendations based on microsegmentation. In some embodiments, the network monitoring service provides a user interface that allows a user to specify a set of workload DCNs (e.g., specific VMs, security groups, etc.) within a particular datacenter spanned by the datacenter group for input to a microsegmentation recommendation function of the network monitoring system. Various microservices of the network monitoring system then perform a set of operations to identify the flows sent to and from those specified workload DCNs, correlate the sources and destinations of those flows to other DCNs (including those selected as well as other DCNs in any of the datacenters), and generate recommended firewall rules based on the observed flows. The user is then presented with the option to view these recommended firewall rules and choose whether or not to publish the rules (so that they will be enforced within the network). If the user chooses (through the network monitoring service UI) to publish these recommended firewall rules, the rules are then be published to the local manager at the selected datacenter (e.g., via the open gRPC connection to the local manager at the selected datacenter).

Some embodiments only allow the input entities used to generate the recommendation to be located in one of the datacenters, and then publish the rules to the local manager at that datacenter. However, the generated firewall rules may include sources and/or destinations located in other datacenters in the datacenter group. These rules are typically defined using DCN identifiers (e.g., VM IDs) for the source and destination match conditions. However, while the network monitoring system is aware of the DCN identifiers for all of the workload DCNs across the datacenter group, the local manager at a particular datacenter will not have this information for workload DCNs located in other datacenters. As such, the network monitoring system translates these DCN identifiers (for workload DCNs in other datacenters) to network addresses when pushing the rules to the local manager at the particular datacenter. For instance, a rule defined for a flow from a first VM at a first datacenter to a second VM at a second datacenter will have the destination VM ID translated into a network address when pushed to the local manager at the first datacenter. If the user subsequently causes the network monitoring service to generate a set of recommended rules for a set of workloads at the second datacenter that includes the second datacenter, then the rules pushed to the local manager at the second datacenter will include a rule defined for a flow from the network address of the first VM to the VM ID of the second VM.

The network monitoring service also provides a flow visualization GUI that provides the user with the ability to visualize the monitored flows in the network. In some embodiments, the user can view the flows related to groups of workload DCNs in one of the datacenters or flows for specific workload DCNs in one of the datacenters. That is, the flow visualization GUI can either display flows between groups of workload DCNs (e.g., security groups or other groups of DCNs) or between individual workload DCNs. Some embodiments provide this display for any of the datacenters within a datacenter group, but not for the datacenter group as a whole (i.e., requiring the user to select one datacenter at a time for which to visualize the flows). As in the dashboard UI, some embodiments display different representations for blocked flows, allowed flows, and unprotected flows. In addition, some embodiments allow the user to toggle whether each of these types of flows are displayed in the visualization.

Because the flow visualization is shown for a particular datacenter (with the ability for the user to toggle between datacenters in the datacenter group), in some embodiments the visualization displays (i) representations of flows between pairs of workload DCNs (or groups) located within the particular datacenter, (ii) representations of flows between workload DCNs (or groups) located within the particular datacenter and workload DCNs (or groups) at other datacenters in the datacenter group, and (iii) representations of flows between workload DCNs (or groups) located within the particular datacenter and endpoints external to the datacenter group. Some embodiments group all of the other datacenters in the group into one item in the visualization, while other embodiments display a separate item for each other datacenter in the group (but do not display representations of individual DCNs or security groups located in those other datacenters).

Some embodiments also provide alerts within the flow visualization display, indicating DCNs on which potential issues have been detected. One such alert indicates when intrusion detection (IDS) events are detected. In some embodiments, the network monitoring service analyzes the collected flows to identify anomalies indicative of intrusion events and associates these events with specific DCNs (e.g., DCNs under attack by such malicious activity). These alert items are also selectable, in some embodiments, to display additional information about the IDS event (e.g., threat scores that quantify the risk posed by the event, the suspected type of IDS event, the most recent occurrence time of the event, etc.).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 13 conceptually illustrates at least a portion of the content of a configuration file for a connection server.

FIG. 14 conceptually illustrates an example of a load balancer configuration file.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a cloud-based network management and monitoring system capable of managing multiple tenant networks that are each distributed across multiple datacenters. The tenant networks, in some embodiments, can include multiple different types of datacenters. For instance, a given tenant network may include a combination of on-premises and/or branch datacenters (i.e., physical datacenters using the tenant's infrastructure) as well as virtual datacenters that operate in a public cloud (but with network management components incorporated into the virtual datacenter). In some embodiments, the tenant network can also span to native virtual private clouds (VPCs) within a public cloud.

Figure 1:
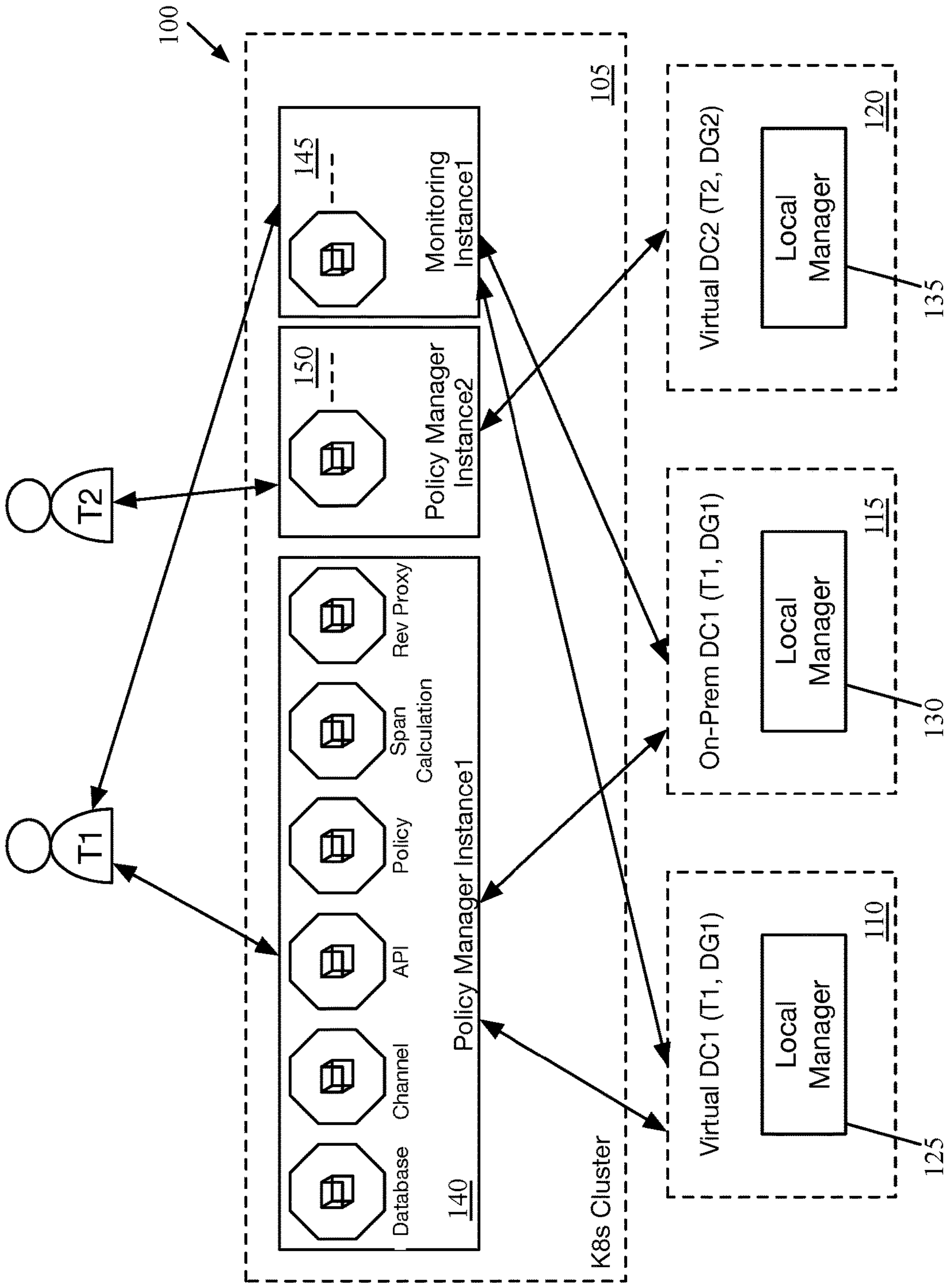
FIG. 1 conceptually illustrates the architecture of a cloud-based multi-tenant network management and monitoring system of some embodiments.

FIG. 1 conceptually illustrates the architecture of a cloud-based multi-tenant network management and monitoring system 100 of some embodiments. In some embodiments, the network management and monitoring system 100 operates in a container cluster (e.g., a Kubernetes cluster 105, as shown). The network management and monitoring system 100 (subsequently referred to herein as a network management system) manages multiple groups of datacenters for multiple different tenants. For each group of datacenters, the tenant to whom that group of datacenters belongs selects a set of network management services for the network management system to provide (e.g., policy management, network flow monitoring, threat monitoring, etc.). In addition, in some embodiments, a given tenant can have multiple datacenter groups (for which the tenant can select to have the network management system provide the same set of services or different sets of services).

A datacenter group defined by a tenant can include multiple datacenters and multiple types of datacenters in some embodiments. In this example, a first tenant (T1) has defined a datacenter group (DG1) including two datacenters 110 and 115 while a second tenant (T2) has defined a datacenter group (DG2) including a single datacenter 120. One of the datacenters 110 belonging to T1 as well as the datacenter 120 belonging to T2 are virtual datacenters, while the other datacenter 115 belonging to T1 is a physical on-premises datacenter.

Virtual datacenters, in some embodiments, are established for an enterprise in a public cloud. Such virtual datacenters include both network endpoints (e.g., application data compute nodes) and management components (e.g., local network manager and network controller components) that configure the network within the virtual datacenter. Though operating within a public cloud, in some embodiments the virtual datacenters are assigned to dedicated host computers in the public cloud (i.e., host computers that are not shared with other tenants of the cloud). Virtual datacenters are described in greater detail in U.S. patent application Ser. No. 17/852,917, which is incorporated herein by reference.

In some embodiments, each network management service for each datacenter group operates as a separate instance in the container cluster 105. In the example, the first tenant T1 has defined both policy management and network monitoring for its datacenter group DG1 while the second tenant T2 has defined only policy management for its datacenter group DG2. Based on this, the container cluster instantiates a policy manager instance 140 and a network monitor instance 145 for the first datacenter group as well as a policy manager instance 150 for the second datacenter group.

The policy management service, in some embodiments, allows the user to define a logical network that connects logical network endpoint data compute nodes (DCNs) (e.g., virtual machines, containers, etc.) operating in the datacenters as well as various policies for that logical network (defining security groups, firewall rules, edge gateway routing policies, etc.). The policy manager instance 140 for the first datacenter group provides network configuration data to local managers 125 and 130 at the datacenters 110 and 115 while the policy manager instance 150 for the second datacenter group provides network configuration data to the local manager 135 at the datacenter 120. Operations of the policy manager (in a non-cloud-based context) is described in detail in U.S. Pat. Nos. 11,088,919, 11,381,456, and 11,336,556, all of which are incorporated herein by reference.

The network monitoring service, in some embodiments, collects flow and context data from each of the datacenters, correlates this flow and context information, and provides flow statistics information to the user (administrator) regarding the flows in the datacenters. In some embodiments, the network monitoring service also generates firewall rule recommendations based on the collected flow information (e.g., using microsegmentation) and publishes to the datacenters these firewall rules. Operations of the network monitoring service are described in greater detail in U.S. Pat. No. 11,340,931, which is incorporated herein by reference. It should be understood that, while this example (and the other examples shown in this application) only describe a policy management service and a network (flow) monitoring service, some embodiments include the option for a user to deploy other services as well (e.g., a threat monitoring service, a metrics service, a load balancer service, etc.).

In some embodiments, each network management service 140-150 of the network management system 100 is implemented as a group of microservices. Each of the network management services includes multiple microservices that perform different functions for the network management service. For instance, the first policy manager instance 140 includes a database microservice (e.g., a Corfu database service that stores network policy configuration via a log), a channel management microservice (e.g., for managing asynchronous replication channels that push configuration to each of the datacenters managed by the policy management service 140), an API microservice (for handling API requests from users to modify and/or query for policy), a policy microservice, a span calculation microservice (for identifying which atomic policy configuration data should be sent to which datacenters), and a reverse proxy microservice. It should be understood that this is not necessarily an exhaustive list of the microservices that make up a policy management service, as different embodiments may include different numbers and types of microservices. In some embodiments, each of the other policy manager service instances includes separate instances of each of these microservices, while the monitoring service instance 145 has its own different microservice instances (e.g., a flow visualization microservice, a user interface microservice, a recommendation generator microservice, a configuration synchronization microservice, etc.).

Figure 2:
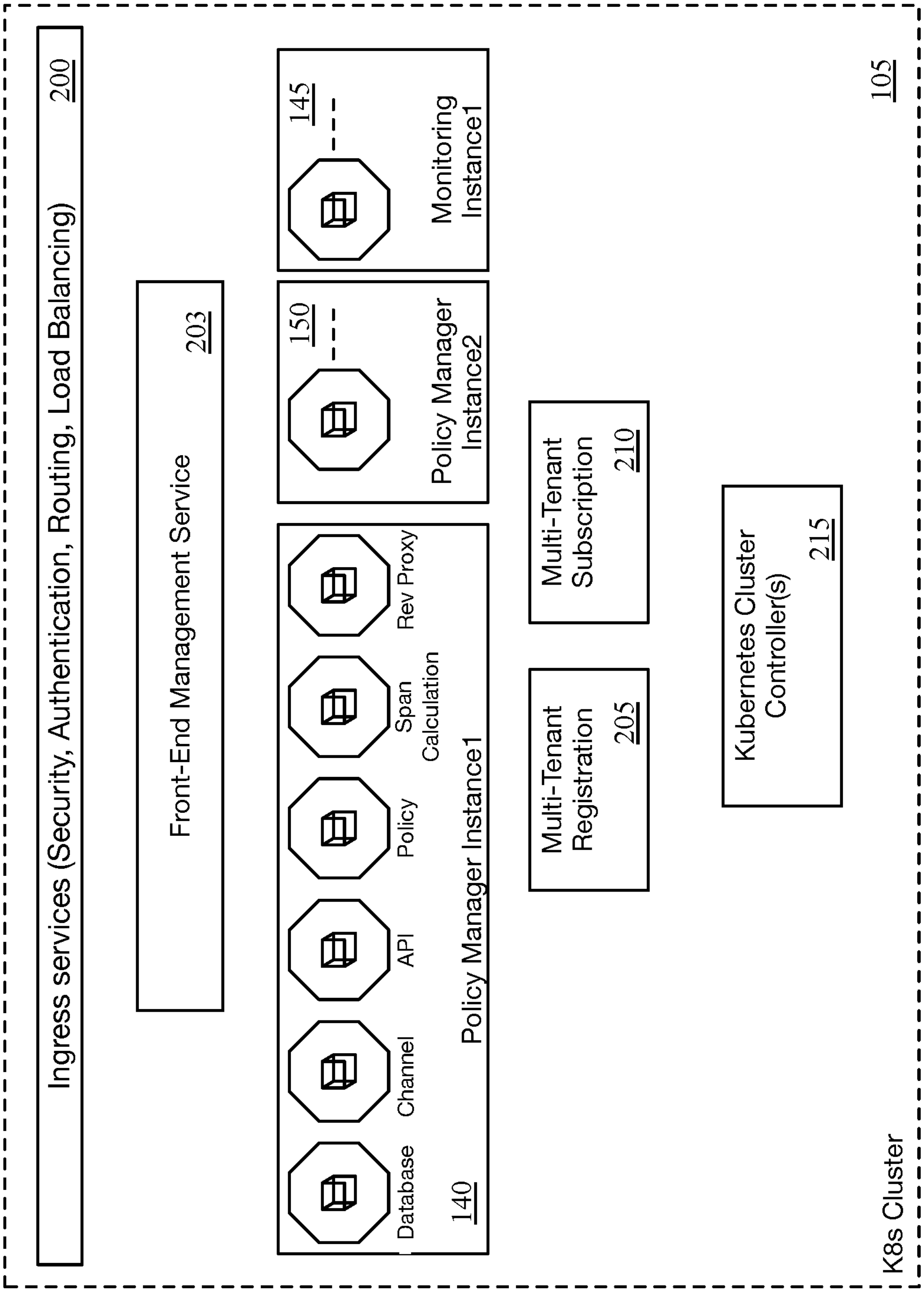
FIG. 2 conceptually illustrates the container cluster, showing additional services and other entities running in the container cluster.

In some embodiments, the container cluster 105 includes additional features in addition to the network management service instances created for each datacenter group. FIG. 2 conceptually illustrates the container cluster 105, showing additional services and other entities running in the container cluster. As shown, in addition to the network management services 140-150, the cluster also includes a set of ingress services 200, a front-end management service 203, additional multi-tenant services including a multi-tenant registration service 205 and a multi-tenant subscription service 210, and a set of cluster controllers 215.

The cluster controllers 215, in some embodiments, include typical Kubernetes components that manage the container cluster 105. Examples of such cluster controller components include the kube-apiserver that operates as a front-end for the control plane, etcd that stores cluster data, the kube-scheduler that assigns the microservices on Pods to nodes within the cluster, and the kube-controller-manager that runs various controller processes to manage the operation of the cluster.

The multi-tenant services 203, 205, and 210 (in addition to other multi-tenant services, in some embodiments), are services that are part of the network management system 100. Like the service instances, in some embodiments the multi-tenant services each include numerous microservices that perform different aspects of the service. Unlike the service instances, these multi-tenant services are not instantiated separately for each different group of datacenters. Rather, the multi-tenant services interact with all of the tenant users and/or all of the datacenter groups. These services do not store data specific to the network policy or network operation for an individual user or datacenter group, but rather handle high-level operations to ensure that the network management services can properly interact with the users and datacenters.

For instance, the front-end management service 203, in some embodiments, enables the creation of the various network management service instances. In some embodiments, the front-end management service 203 is a multi-tenant service that is accessed by all of the tenants of the network management system. Through the front-end management service, a tenant can define a datacenter group and specify which network management services should be implemented for the datacenter group. In addition, within a datacenter group, in some embodiments the front-end management service allows a tenant to define sub-tenants for the group. This front-end management service 203 defines these sub-tenants within the policy service data for the datacenter group.

The registration service 205 of some embodiments performs a set of operations for ensuring that physical datacenters can register with the network management service. The registration service 205 also keeps track of all of the different datacenters for each datacenter group, in some embodiments. The subscription service 210 of some embodiments handles subscription operations. The network management system 100 uses a keyless licensing system; in some embodiments, the subscription service 210 swaps out licenses for datacenters that previously used a key-based licensing mechanism for an on-premises network management system.

The ingress services 200 handle the processing of incoming traffic directed to the network management service in some embodiments. This traffic can include communication (e.g., API requests) from the administrator users (i.e., from the tenants) as well as data streams from the datacenters. The ingress services 200, in some embodiments, include security and authentication features as well as routing and load balancing of the traffic. The ingress services 200 route data traffic to the correct service instances (e.g., based on layer 7 information) or multi-tenant services and balance the traffic across multiple replicas of the microservices (which may be replicated across multiple zones).

Figure 3:
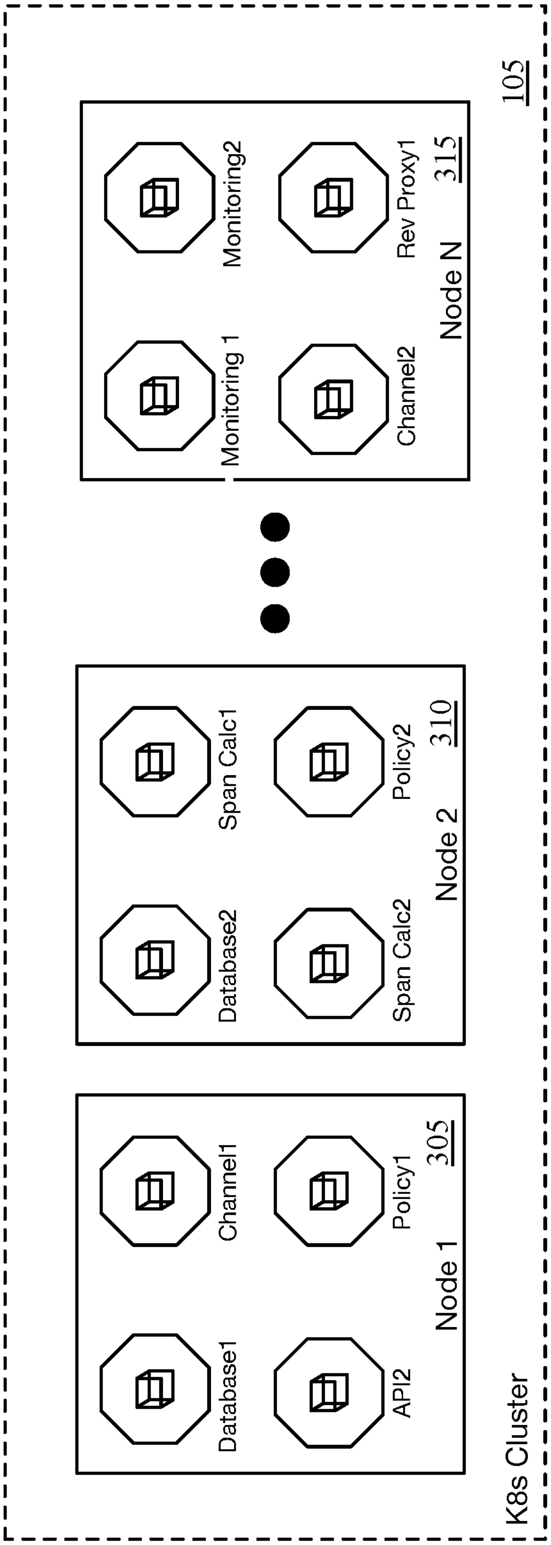
FIG. 3 conceptually illustrates a set of nodes in the container cluster with various microservices of two policy manager instances distributed across these nodes.

In some embodiments, the different microservices may be placed on various different nodes within the container cluster. FIG. 3 conceptually illustrates a set of nodes 305-315 in the container (Kubernetes) cluster 105, with various microservices of the two policy manager instances 140 and 150 distributed across these nodes. While this example illustrates four microservices per node, it should be understood that in practice a given node may host many more microservices, and the number of microservices assigned to each node will not necessarily be equal across the nodes.

In some embodiments, each of the nodes 305-315 is a virtual machine (VM) or physical host server that hosts one or more Pods, as well as various entities that enable the Pods to run on the node and communicate with other Pods and/or external entities. These various entities, in some embodiments, include a set of networking resources and network management agents, as well as standard Kubernetes agents such as a kubelet for managing the containers operating in the Pods. Each node operates a set of Pods on which the microservices run. Different embodiments assign a single microservice to each Pod or assign multiple microservices (e.g., that are part of the same service instance) to individual Pods.

In some embodiments, the tenant does not control the scheduling of microservices to the different nodes 305-315. Instead, the tenant specifies which network management services will be used for a given datacenter group and the cluster control plane components handle the scheduling of the individual services. Thus, for example, the first node 305 hosts three microservices from a first policy management service instance (a database microservice, a channel management microservice, and a policy microservice) as well as an API microservice from a second policy management microservice. In some embodiments, the cluster scheduler component takes into account the relatedness of the microservices (i.e., that they belong to the same service instance) when assigning the microservices to nodes, but this is not necessarily dispositive as the scheduler also accounts for other factors.

Even when two microservices from different service instances are assigned to the same node, they are not necessarily able to communicate with each other. In some embodiments, each individual service instance is assigned a separate namespace in the container cluster 105, and all of the microservices belonging to that service instance are assigned to that namespace. The use of separate namespaces allows for isolation of the different service instances assigned to different tenants, as well as the reuse of internal names for resources (e.g., microservices) within the cluster.

Figure 4:
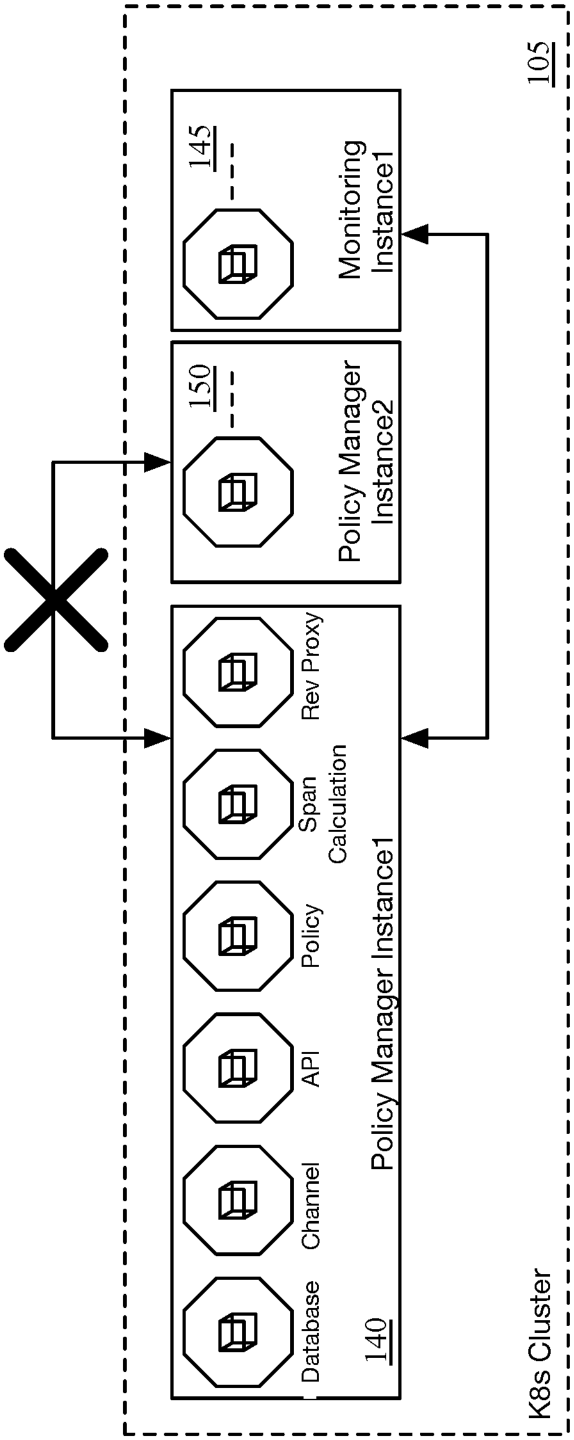
FIG. 4 conceptually illustrates the isolation of resources for different datacenter groups.

FIG. 4 conceptually illustrates the isolation of resources for different datacenter groups. As shown in this figure, the microservices belonging to the first policy manager service instance 140 are not able to communicate with the microservices belonging to the second policy manager service instance 150, because these policy manager services are associated with different datacenter groups. However, some embodiments allow communication between different service instance associated with the same datacenter group. In this case, the microservices belonging to the first policy manager service instance 140 (for datacenter group DG1) are allowed to communicate with the microservices belonging to the monitoring service instance 145. For instance, this enables the monitoring service instance 145 to retrieve aspects of the network configuration that are required to analyze the flows in that datacenter group as well as to provide generated firewall rules for the network to the policy management service instance 140.

In some embodiments, the container cluster 105 enforces this isolation via the generation of firewall rules for enforcement within the cluster. By assigning each service instance to a separate namespace, the container cluster can enforce the communication policies through the use of simple rules (e.g., block all traffic from resources in policy_instance1 to resources in policy_instance2, allow traffic from resources in policy_instance1 to resources in monitoring_instance1). In addition, the microservice instances within each namespace are allowed to communicate with each other.

It should be noted that the container cluster does not necessarily operate entirely in a single public cloud datacenter. In some embodiments, the cluster is distributed across multiple such public cloud datacenters (e.g., different datacenters of a single public cloud provider). In some such embodiments, the microservices of each service instance are replicated across multiple datacenters, or availability zones (i.e., at least one instance of each microservice executes in each of the availability zones spanned by the cluster).

Figure 5:
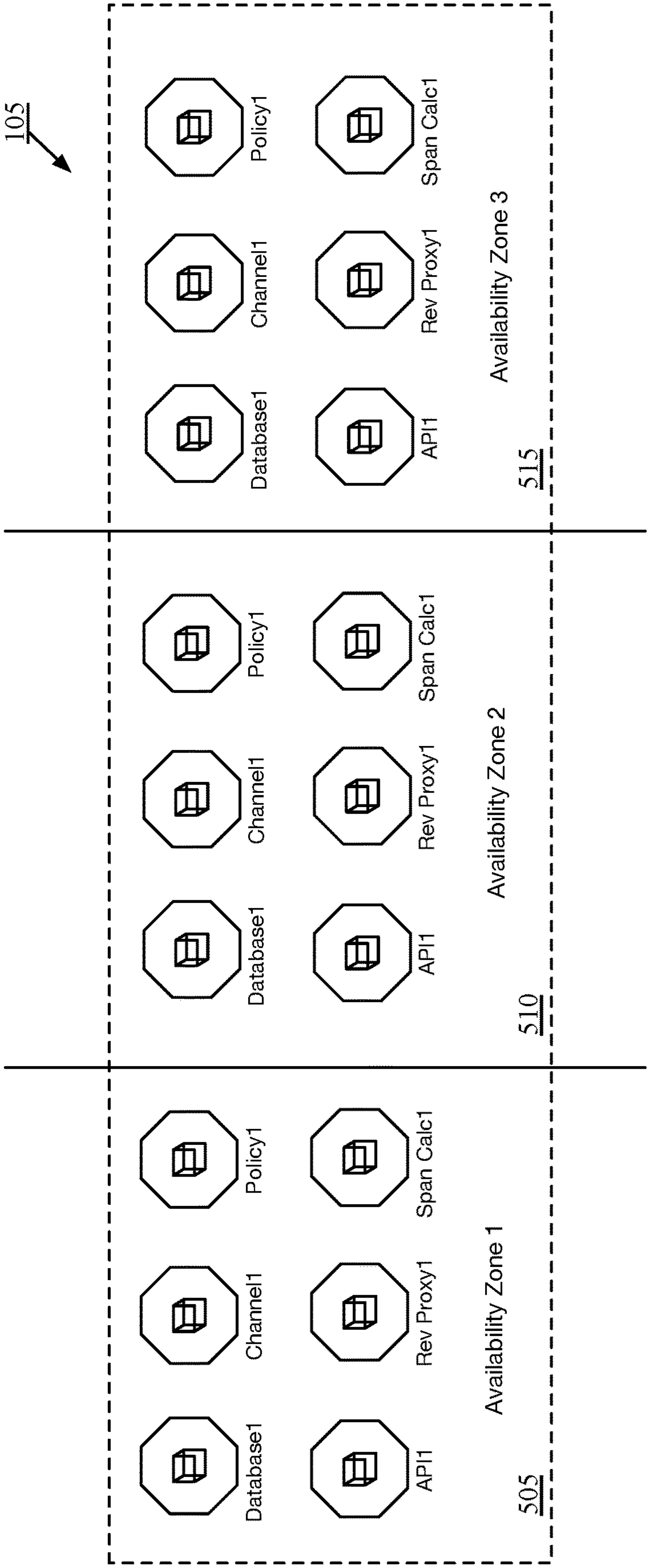
FIG. 5 conceptually illustrates the container cluster with the microservices of a policy manager service instance replicated across three availability zones.

FIG. 5 conceptually illustrates the container cluster 105 with the microservices of the first policy manager service instance replicated across three availability zones 505-515. In some embodiments, each of these availability zones 505-515 are located at different physical datacenters of the same public cloud provider (and, in some such cases, in the same region as defined by that public cloud provider). The availability zones are typically linked for fast secure connections. By replicating the microservices across multiple availability zones, the network management system is fault-tolerant, so that a failure at one of the public cloud datacenters does not result in failure of the network management system. Some embodiments replicate state data (e.g., the policy configuration database that stores the network policy configuration for a datacenter group) across each of the availability zones. In addition, certain data (e.g., the often large amount of network flow data collected by the monitoring service) is stored in a separate database that is outside of the container cluster but accessible to microservices of the appropriate service instance in each of the availability zones.

Both tenant users and datacenters need to be able to communicate with the various service instances of the network management system. More specifically, each user should be able to communicate with any of the service instances managing any of its datacenter groups, while each datacenter belonging to a particular datacenter group should be able to communicate with any of the service instances managing that particular datacenter group. In some embodiments, the ingress services for the container cluster are configured to handle routing of traffic from both the users as well as from the datacenters (e.g., from the local managers at the datacenters).

Figure 6:
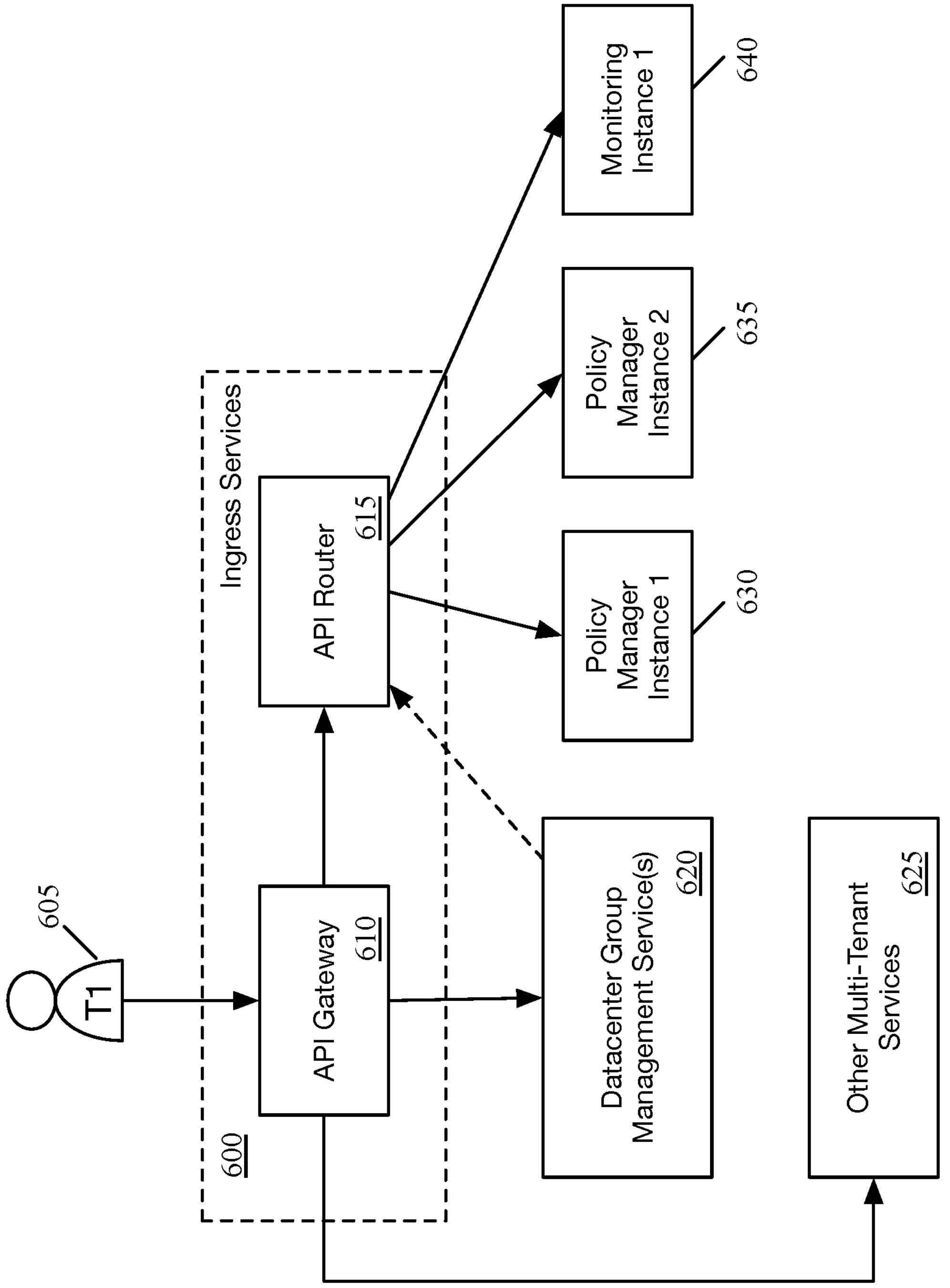
FIG. 6 conceptually illustrates a subset of the ingress services as well as ingress data paths for different types of data received from a user.

FIG. 6 conceptually illustrates a subset of the ingress services 600 as well as ingress data paths for different types of data received from a user 605. In some embodiments, the ingress services include at least an API gateway 610 and an API router 615. It should be noted that, while these are shown as two different entities, in some embodiments they are separate features of the same service (e.g., different microservices or even operating within the same microservice). In some embodiments, the API gateway 610 and API router 615 operate on the same Pod, while in other embodiments they operate on different Pods. In addition, the figure includes datacenter group management services 620 and other multi-tenant services 625, as well as two policy manager service instances 630 and 635 and a monitoring service instance 640.

The datacenter group management services 620 is a set of one or more multi-tenant services that coordinate the creation of datacenter groups and deployment of service instances for those datacenter groups. In some embodiments, the datacenter group management services 620 include (i) a first service for defining datacenter groups and deploying service instances and (ii) a second service for defining sub-tenants within policy configurations (i.e., specific to policy manager service instances). The operation of the datacenter group management service to create a datacenter group is described further by reference to FIG. 7 below. The other multi-tenant services 625 can include inventory services, alarm services, subscription and/or registration services (as described above), etc.

The API gateway 610 of some embodiments receives user requests, whether those requests relate to specific service instances or to various multi-tenant services. In some embodiments, authentication is handled through the API gateway 610 as well, with the authentication messages sent to a multi-tenant authentication service, to the cloud service provider for the public cloud at which the network management system is hosted, or to another entity. In other embodiments, users are authenticated with the network management system via other services and only authenticated traffic is received at the API gateway 610.

When the API gateway 610 receives user requests for the datacenter group management services (e.g., requests to create new datacenter groups, requests to create new sub-tenants for the policy configuration of a particular datacenter group, etc.), the API gateway 610 routes these requests to the datacenter group management services 620. Similarly, requests for other multi-tenant services 625 that are accessible to users are sent directly to these services rather than through the API router 615.

When the datacenter group management services 620 receive a request to create service instances for a new datacenter group (or a new service instance for an existing datacenter group), these services begin a number of onboarding processes (e.g., registration of the local manager at the datacenters, setting up connections between the network management system and the datacenters, etc.), some of which are described more below. In addition, the datacenter group management services 620 either directly deploy the new service instances or communicate with a set of cluster controllers to deploy the new service instances.

When the new service instances are deployed, the datacenter group management services 620 also install new routes in the API router 615. As described further below, the API router 615 is responsible for routing authenticated user requests to the correct service instance. In some embodiments, this routing is statically configured based on URL information in the request header rather than network addresses. Specifically, each service instance 630-640 is assigned a unique URL that the API router uses to ensure that API requests are sent to the correct service instances.

Figure 7:
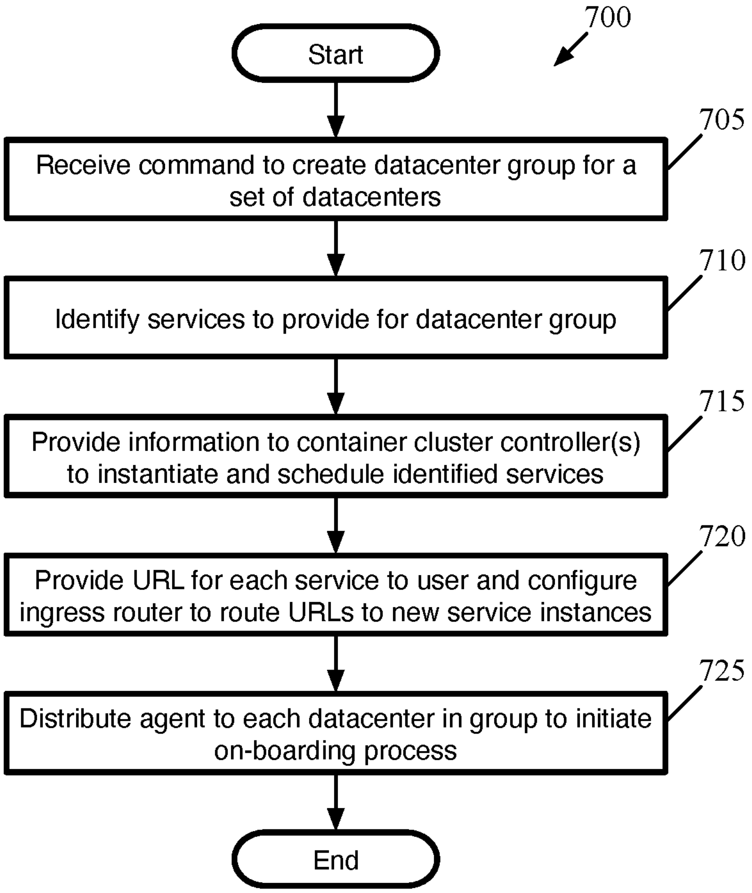
FIG. 7 conceptually illustrates a process of some embodiments for creating a new datacenter group based on a user request.

FIG. 7 conceptually illustrates a process 700 of some embodiments for creating a new datacenter group based on a user request. In some embodiments, the process 700 is performed by a datacenter group service (e.g., the service 620 shown in FIG. 6) that serves multiple tenants (e.g., all of the tenants of the network management system).

As shown, the process 700 begins by receiving (at 705) a command to create a new datacenter group. This command is received from an authenticated user via the API gateway in some embodiments, and is received as an API request. In some embodiments, the command to create a new datacenter group specifies at least (i) information about the datacenters that will belong to the group (e.g., reachability information, type of datacenter, etc.), (ii) services to instantiate for the group of datacenters, and (iii) the tenant/organization creating the datacenter group (i.e., the authenticated user from which the command is received).

From this command, the process 700 identifies (at 710) the services to provide for the new datacenter group. In some embodiments, the policy management service is provided for all datacenter groups, with the other services (e.g., flow monitoring, anomaly detection, load balancing, etc.) optional. As noted above, some embodiments create a separate service instance for each service of each datacenter group. In other embodiments, some of the service instances can serve multiple datacenter groups.

The process 700 next provides (at 715) information to a set of one or more container cluster controllers to instantiate and schedule the identified service instances. As described above, each of the service instances requires deployment of numerous microservices. In some embodiments, a container cluster service (e.g., the Kubernetes scheduler) is responsible for assigning the different microservices to nodes within the container cluster. As described by reference to FIG. 5, in some embodiments separate instances of each microservice are assigned to each of multiple availability zones for high availability purposes. The datacenter group management service of some embodiments provides the necessary deployment specifications (type of service, unique namespace information, availability zones for deployment, resource requirements, etc.) to the cluster controller set, which then handles the assignment of the microservices to nodes and configuration of the Pods on these nodes according to the specifications.

The process 700 also provides (at 720) a URL for each service to the user (so that the user can contact the service instances) and configures the ingress router to route requests directed to these URLs to the new service instances. In some embodiments, these are provided as http proxy rules, with the URLs based on the namespaces for the respective service instances. The API router (i.e., the ingress router) can then route incoming requests from the users based on these URL paths (after performing security and authentication operations to verify the authenticity of the incoming requests).

Figure 8:
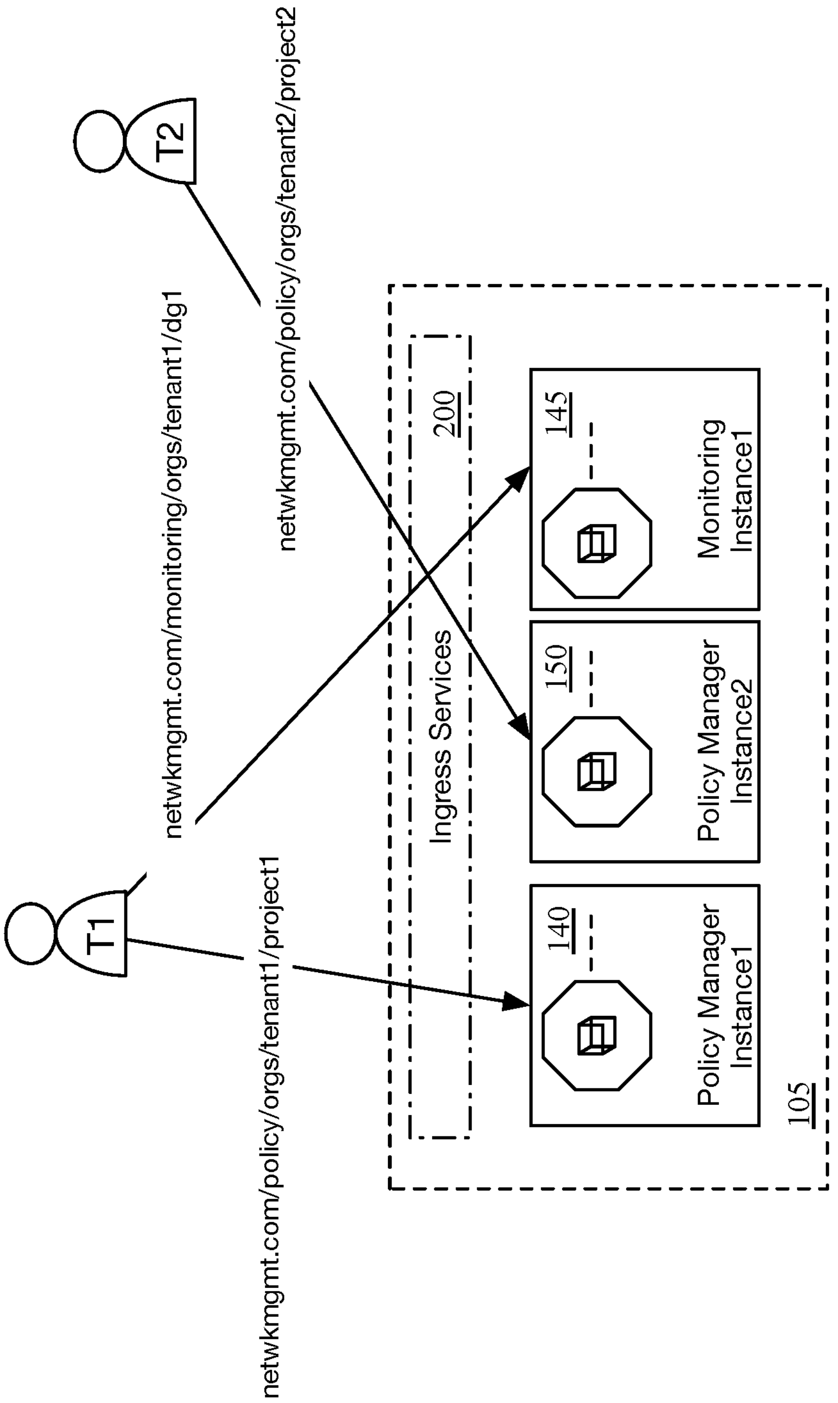
FIG. 8 conceptually illustrates example URL paths of incoming requests from two tenant users.

FIG. 8 conceptually illustrates example URL paths of incoming requests from the tenant users T1 and T2. In some embodiments, each type of service has a particular URL format such that the URL for each service instance is a combination of (i) the URL form for the type of instance and (ii) a specific user-defined construct identifying the specific instance. For example, as described further below, multiple different sub-groups can be defined for a given datacenter group. These sub-groups (also referred to as "projects") can have different authentication and may only be granted access (and allowed to modify) certain portions of the network policy configuration. Thus, each of the URLs specifies the domain at which the network management system is reachable ("netwkmgmt.com"), the type of service ("policy" or "intelligence"), and the tenant ("tenant1" or "tenant2"). For the policy manager service instances, the URL also includes the sub-group name ("project1" for a project within deployment group DG1 and "project2" for a project within deployment group DG2). For the monitoring service instance, the URL specifies the deployment group ("dg1"). It should be understood that these URLs are merely examples and that different constructions that convey the requisite information can be used in other embodiments.

The ingress services 200 route the incoming traffic based on this URL (e.g., using http proxy) and, in some embodiments, load balance the traffic across multiple replicas of the microservice to which the data traffic should be sent (e.g., the policy manager API microservice for policy API requests). For requests to the policy manager service, the ingress services 200 map the user and sub-group name to a particular datacenter group (and thus to a particular policy manager service instance). For requests to the network monitoring service, the user and datacenter group map to a particular network monitoring service instance.

Returning to FIG. 7, the process 700 also distributes (at 725) an agent to each datacenter in the datacenter group to initiate the on-boarding process for that datacenter. In some embodiments, this agent is responsible for initiating a connection between the local manager at the datacenter and the network management system in the public cloud. This connection initiation process is described in greater detail below by reference to FIGS. 10-12. The process 700 then ends. It should be understood that other operations not shown in the process 700 may also be performed by the datacenter group services to create a new datacenter group and deploy network management services for that datacenter group within the public cloud container cluster of the network management system.

In addition to routing traffic from the tenants, the ingress services 200 also handle incoming traffic from the datacenters. Just as URLs are generated for the tenant users, some embodiments also generate (different URLs) for the datacenters. In some embodiments, all of the datacenters in a datacenter group use the same URL to reach a given service instance (with different service instances for a datacenter group having different URLs).

Figure 9:
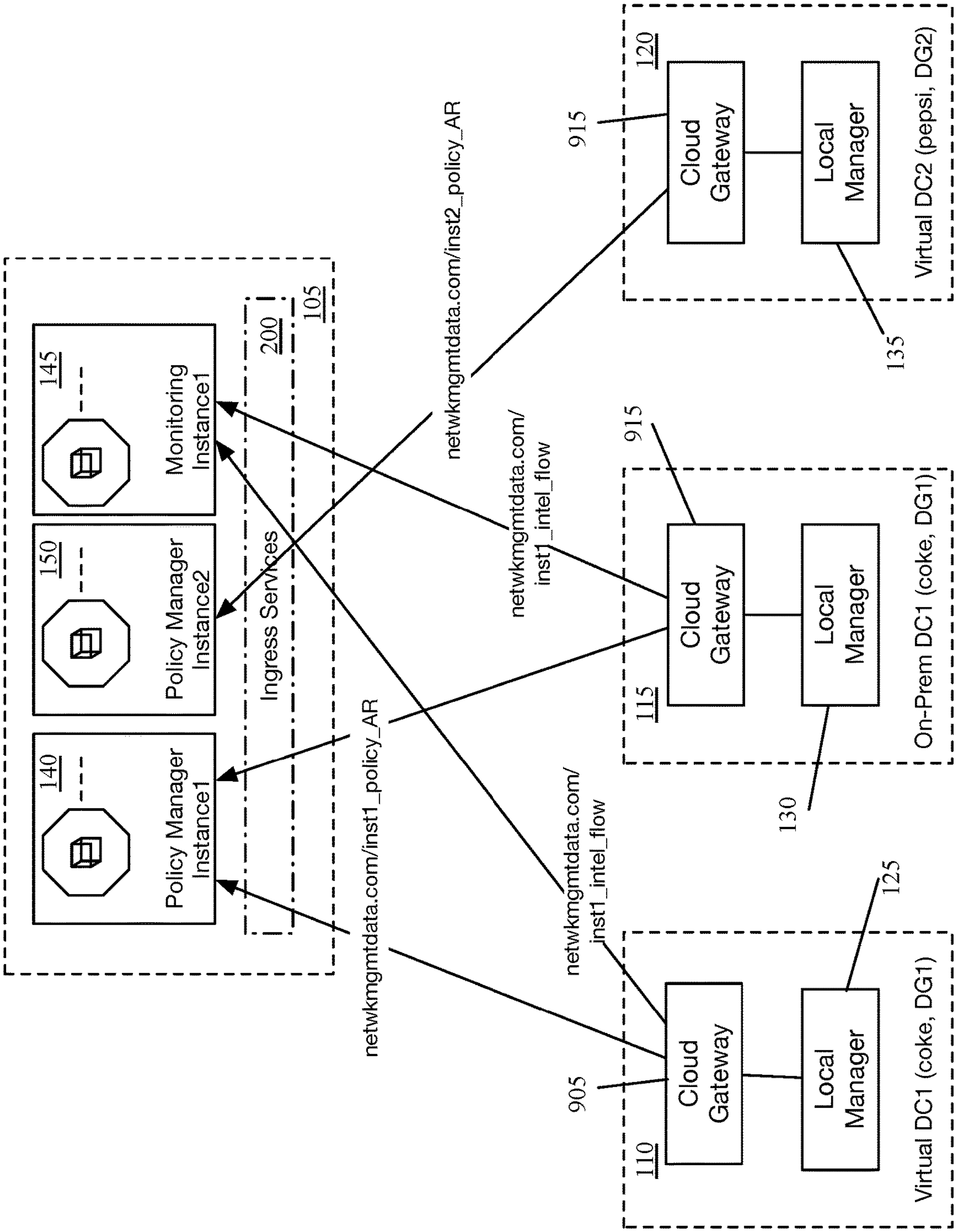
FIG. 9 conceptually illustrates example URL paths for incoming requests from several datacenters.

FIG. 9 conceptually illustrates example URL paths for incoming requests from the datacenters 110-120. As shown, some embodiments use a different domain in the URL for these requests as compared to the user requests ("netwkmgmtdata.com") and then use a simple path (e.g., "inst1_policy_AR" and "inst2_policy_AR" for the two policy manager service instances 140 and 150 and "inst1_intel_flow" for the monitoring service instance 145). As with the example URLs for the tenant users, it should be understood that these URLs are merely examples and that different constructions that convey the requisite information can be used in other embodiments. The ingress services 200 route the incoming traffic based on this URL (additional aspects of the setup and processing of the connection used for such requests is discussed below) and, in some embodiments, load balance the traffic across multiple replicas of the microservice to which the data traffic should be sent (e.g., the channel management microservice for policy information).

This figure also illustrates that, within each datacenter 110-120, a cloud gateway 905-915 is configured. In some embodiments, the cloud gateways are setup in each datacenter managed by the network management system. The form of the cloud gateway may be different between different types of datacenters (e.g., virtual datacenters, physical on-premises datacenters) in some embodiments. The cloud gateways 905-915, in some embodiments, execute a set of agents that onboard the site to the network management system. In some embodiments, each cloud gateway registers with the cluster and registration of the site then piggybacks on the cloud gateway registration. The local managers 125-135, in some embodiments, communicate with the network management system service instances via their respective cloud gateways 905-915.

In some embodiments, the communication between a given datacenter (e.g., the local manager at the datacenter) and the network management system uses a persistent connection (e.g., a persistent TCP connection) that is left open for an extended time period. In some embodiments, this persistent TCP connection is initiated from the datacenter and then left open so long as the datacenter is managed by the network management system so long as there is no interruption in the connection that requires a reset. This allows the services of the network management system to send requests to the datacenter over the TCP connection, even when the services would be otherwise unable to initiate a connection with the datacenter.

Figure 10:
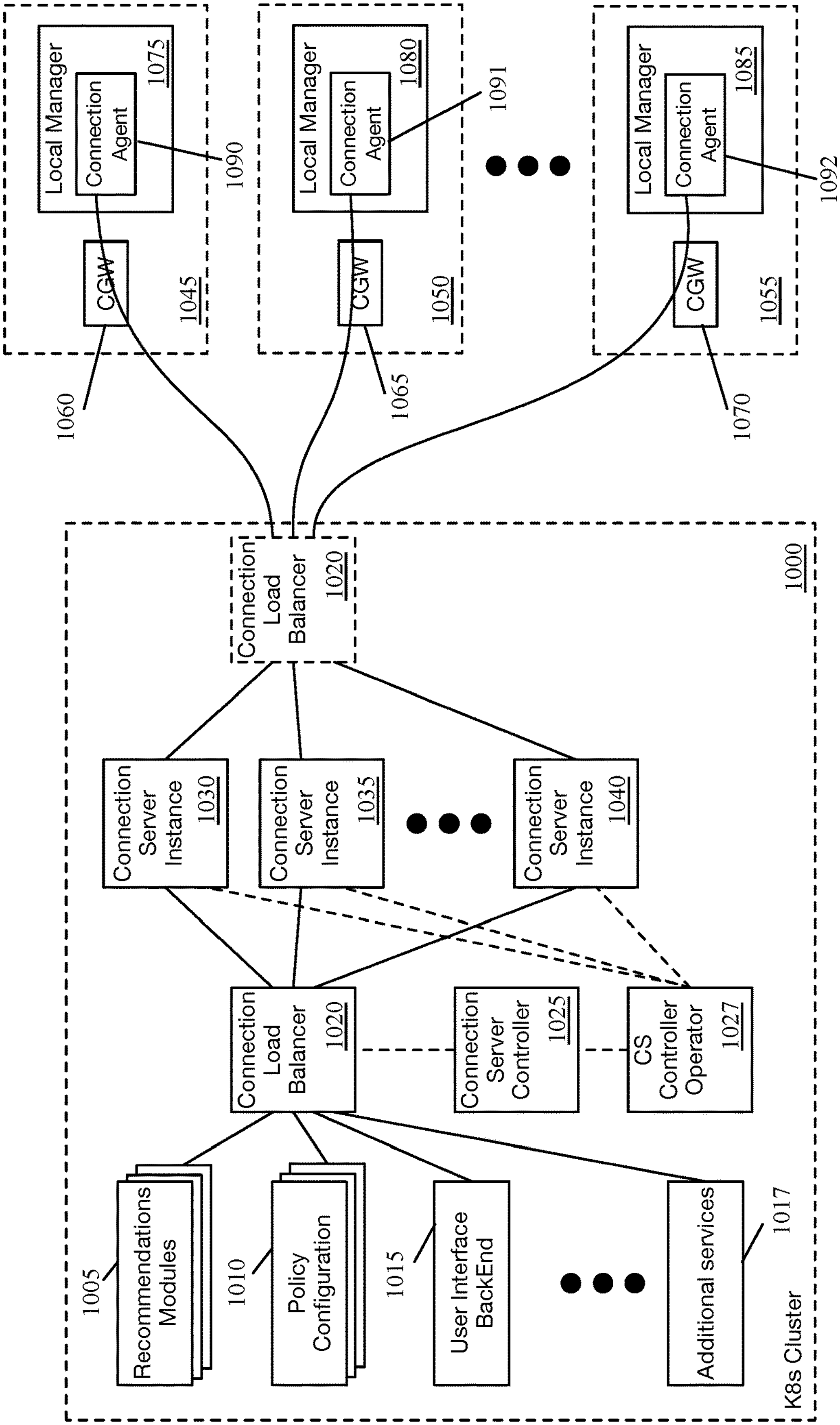
FIG. 10 conceptually illustrates the structure for handling connections between the network management system and the local managers at the datacenters according to some embodiments.

FIG. 10 conceptually illustrates the structure for handling these connections between the network management system and the local managers at the datacenters according to some embodiments. It should be noted that these connections described herein are not necessarily used for all of the communication between the network management system and the datacenters. For instance, in some embodiments, the streaming of flow and context data from the host computers at the datacenters for use by the network monitoring service is sent via different connections (otherwise the large amounts of flow data could occupy too much of the available bandwidth for the connections). Specifically, the connections described herein are primarily used for requests sent from various services of the network management system within the public cloud container cluster and responses sent from the local manager to these services.

As shown, within the container cluster 1000 (where the network management system operates) are a set of service functions 1005-1017, a connection load balancer 1020, a connection server controller 1025, a connection server controller operator 1027, and a set of connection server instances 1030-1040. In addition, the figure shows a set of datacenters 1045-1055 that are managed by the network management system. Within each of these datacenters 1045-1055 is a cloud gateway 1060-1070 and a local manager 1075-1085. In addition to various policy management functions, the local managers 1075-1085 each includes a connection agent 1090-1092 for managing the connection to the network management system.

The datacenters 1045-1055, in some embodiments, include all of the datacenters belonging to all of the datacenter groups managed by the network management system. That is, each of the connection server instances 1030-1040 may be an endpoint for connections from multiple datacenters belonging to multiple different datacenter groups (of multiple tenants). These can include physical on-premises datacenters as well as virtual datacenters operating in the public cloud, or other types of datacenters that connect to the network management system. In some embodiments, the local managers 1075-1085 in the datacenters 1045-1055 (and other entities in the datacenters) are not routable from the public cloud infrastructure (whether these datacenters are on-premises datacenters or are operating in the public cloud) in which the network management system operates because they reside behind firewalls (not shown). As such, entities in the network management system (e.g., the service functions 1005-1017) that need to send requests to the local managers 1075-1085 (e.g., in order to execute commands on these local managers) cannot initiate connections with these local managers.

In this example, these entities include recommendations modules 1005, policy configuration modules 1010, a user interface backend 1015, as well as other services or entities 1017 that communicate with the local managers 1075-1085. In some embodiments, these entities are individual microservices or collections of microservices that are part of one of the services provided by the network management system (e.g., the policy manager service, the network monitoring service, etc.). When there are numerous datacenter groups managed by the network management system, then the cluster 1000 hosts numerous instances of each of the services and thus multiple instances of the service functions 1005 and 1010 (in addition to other service functions), each of which will need to communicate with the datacenters in its respective datacenter group.

The recommendations modules 1005 are each part of a network monitoring service instance that, as described further below, generates microsegmentation-based firewall rule recommendations for a datacenter and provides these firewall rules to the local manager at the datacenter. The policy configuration modules 1010 represent the aspect of the policy manager service that pushes configuration information down to the local manager. In some embodiments, admins will want to remotely access the user interface of a local manager, which is handled via the network management system in the cloud. The admin may also send local policy configuration requests via this interface to the local manager. This function is represented by the local policy user interface module 1015. It should be understood that this is not an exhaustive list of network management system functions that send requests to the local managers.

Because the service functions 1005-1017 cannot initiate connections with the local managers 1075-1085 but need to be able to send requests to these local managers, in some embodiments the connection agents 1090-1092 initiate respective connections with the network management system (i.e., with the connection servers 1030-1040). In some embodiments, these connections are gRPC Remote Procedure Call (gRPC) channels that each uses a TCP connection. Some embodiments use a gRPC channel because http/2 provides connection multiplexing and a server push mechanism on the same TCP connection. Within the TCP connection, the server push mechanism allows the network management system (the server) to send messages to the local manager (the client), with the payload intended to be executed at the local manager.

Figure 11:
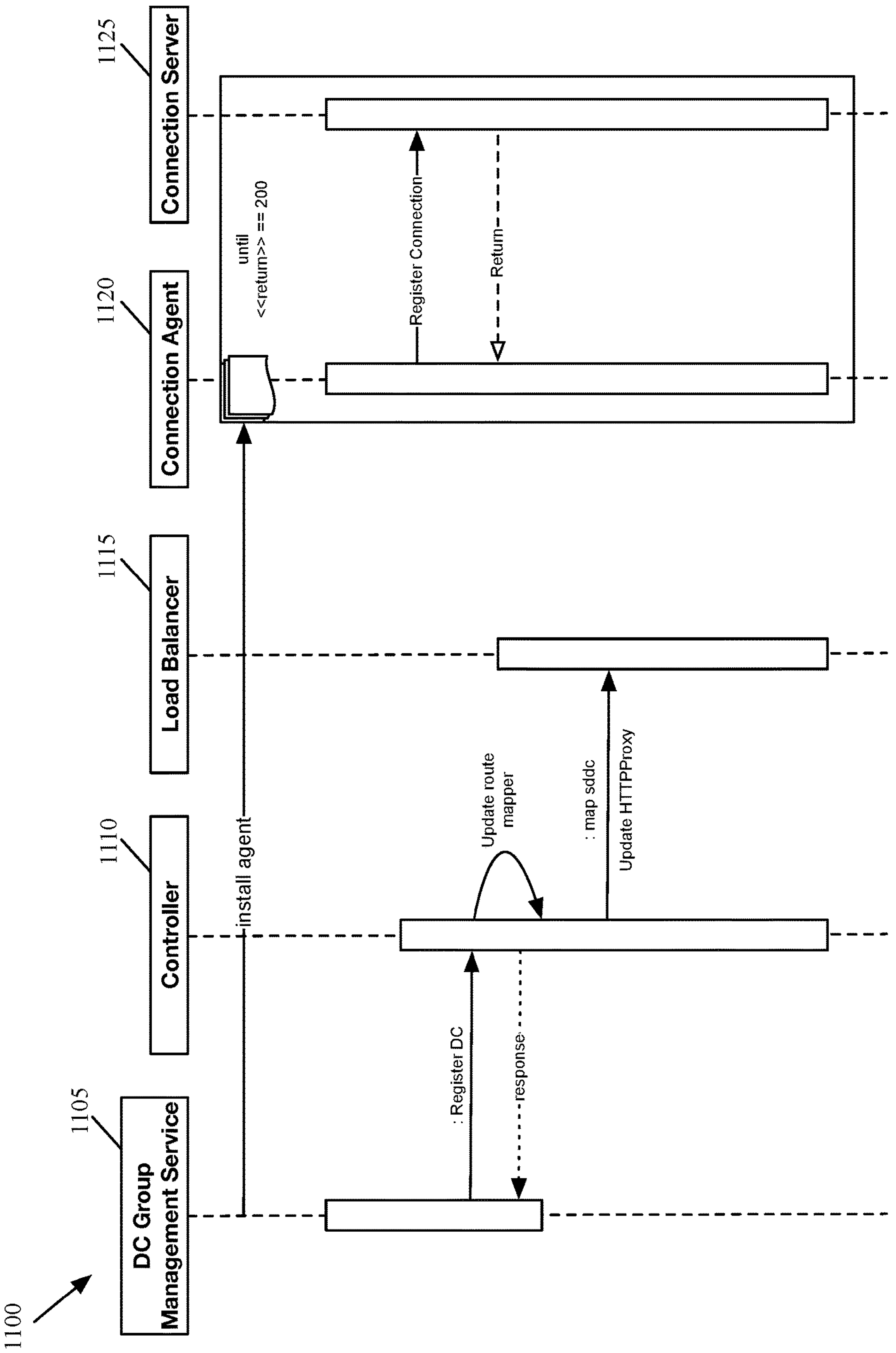
FIG. 11 conceptually illustrates a flow diagram that shows operations related to registering a datacenter for a datacenter group and initiating the connection to be used for that datacenter.

FIG. 11 conceptually illustrates a flow diagram 1100 that shows operations related to registering a datacenter for a datacenter group and initiating the connection to be used for that datacenter. In this diagram 1100, the datacenter group management service 1105 is an entity (e.g., one of the multi-tenant services) of the network management system that manages site registration for the network management system (e.g., the datacenter group management service described above by reference to FIGS. 6 and 7). The controller 1110 (representing the combination of the connection server controller and the connection server controller operator), load balancer 1115, connection agent 1120, and connection server 1125 are the same as the corresponding entities shown in FIG. 10. The operation of these entities will be described further below.

As shown, when a new datacenter is to be added to a datacenter group (or when the datacenter is one of the initial datacenters defined for a datacenter group), the datacenter group management service 1105 transfers an install agent to the datacenter, which enables the installation of the connection agent 1120 on the local manager at the datacenter. As noted, this datacenter could be an on-premises physical datacenter, a virtual datacenter, etc. (the principles of the connections to each type of datacenter are the same in some embodiments).

The connection agent 1120 is configured to, upon installation, attempt to connect to the connection server 1125 (e.g., to a particular network address at which the connection server is reachable) in order to register a stream for the connection. In some embodiments, the agent 1120 sends a stream registration message until it receives a return message from the connection server 1125. However, the connection server 1125, in some embodiments, is not authorized to register the connection until a routing rule is established on the load balancer 1115 by the controller 1110.

Thus, the NMS manager 1105 also sends a registration message for the datacenter to the controller 1110, which performs a route mapping update operation to map the newly added datacenter to a particular one of the connection server instances (i.e., the connection server 1125). The controller 1110 also notifies the load balancer 1115 of this mapping, which the load balancer 1115 uses to forward requests.

Returning to FIG. 10, when one of the entities 1005-1017 sends a request to a particular local manager, this request includes an embedded site identifier. The connection load balancer 1020 is responsible for routing the request to the correct one of the connection server instances 1030-1040. Because the request will be sent over an ongoing connection, each connection agent 1090-1092 connects to only one of the connection server instances 1030-1040. As such, any requests from the network management services 1005-1017 need to be routed to the connection server instance that handles the connection to the correct datacenter. In some embodiments, the connection load balancer 1020 also handles the incoming traffic sent from the connection agents 1090-1092 at the local managers (and is thus shown as an intermediary on either side of the connection servers 1030-1040. Thus, each of the datacenters opens connections to a network address associated with the connection load balancer 1020, which forwards these connections to the appropriate connection server instances. As indicated above, two datacenters in a datacenter group might be connected to two different connection server instances, while a single connection server instance handles connections for multiple different datacenters belonging to different datacenter groups.

The load balancer 1020 could use a consistent hashing algorithm (based on hashing the site identifier) to ensure that these requests for a given datacenter are always routed to the same (correct) connection server instance. However, consistent hashing algorithms (e.g., using bloom filters) tend to break extremely long-lived connections when there is a change in the number of instances across which the connections are balanced (i.e., the connection server instances 1030-1040 in this case). When the number of connection server instances changes, there is usually a time period during which the old connections are routed correctly, but these connections are expected to complete during the course of this time period. After this time period, the connections would be moved (via the hash algorithm) to a different connection server and thus would need to be re-initiated. In the case of the indefinitely open connections between the connection agents 1090-1092 and the connection server instances, the connections do not come to an end until the datacenter is no longer managed by the network management service (or there is a break in the connection for another reason).

Using a single connection server instance would also prevent load balancing from being an issue, but this would pose a scalability problem for the network management system. Thus, the connection server controller 1025 instead configures the load balancer 1020 to statically route incoming requests based on the site identifier. As shown in FIG. 11, this configuration is performed as part of the site registration and on-boarding.

The connection server controller 1025 and connection server controller operator 1027 operate together in some embodiments, either as a single component or as two separate components (based on, e.g., Kubernetes design principles). In some embodiments, the container cluster hosts multiple high-availability (stateless) instances of the controller operator 1027 (i.e., multiple Pods) while only hosting a single (stateless) instance of the controller 1025.

In some embodiments, the controller operator 1027 exposes APIs for registration and de-registration of the connection agents 1090-1092 and handles the process of registering these agents (to register their datacenters) and assigning the corresponding connections to the different connection servers. The controller operator 1027 is also responsible for instantiating and configuring the connection server instances in some embodiments (when needed). The configuration for each connection server instance specifies the datacenters for which the connection server is responsible for handling the connections, in addition to other information.

The connection server controller 1025 is responsible for configuring the load balancer 1020 in some embodiments. Specifically, in some embodiments, the connection server controller 1025 reads configuration files (e.g., custom resource definition (CRD) instances in the case of Kubernetes) for the connection server instances to determine which datacenters are mapped to which connection server instances and writes this information to a configuration file (e.g., a separate CRD) for the load balancer.

Figure 12:
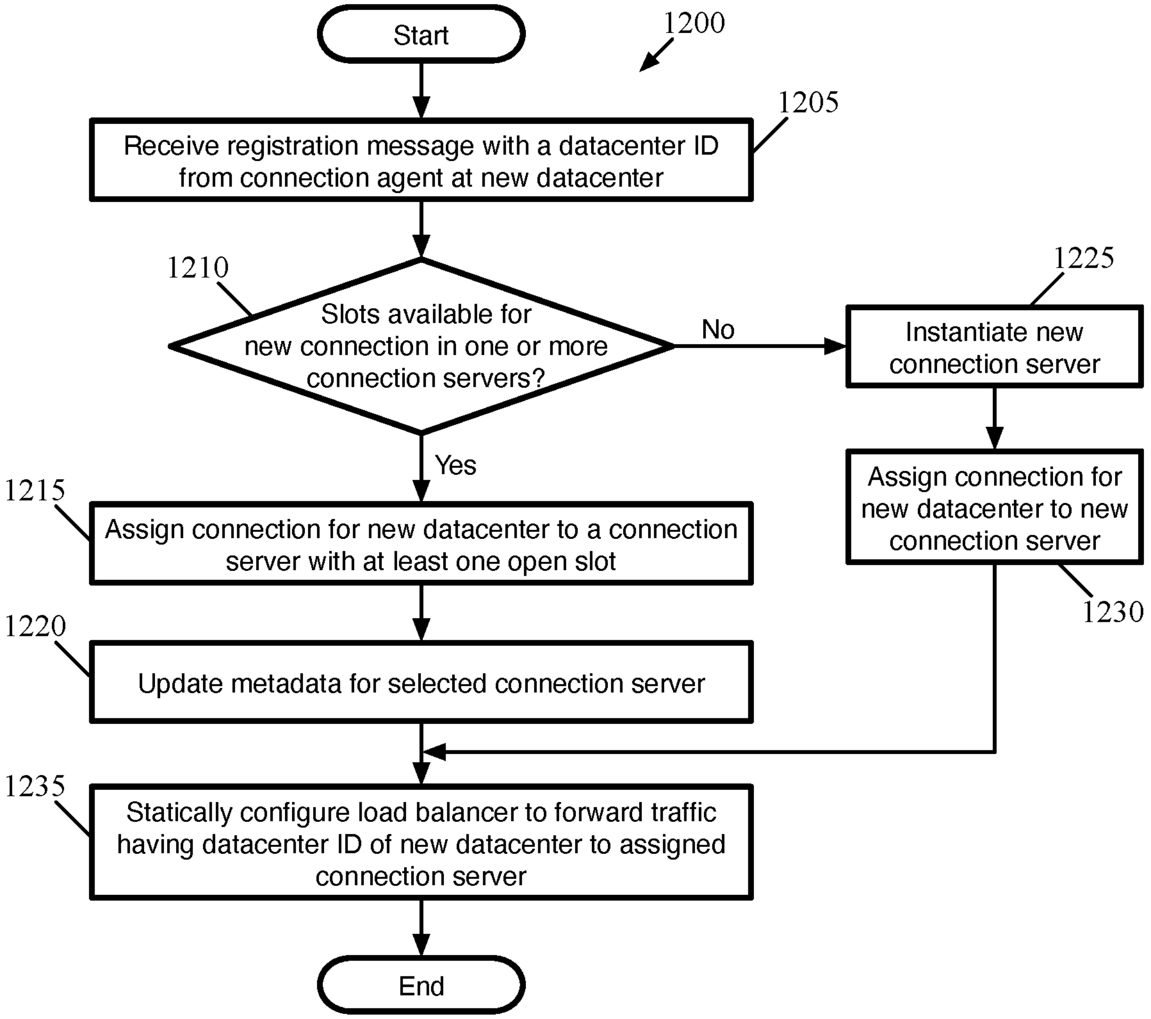
FIG. 12 conceptually illustrates a process of some embodiments for configuring a load balancer to associate traffic for a particular datacenter with a particular one of the connection servers.

FIG. 12 conceptually illustrates a process 1200 of some embodiments for configuring a load balancer to associate traffic for a particular datacenter with a particular one of the connection servers. In some embodiments, the process 1200 is performed by the connection server controller and/or connection server controller operator. In some embodiments, a majority of the operations are performed by the connection server controller operator while a smaller subset of the operations are performed by the connection server controller. The process 1200 will be described by reference to FIGS. 13 and 14, which illustrate configuration definition files for a connection server instance and a load balancer of some embodiments.

As shown, the process 1200 begins by receiving (at 1205) a registration message with a datacenter identifier from the connection agent at the new datacenter (i.e., a datacenter to be newly managed by the network management system; the datacenter may be a pre-existing datacenter or a newly created datacenter). In some embodiments, the connection agent is provided to the local manager at the new datacenter by the datacenter group management service, as described above. The connection agent calls an agent registration API exposed by the connection server controller operator in some embodiments. In some embodiments, as there is no gRPC connection yet opened between the network management system and the connection agent, this connection is received via the API gateway shown above in FIG. 6.

Upon receiving the registration message, the connection server controller assigns the datacenter (and thus the gRPC connection initiated by the connection agent at that datacenter) to one of the connection servers. As shown, the process 1200 determines (at 1210) whether any slots are available for the new connection in one or more of the existing connection servers. When a connection server is instantiated in the cluster, metadata is defined for the connection server that specifies the number of connections that the connection server can handle at a given time. In some embodiments, this metadata is defined within a configuration file (e.g., a CRD instance) for the connection server.

FIG. 13 conceptually illustrates at least a portion of the content of a configuration file (CRD instance) 1300 for a connection server. As shown, the configuration file specifies an API version and a kind (indicating that is for a connection server), as is common to Kubernetes CRDs in some embodiments. The configuration file 1300 also specifies a unique name and namespace for the connection server (i.e., within the namespace "connection_servers" the name "cxn-_server_1" is unique). The configuration file 1300 further specifies (i) the metadata regarding the number of connections that the associated connection server can handle and (ii) datacenter identifiers for the datacenters assigned to that connection server. In this case, the metadata for the connection server specifies that five connections can be assigned to that connection server (the server has five "slots") and that two connections are currently assigned (two of these slots are occupied), so that the connection server can be assigned up to three additional connections. The datacenter identifiers can be specified as exact names (e.g., "site_x") or prefixes (e.g., "customer_1_site") such that all datacenters with that prefix are assigned to the particular connection server.

In some embodiments, the number of connections that a given connection server can handle is based on the CPU and memory allocation for the connection server, while in other embodiments the number of connections is directly assigned by a network administrator. For instance, some embodiments use a statistical mapping based on CPU and memory allocations, such that being within a first range for CPU allocation and a second range for memory allocations maps to a specific number of slots (e.g., a matrix of CPU allocation ranges and memory allocation ranges).

If slots are available in at least one existing connection server, the process 1200 assigns (at 1215) the connection for the new datacenter to a connection server with at least one open slot. Some embodiments use a close packing algorithm to determine to which connection server the new datacenter is assigned. In some embodiments, the connection server controller operator examines the metadata of each of the existing connection servers and assigns the new datacenter to the connection server with the largest number of available slots or the lowest percentage of total available slots that are currently in use, or a similar metric.

The process 1200 also updates (at 1220) the metadata for the selected connection server. In some embodiments, when the connection server controller operator assigns a new datacenter to a particular connection server, the controller operator modifies the configuration file (e.g., the CRD instance) associated with that connection server to (i) specify the datacenter identifier for the new datacenter in the configuration file and (ii) increment the number of connections currently assigned to the connection server.

On the other hand, if all of the currently instantiated connection servers are completely full, the process instantiates (at 1225) a new connection server and assigns (at 1230) the connection for the new datacenter to this new connection server. It should be noted that in other embodiments, the connection server controller operator instantiates a new connection server when all of the existing connection servers are within a threshold of being completely full, rather than waiting until there are no available slots in any of the existing connection servers.

In some embodiments, to create the new connection server, the controller operator calls a container cluster controller (e.g., using a Kubernetes API) to deploy this new connection server. The controller operator also creates a new instance of the configuration file (CRD) associated with the new connection server and specifies its metadata (the total number of available slots, one of which is now in use, as well as the datacenter identifier for the new datacenter).

After the controller operator has assigned the connection for the new datacenter to either a new or existing connection server, the process 1200 statically configures (at 1235) the load balancer to forward traffic having the datacenter identifier of the new datacenter to the assigned connection server. The process 1200 then ends. As described, this is a static configuration (rather than using a consistent hashing scheme) so that changes in the number of connection servers do not cause any of the persistent connections to move between connection servers (which would require re-initiation of the connections). In some embodiments, the connection server controller reads changes made to the connection server configuration files and uses these changes to update the load balancer configuration.

In some embodiments, the connection server controller creates and keeps up to date a configuration file for the load balancer (e.g., a CRD instance). FIG. 14 conceptually illustrates an example of such a load balancer configuration file 1400. As shown, the configuration file 1400 specifies an API version and a kind (indicating that is for a load balancer configuration), as is common to Kubernetes CRDs in some embodiments. The configuration also specifies a unique name and, in some cases, a namespace, for the load balancer configuration. The configuration further specifies the statically configured routes, each of which includes a prefix, a header, and the information about where to route traffic matching that prefix and header. The prefix, as shown, indicates that traffic specifying that it is for an API request is forwarded for all of the routes. The header, in this case, is used to match on the different datacenter identifiers (site_a, site_b, and site_c). For the routes, traffic directed to (or coming from) site_a is sent to a first server (server a) while traffic directed to (or coming from) either site_b or site_c is sent to a second server (server_b).

While the process 1200 describes the registration of new datacenters and creation of new connection servers (as needed), in some embodiments the connection server controller operator also handles de-registration of datacenters as they are removed from the network management system and the deletion of unnecessary connection servers. When a connection agent sends a de-registration command to the connection server controller operator, the controller operator removes the datacenter from the configuration file for its connection server. If this is the only remaining active connection assigned to that connection server, then the controller operator initiates a tear-down of the connection server and deletes the configuration file for the connection server. In either case, the connection server controller detects the change and removes the corresponding route from the load balancer configuration.

In addition, in certain cases, a connection server instance may fail or otherwise be taken down while still handling one or more gRPC connections. In this case, the connection server controller operator 1027 observes this occurrence and reassigns the connections to the other connection servers, starting up a new connection server if needed. In some embodiments, the assignment of these datacenters to the existing (and any new) connection servers occurs using the same technique described by reference to operations 1210-1230. Because the gRPC connections use http/2 wrapped in a TCP connection, the load balancer 1020 automatically sends a disconnect event to each of the connection agents that had previously connected to the failed connection server. These connection agents then re-initiate the connection, and the load balancer at this point directs the connection initiation messages to the updated connection servers.

Once a gRPC connection has been initiated, the various service functions 1005-1017 can stream data (e.g., as API requests) to the local manager that initiated the connection. As described, the connection server is the "server" for the gRPC connection. However, various network management services often need to push data and/or API requests down to the local managers, for which these connections are used. Because the connections are gRPC connections that allows "server push" operations, the connection server that handles the connection to a particular local manager can push requests for that local manager onto the persistent connection (rather than opening a new connection). However, such a request first needs to be routed to the correct connection server.

Figure 15:
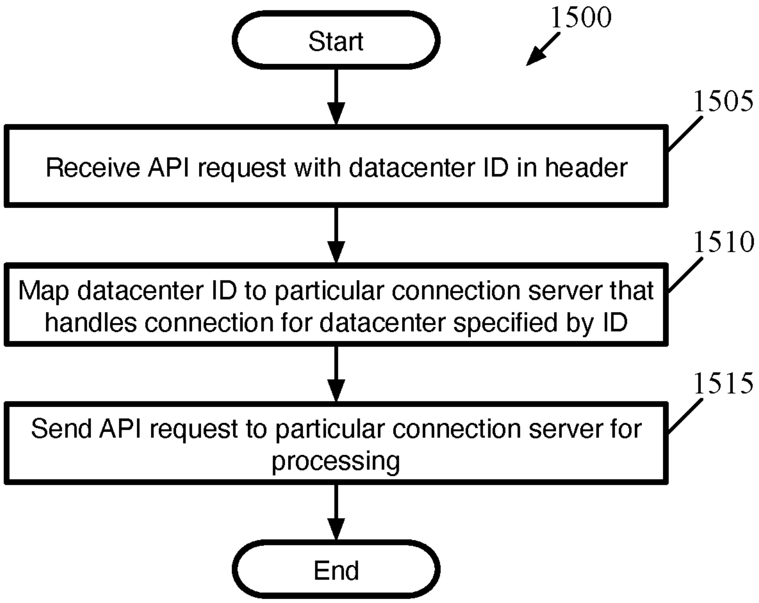
FIG. 15 conceptually illustrates a process of some embodiments for directing an API request to the correct connection server.

FIG. 15 conceptually illustrates a process 1500 of some embodiments for directing an API request to the correct connection server. In some embodiments, the process 1500 is performed by a load balancer (e.g., the load balancer 1020 shown in FIG. 10). This process 1500 (or a similar process) is performed each time one of the services of the cloud-based network management system needs to send an API request to a local manager at one of the datacenters managed by the network management system.

As shown, the process 1500 begins by receiving (at 1505) an API request with a datacenter identifier in the header. In some embodiments, these API requests have a specific format that identify them as API requests, and a specific location in the header for a unique (among all of the datacenters managed by the network management system) datacenter identifier. The API requests are sent from any of a number of the services operating in the network management system, either within the individual service instances or from the common multi-tenant services (e.g., a UI back-end service). The API requests, in some embodiments, are API calls to be executed on the local manager at a particular datacenter.

The process 1500 maps (at 1510) the datacenter identifier from the API request to the particular connection server that handles the datacenter specified by that identifier. In some embodiments, this mapping is based on the configuration file for the load balancer (e.g., the CRD defined by the connection server controller, as shown in FIG. 14). This configuration file, in some embodiments, indicates the particular connection server to which the datacenter identifier maps as well as the port of that connection server to which to send the API request.

Finally, the process 1500 sends (at 1515) the API request to the particular connection server (that handles the connection with the identified datacenter) for processing. The load balancer, in some embodiments, sends the API request through the public cloud (e.g., in the internal) network to the Pod (or other construct) implementing the correct connection server. The process 1500 then ends.

The connection server instances receive these API requests from the various service functions and send them over the correct connections to the correct connection agents based on the datacenter identifiers embedded in each request. The connection server instances also track each request through its completion (i.e., receipt of a response and delivery of that response back to the requesting service function of the network management system).

Figure 16:
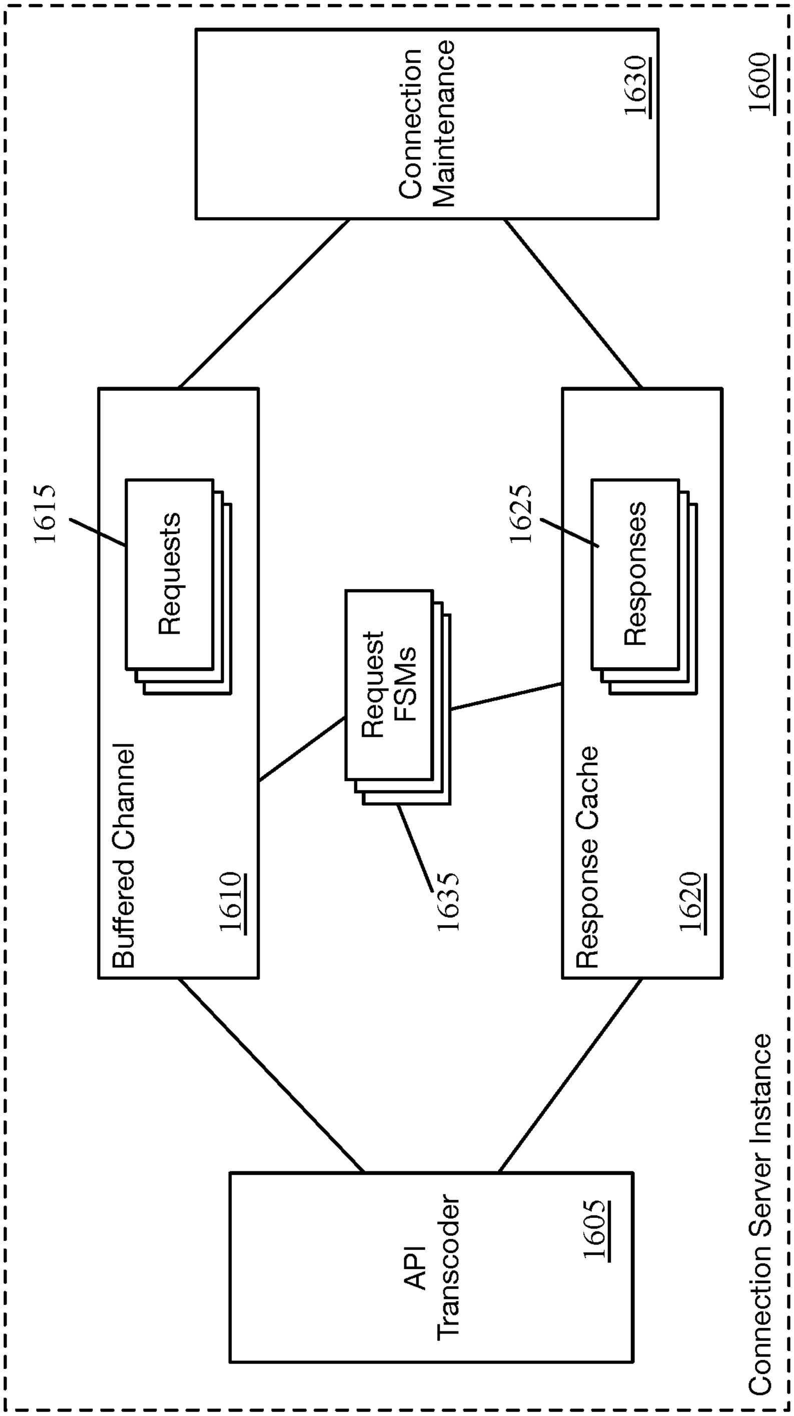
FIG. 16 conceptually illustrates a more detailed view of the architecture of a connection server instance of some embodiments.

FIG. 16 conceptually illustrates a more detailed view of the architecture of a connection server instance 1600 (e.g., one of the instances 1030-1040). As shown, the connection server instance 1600 includes an API transcoder 1605, a buffered channel 1610 for requests 1615, a response cache 1620 for responses 1625, and a connection maintenance module 1630. The connection server 1600 instance also stores request finite state machines 1635.

In some embodiments, the local managers use a representational state transfer (REST) application programming interface (API), and thus the various service functions (recommendations, UI, policy configuration, etc.) send requests as REST API commands using HTTP (for transferring data in JSON format). However, the open TCP connection between the connection agent and connection server uses gRPC because it allows for connection multiplexing on the open TCP connection.

Thus, the API transcoder 1605 receives a request from one of the service functions in JSON format and translates this into the protocol buffer (protobuf) format used by gRPC. Specifically, in some embodiments, the API transcoder 1605 converts the JSON request into a byte array and then converts the byte array into a protobuf request for the same command as the original JSON request.

In some embodiments, the API transcoder 1605 uses its own REST APIs that the service functions address. In such embodiments, the API transcoder 1605 uses a limited number of REST APIs, such that the actual commands to be executed at the local managers are embedded as payloads within the requests from the service functions. For instance, in some such embodiments the API transcoder 1605 exposes a job submission API (e.g., SubmitJob) that enables service functions to make requests, a job query API (e.g., QueryJob) that enables service functions to query the status of a request, and a command send API (e.g., SendCommand) that enables the service functions to send commands to the local managers via a blocking API call. In some embodiments, the payload of these requests and/or commands is the specific request to be executed at the local manager. Based on the type of API request received from the service function (i.e., if the request needs to be sent to the local manager), the API transcoder 1605 performs the translation into a gRPC request with the specific request remaining as the payload. For queries regarding a previously sent request, the API transcoder 1605 does not need to perform a translation, and instead can respond to the query (e.g., using the request finite state machine 1635 for that request, which is described below). In some embodiments, the requests from the service functions include site identifiers (i.e., as part of the outer API command).

The requests for the local managers are processed asynchronously in some embodiments, because there are multiple hops of potential failure that the call needs to traverse (e.g., transcoding, streaming through network, cloud gateway, connection agent, etc.) After performing the translation for a request, the API transcoder then places the request into the buffered channel 1610. In some embodiments, each connection server instance 1600 uses one buffered channel for all of the requests, irrespective of the datacenter to which each request is sent. In other embodiments, each connection server instance uses individual buffered channels for each different stream for which it is the server (i.e., separate buffers for each connection).

The buffered channel 1610 holds the requests 1615 (in protobuf format) until they can be sent out over the appropriate stream. The buffered channel 1610 (or another module of the connection server instance 1600 that manages the buffered channel) selects the correct connection for each request based on the site identifier associated with the request and pushes the request onto the open connection for that datacenter.

The connection maintenance module 1630 maintains the connections handled by the server instance 1600 with various datacenters. As mentioned, these datacenters whose connections are assigned to a given server instance 1600 may belong to various different datacenter groups of different tenants (or multiple datacenter groups for the same tenant).

When a request is initiated, the connection server also creates and stores a finite state machine 1635 for the request in some embodiments. These finite state machines 1635 are distributed, in that they are maintained at both the connection server and the connection agent. The finite state machines 1635, which are described in more detail below by reference to FIG. 18, track the state of each request received at the connection server instance 1600.

When a response is received back from the connection agent over the open TCP connection with that agent, this response 1625 is placed in a response cache 1620. The responses 1625 can provide information retrieved from the local manager (e.g., for a UI request) or simply an acknowledgment that a command was executed at the local manager (e.g., that a set of firewall rules were configured). In some embodiments, each request 1615 sent to a connection agent includes a request identifier generated by the connection server instance 1600. This request identifier is then used in the response 1625 so that the connection server instance 1600 can map the responses 1625 to the appropriate requests 1615. In some embodiments, the response is automatically pushed back to the service function that initiated the corresponding request. In other embodiments, the service functions regularly query for responses to their commands (e.g., using the QueryJob API mentioned above) and a response is only provided back to a service function in response to a query.

Figure 17:
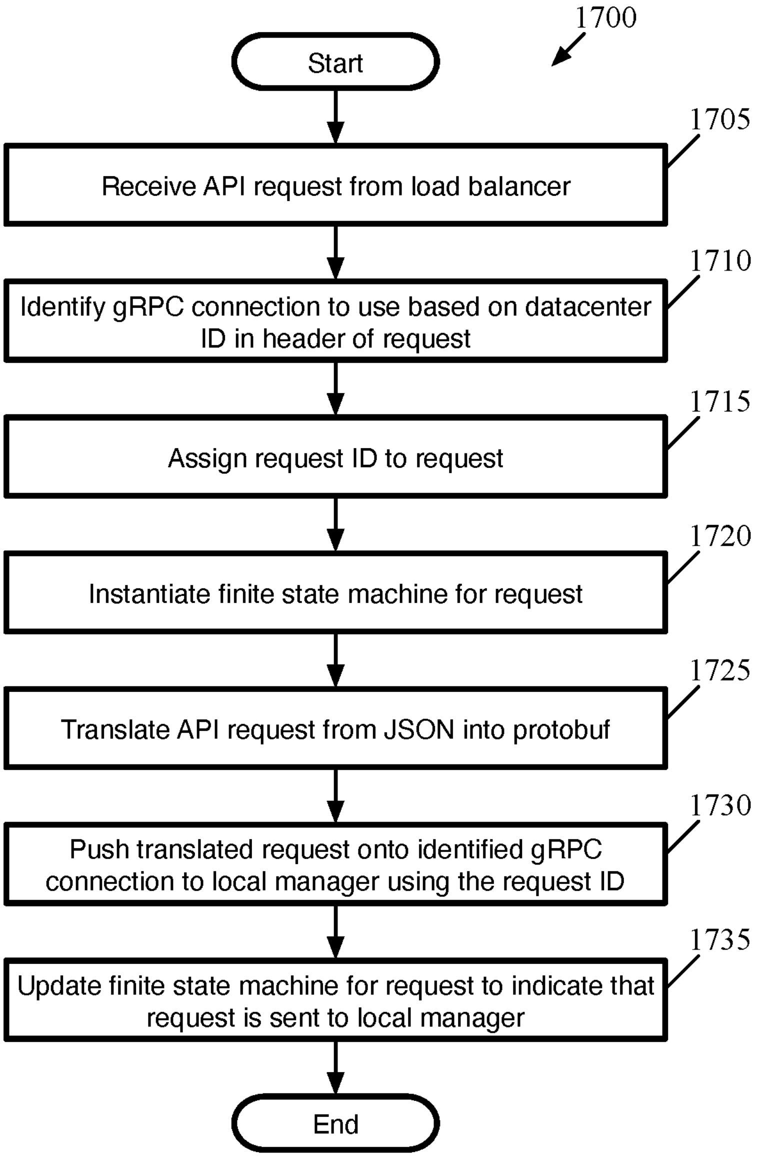
FIG. 17 conceptually illustrates a process of some embodiments for handling an API request.

FIG. 17 conceptually illustrates a process 1700 of some embodiments for handling an API request. In some embodiments, the process 1700 is performed by a connection server (e.g., the connection server instance 1600) after a load balancer has sent the API request to that connection server. The process 1700 (or similar processes) may be performed repeatedly by each connection server instance of a cloud-based network management system for each API request sent by the network management system services to the local managers at the datacenters.

As shown, the process 1700 begins by receiving (at 1705) an API request from a load balancer. In some embodiments, the load balancer would have performed the process 1500 (or a similar process) in order to forward the API request to the correct connection server instance. The API request, as indicated above, would still include a datacenter identifier in its header, as the load balancer does not remove this information from the request.

Next, the process 1700 identifies (at 1710) the gRPC connection to use for the API request based on the datacenter identifier in the request header of the request. In some embodiments, each connection server instance maintains a mapping of datacenter identifiers to gRPC connections, updating these mappings as the connections are instantiated. As described, each connection server instance handles connections for numerous different datacenters, so it is critical that API requests are pushed on the connection to the correct datacenters.

The process 1700 also assigns (at 1715) a request identifier to the request and instantiates (at 1720) a finite state machine for the request. Multiple (potentially numerous) API requests may be pending simultaneously for a single datacenter (i.e., over a single gRPC connection), so the connection server assigns unique request identifiers to each of these requests, which are used to ensure that the responses from the local manager are matched up with the correct requests. In some embodiments, the request identifiers are also provided back to the service function that initiated the request so that these service functions can query for the state of the request.

Figure 18:
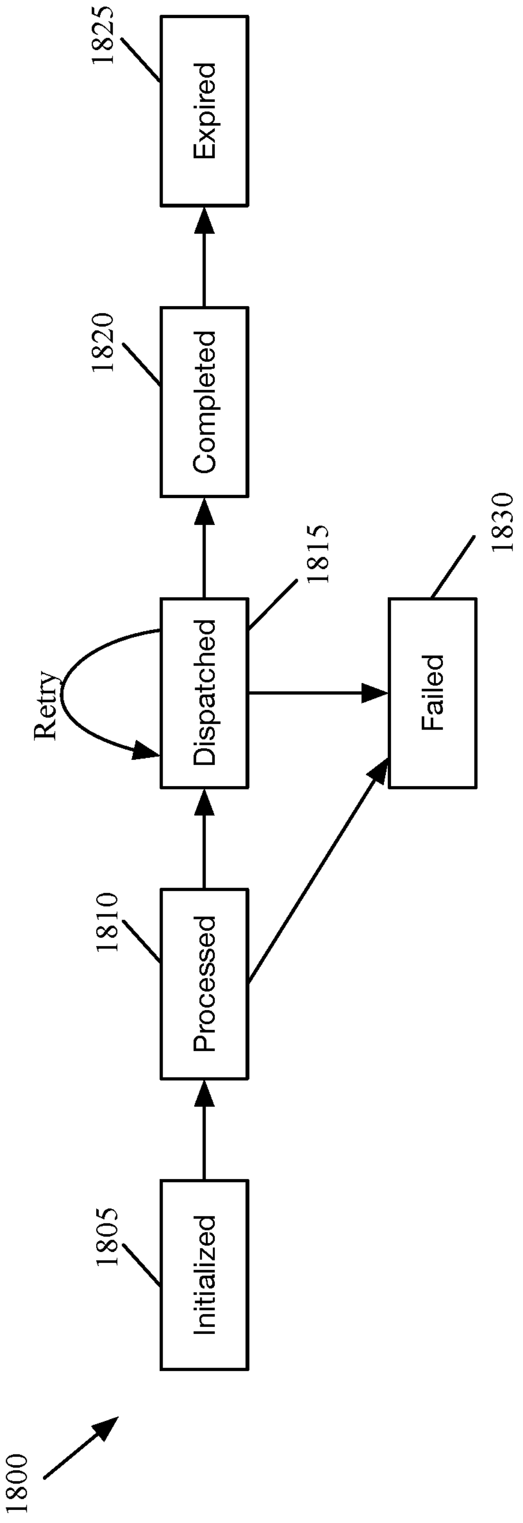
FIG. 18 conceptually illustrates a finite state machine of some embodiments for a request.

As indicated above, the connection server instances instantiate and store individual finite state machines for each API request that they handle, which are used to track the state of the request until a response is provided back to the service that initiated the request. FIG. 18 conceptually illustrates a finite state machine 1800 of some embodiments for a request. The finite state machine 1800 could be created at a connection server instance or at a connection agent. In some embodiments, the potential states for the finite state machines are the same at both the connection server and connection agent. In other embodiments, the potential states for each request at the connection agent are a subset of the potential states at the connection server, because some of the states relate to processing of a request prior to its being sent to the connection agent. Upon receiving a request, a connection server instance creates a finite state machine 1800 for the request and sets the state machine 1800 to the initialized state 1805. The request identifier for the request is also associated with the state machine 1800.

Returning to FIG. 17, the process 1700 translates (at 1725) the API request from JSON into protobuf. As described, in some embodiments, the local manager uses a REST API and the various service functions send requests as REST API commands in JSON format, but the gRPC connection transfers data in protobuf format. As such, the connection servers translate the requests into protobuf format (e.g., by converting the JSON into a byte array and then converting this byte array into a protobuf request for the same command as the original JSON request). In addition, as described above, the actual requests to be executed at the local manager are payloads of the API requests sent to the connection server in some embodiments.

The process 1700 then pushes (at 1730) the translated request onto the gRPC connection to the local manager (i.e., to the connection agent at the local manager) along with the request identifier. In some embodiments, the datacenter identifier is removed from the request during translation and is not sent to the local manager (as the datacenter identifier is no longer needed for disambiguation once the request is pushed onto the gRPC channel). The request identifier is used to match up the response with the request (as the requests are asynchronous in some embodiments), and thus needs to be sent to the local manager.

Finally, the process 1700 updates (at 1735) the finite state machine for the request to indicate that the request has been sent to the local manager, then ends. Upon sending the request to the agent, the connection server transitions the state machine 1800 for that request to the processed state 1810. In some embodiments, when the connection agent receives the request, the agent sends an acknowledgment back to the server, indicating that it has received the request.

Upon concluding that the agent has received the request, the server transitions the state machine 1800 to the dispatched state 1815.

The agent also sends back a response (e.g., requested data, an acknowledgment of completion, etc.) once the request has been processed by the local manager. This response, in some embodiments, includes the request identifier, allowing the connection server to match the response to its corresponding request and to the finite state machine for the request. When the connection server receives this response, it moves its copy of the state machine 1800 for that request to the completed state 1820. After an expiration time period, the server transitions the state machine to the expired state 1825. Some embodiments delete the state machines after this expiration period or after another time period (e.g., to save memory).

From either the processed state 1810 or the dispatched state 1815, the state machine 1800 for a request can be set to the failed state 1830. In some embodiments, a time to live (TTL) is set for each request (e.g., 10 minutes). If the request is not complete after this TTL expires (whether the state machine is currently in the processed state 1810 or the dispatched state 1815), the request is considered failed. For instance, if the request does not make it to the agent, the agent acknowledgment does not make it back to the server, the agent is unable to execute the request, or the response does not make it to the server, then the server transitions the state machine 1800 for that request to the failed state 1830.

Figure 19:
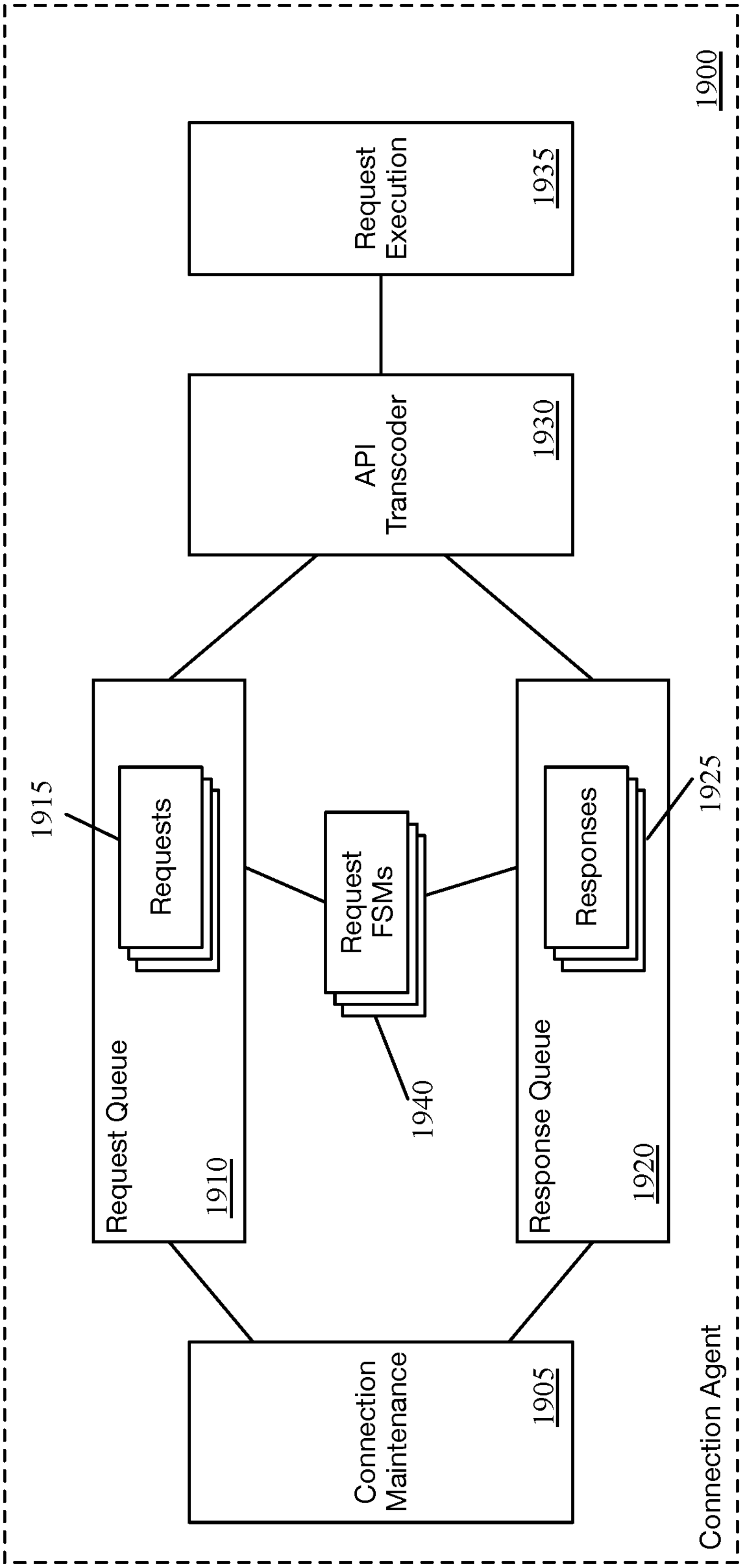
FIG. 19 conceptually illustrates a more detailed view of the architecture of a connection agent of some embodiments.

FIG. 19 conceptually illustrates a more detailed view of the architecture of a connection agent 1900 of some embodiments (e.g., one of the connection agents 1090-1092). As shown, the connection agent 1900 includes a connection maintenance module 1905, a request queue 1910 for requests 1915, a response queue 1920 for responses 1925, an API transcoder 1930, and a request execution module 1935. The connection server 1900 also stores request finite state machines 1940. Like the connection server, the connection agent 1900 also maintains a finite state machine 1940 for each of the requests.

The connection maintenance module 1905 on a connection agent only needs to maintain a single TCP connection with one of the connection servers (as compared to the corresponding module on a connection server that maintains connections with many agents). In some embodiments, the connection agent 1900 (as the client in the connection with the server) uses multiple different RPC methods to communicate with the server. In order to receive requests, in some embodiments the client initiates a UnaryRequest connection that is used to stream request data from the connection server. In some embodiments, this is the standing connection described above. Via this connection, the connection agent 1900 receives requests 1915 from the connection server instance, which are placed into the request queue 1910.

In some embodiments, either the request queue 1910 (or another module of the connection agent managing the request queue 1910) pushes requests from the queue to the API transcoder 1930. The API transcoder 1930, in some embodiments, translates the gRPC protobuf request into a JSON format REST command to be executed on the local manager. In some embodiments, this REST command is the payload of the gRPC request, so the API transcoder 1930 converts this protobuf data contained within the gRPC request into the correct JSON format API call on the local manager.

The request execution module 1935 represents a set of modules that interact with the local manager to execute these requests. The request execution module 1935 executes these requests to modify the local configuration at the local manager, request information from the local manager about its configuration, etc. In some embodiments, the connection agent 1900 receives authentication tokens from the network management system (e.g., as part of its installation or via communication that is separate from the open connection to the server instance). These tokens are used to perform any necessary role-based access control with the local manager, as the tokens have the requisite permissions to execute the APIs on the local manager. Upon receiving data (e.g., requested information, confirmation of completion of a policy change, etc.) from the local manager, the request execution module 1935 writes this response 1925 into the response queue 1920.

The connection maintenance module 1905 (or a separate module) pulls responses 1925 from the response queue. In some embodiments, each response is sent back to the connection server via a separate UnaryResponse RPC on the existing TCP connection. Unlike the streaming RPC used for the requests, this call simply sends the response back (with the request identifier so that the connection server can match the response to the request) and does not involve any streaming.

It should be understood that the architectures of the connection server 1600 and connection agent 1900 shown in FIGS. 16 and 19 are merely examples. In other embodiments, these entities may include other modules. In addition, the modules shown may be combined or divided into multiple different modules.

Figure 20:
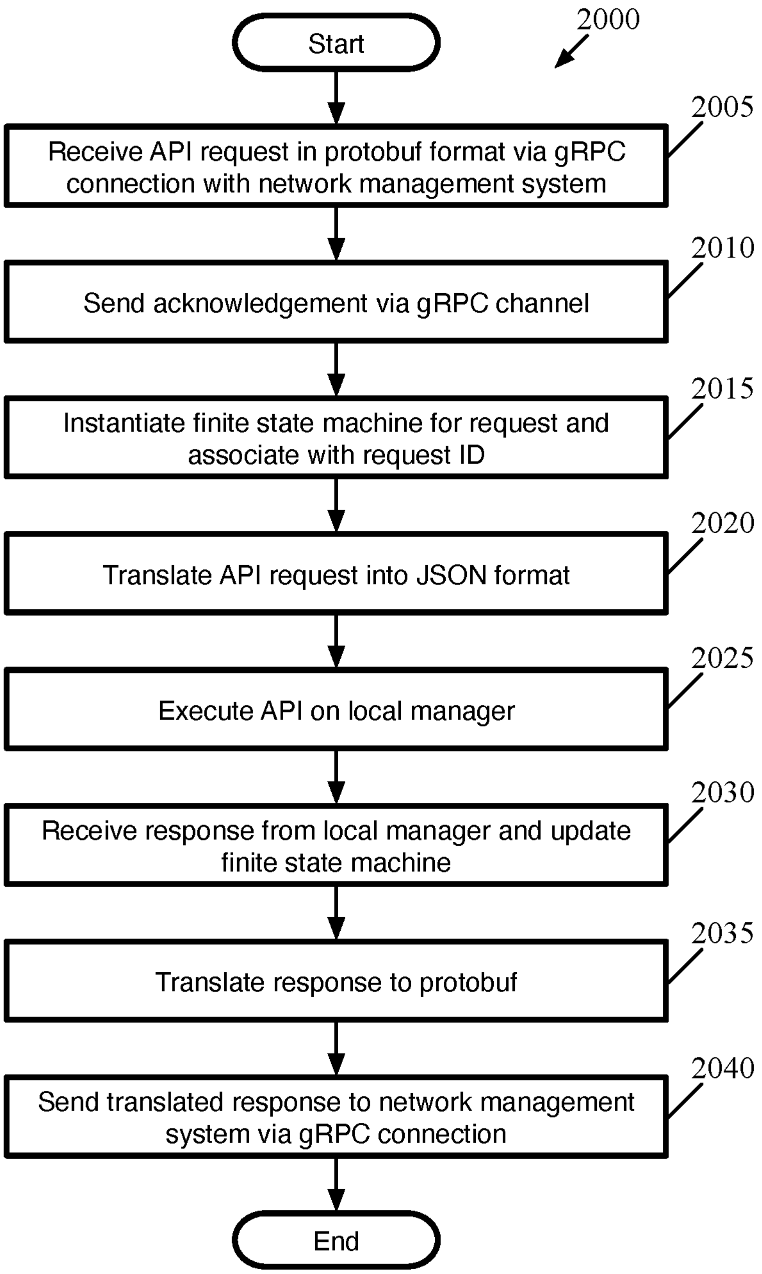
FIG. 20 conceptually illustrates a process of some embodiments for executing an API request from the cloud-based network management system at the local manager.

FIG. 20 conceptually illustrates a process 2000 of some embodiments for executing an API request from the cloud-based network management system at the local manager. In some embodiments, the process 2000 is performed by the connection agent (e.g., the agent 1900) when the connection server to which it connects sends an API request for the local manager at which the connection agent resides. The process 2000 (or a similar process) may be performed repeatedly by a given connection agent for each API request that it receives (due to the asynchronous execution of the API requests, many iterations of the process may overlap in time).

As shown, the process 2000 begins by receiving (at 2005) an API request in protobuf format via the gRPC connection with the network management system (i.e., with a connection server of the network management system). Although the connection agent is the “client” in this connection, the connection server is able to push API requests onto the connection. As received by the connection agent, the API request includes a request identifier (but not necessarily a datacenter identifier) in some embodiments.

The process 2000 sends (at 2010) an acknowledgment via the gRPC channel, thereby notifying the connection server that the API request has been received at the agent. The acknowledgment includes the request identifier, which allows the connection server to update its finite state machine for the request (e.g., to transfer the finite state machine to the dispatched state 1815).

The process 2000 also instantiates (at 2015) a finite state machine for the request on the connection agent and associates this finite state machine with the request identifier. The connection agents on the local managers store similar finite state machines for each API request that they process, similar to the finite state machines stored at the connection servers. In some embodiments, the connection agent automatically initializes its copy of the state machine 1800 in the dispatched state 1815, assuming that the acknowledgment is sent to the connection server.

Next, the process 2000 translates (at 2020) the API request into JSON format. In some embodiments, the desired REST command is the payload of the gRPC request, so the connection agent converts the protobuf data contained within the gRPC request into the correct JSON format API call on the local manager (i.e., the original JSON API call as sent by the network management service function).

With the API request translated, the process 2000 executes (at 2025) the API request on the local manager. In some embodiments, the connection provides the API request to the local manager so that the local manager can execute the API request. This may entail modifying the logical network policy configuration for the datacenter, retrieving specific requested data, or performing another action or set of actions.

The process 2000 then receives (at 2030) a response from the local manager and updates the finite state machine. The response can include requested data (e.g., for presentation in a UI), an acknowledgment of completion of requested changes, or other information. The agent updates the finite state machine for the request to the completed state 1820 to indicate that the request has been executed (and thus does not need to be executed again).

Finally, the process 2000 translates (at 2035) the response back into protobuf format and sends (at 2040) the translated response to the network management system (i.e., to the connection server) via the gRPC connection. The process 2000 then ends. This response includes the request identifier in some embodiments, allowing the connection server to match the response with its request. When the server receives this response, it moves its own finite state machine 1800 to the completed state 1820. After an expiration time period, both the server and the agent transition their respective state machines to the expired state 1825. Some embodiments delete the state machines after this expiration period or after another time period (e.g., to save memory).

From either the processed state 1810 or the dispatched state 1815, the state machine 1800 for a request can be set to the failed state 1830. In some embodiments, a time to live (TTL) is set for each request (e.g., 10 minutes). If the request is not complete after this TTL expires (whether the state machine is currently in the processed state 1810 or the dispatched state 1815), the request is considered failed. For instance, if the request does not make it to the agent, the agent acknowledgment does not make it back to the server, the agent is unable to execute the request, or the response does not make it to the server, then the server transitions the state machine 1800 for that request to the failed state 1830.

The state machines 1800 stored at the connection server and connection agent have several potential uses. For instance, if a service function wants to query the status of a request, it can send a query API command to the connection server using the request identifier for that request. The connection server can use the state machine for that request identifier to quickly provide the status of the request to the service function. The state machines can also be used to notify the requesting service function of the completion upon transition to the completed state 1820. Some embodiments also use the state machines to send data to a metrics monitoring tool.

In addition, in some embodiments the state machines on both the connection server and connection agent are used to determine whether requests should be retried or not. For instance, if a command to modify configuration at the local manager is received at the agent, then the server state machine for the request would be in the dispatched state 1815. If the connection dies or the server is restarted (e.g., after crashing, with the state machine cached), then the server may attempt to retry this request after the server/connection is backed up (e.g., by crawling through the cached state machines to identify those that need to be retried). However, the state machine would specify that the agent has received the request, and thus the request does not need to be resent. Instead, the connection server can send a call for the response for that request to the agent.

On the other hand, if a state machine for a request is in the processed state 1810 after restart, then the connection server will republish that request. If the agent had in fact received the request and executed it, but was unable to send the acknowledgment (or the eventual response) back to the server, then the agent will not re-execute the request, but can instead send the corresponding response back to the server.

Figure 21:
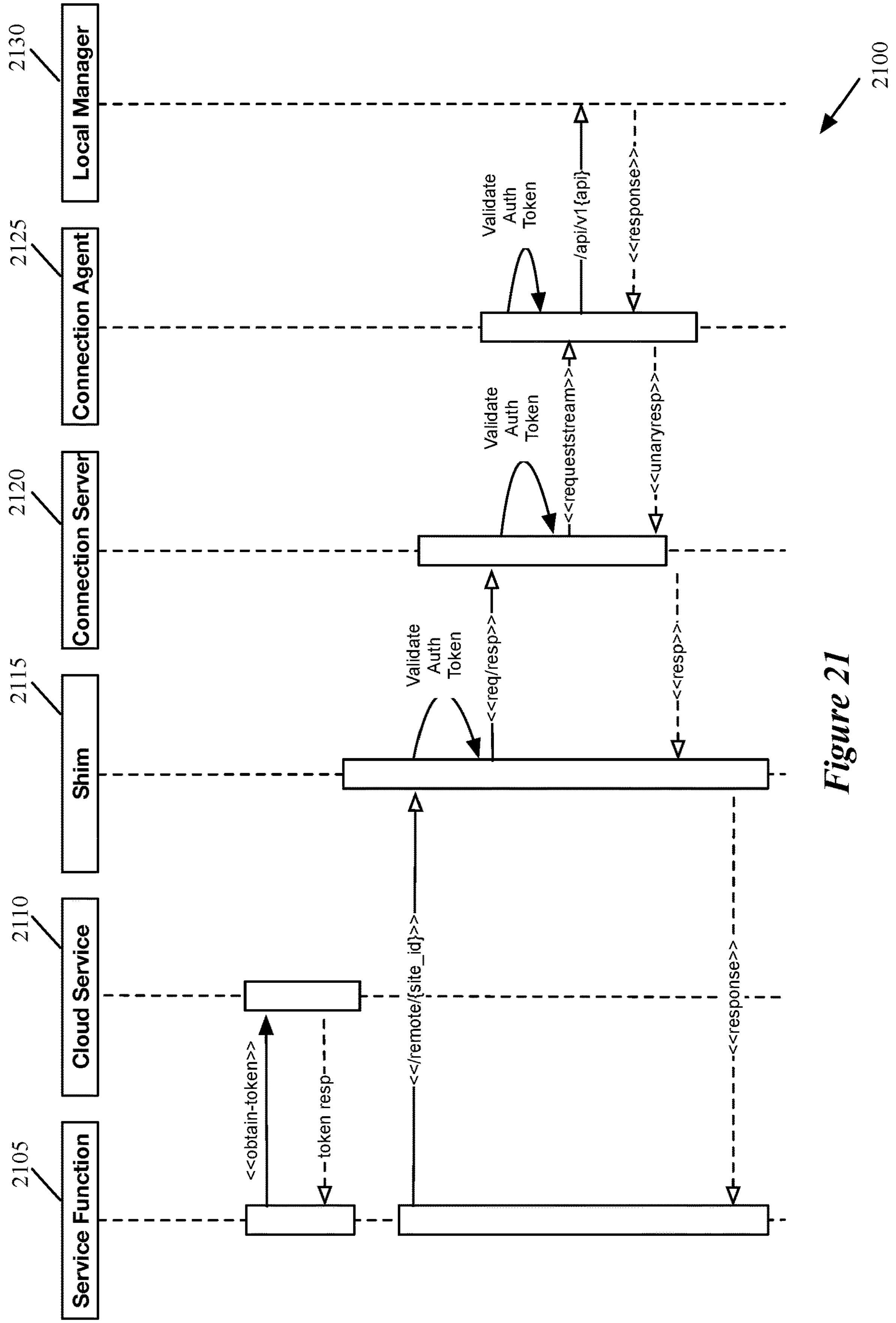
FIG. 21 conceptually illustrates a flow diagram that shows operations related to an individual API request.

FIG. 21 conceptually illustrates a flow diagram 2100 that shows operations related to an individual API request. This flow diagram assumes that the streaming connection has been setup (e.g., as shown in FIG. 11). These operations may be performed thousands (if not millions) of times over a given connection. In this diagram, the service function 2105, connection server 2120, connection agent 2125, and local manager 2130 are the same as the corresponding entities described above. The cloud service 2110 is the cloud service platform on which the network management service (and thus the connection server 2120) is hosted. The shim 2115 is a forward proxy of the connection server in some embodiments and acts as an intermediary between the service function 2105 and the connection server 2120 in some embodiments. In other embodiments, this shim 2115 is eliminated and the service function 2105 interacts directly with the connection server.

As shown, the service function 2105 (e.g., a user interface, recommendations module, policy configuration, etc.) initially requests a token from the cloud service platform at which the network management system is implemented. Using this as a bearer token, the service function 2105 sends its request for a remote site (using the site identifier) to the connection server (via the shim 2115). The shim 2115 validates the authentication token and proxies this request to the connection server 2120. The connection server 2120 also validates the authentication token and streams the request to the connection agent 2125.

The connection agent 2125 performs its own validation of the authentication token and executes the request as an API on the local manager 2130. After execution of the request, the response is then propagated back from the local manager 2130 to the connection agent 2125 to the connection server 2120 (via a unary response RPC call) to the shim 2115 and, finally, to the service function 2110 that sent the request in the first place.

Among the data streamed between over the gRPC channel, in some embodiments, is any changes to the policy configuration made at either the datacenters or the central policy manager service instance. In some embodiments, when a datacenter is initially registered to a datacenter group and the policy manager service is implemented for that datacenter group, the local manager at that datacenter provides its local datacenter policy configuration to the centralized policy manager service managing that datacenter from the cloud. The policy manager service incorporates this configuration into a global policy configuration (alongside any other configurations from other datacenters in the datacenter group) so that a network admin can view the configuration by logging into the policy manager service instance. As the local policy configuration is changed at the local manager of a particular datacenter, those changes are provided to the policy manager service instance so that it can update its global configuration.

A network admin can make certain changes (e.g., adding security policies or logical network elements) to the local configuration of a datacenter at the policy manager service instance. In some embodiments, changes made at the policy manager service instance to the local policy configuration for a given datacenter are pushed (e.g., via the open gRPC connection) to that datacenter to be incorporated into the local configuration. In addition, the network admin can define and modify global policy configuration at the policy manager service instance. This global policy configuration is pushed to all of the datacenters (or a subset of the datacenters if defined as such) in some embodiments, also via the open gRPC connection.

Figure 22:
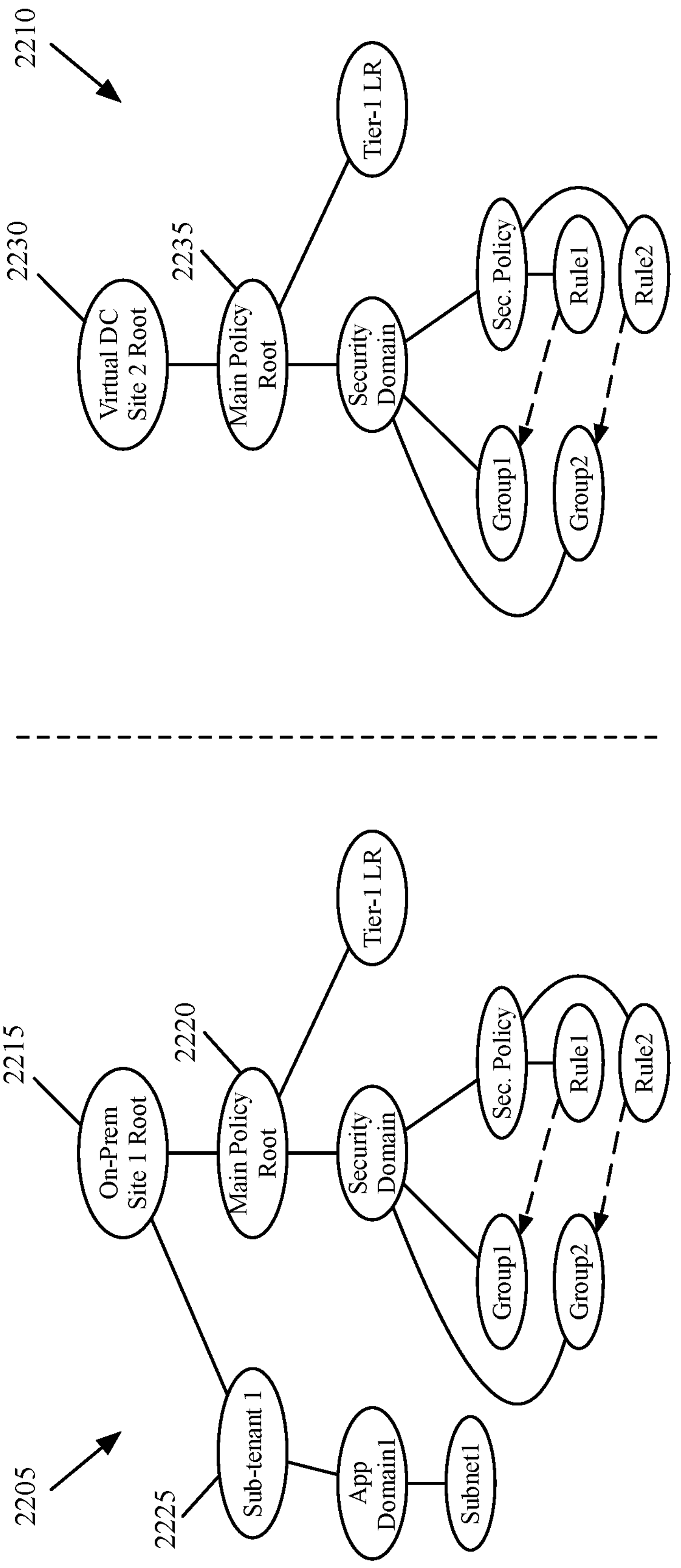
FIG. 22 conceptually illustrates policy configurations for two datacenters to be added to a datacenter group.

FIG. 22 conceptually illustrates policy configurations 2205 and 2210 for two datacenters to be added to a datacenter group. In some embodiments, as shown, the policy configurations 2205 and 2210 are stored as policy trees. In this case, the policy configuration 2205 for the first site (a physical on-premises datacenter) and policy configuration 2210 for the second site (a virtual datacenter operating in the public cloud) are defined at individual local managers at these two sites (e.g., by separate users or the same network admin logging in separately to the two local managers).

The policy configurations 2205 and 2210 are similar in structure. In some embodiments, each of the configurations 2205 and 2210 includes a site root node with a main site policy root node underneath. That is, the first site policy configuration 2205 includes a site root node 2215 with a main site policy root node 2220 while the second site policy configuration 2210 includes a site root node 2230 with a main site policy root node 2235.

The configuration for the first site 2205 also includes a sub-tenant root node 2225. In some embodiments, the policy configuration data model allows the configuration of sub-tenants (also referred to as "projects"). The network management system allows separate access for these sub-tenants in some embodiments, who are only able to access their portion of the policy configuration. For instance, an organization can create separate policy configuration domains for different divisions within the organization (e.g., human resources, finance, research and development, etc.). Similarly, a service provider (e.g., a telecommunications service provider) can define sub-tenant policy configuration domains for different customers of theirs. A sub-tenant can only access their own policy configuration domain, they cannot view or modify the main policy configuration domain or the policy configuration domains of other sub-tenants (in certain cases a sub-tenant can connect to certain aspects of the main policy configuration domain that are exposed by the main tenant).

Within the separate policy configuration tree for the sub-tenant, the sub-tenant has created an application domain. In some embodiments, either within a sub-tenant policy or in the primary datacenter policy, the network management system allows for the creation of application domains. These application domains can be defined by, e.g., application developers, who can access certain features and define certain policy within the application domain (e.g., subnets and application requirements) but cannot affect other security or networking policy for the rest of the sub-tenant policy configuration. These application domains are described in greater detail in U.S. Pat. No. 11,343,227, which is incorporated herein by reference.

Within the main policy configuration, a tenant can define security policy as well as logical networking policy. The main policy configuration 2220 for the first site includes one security domain, which is a configuration structure used to define security groups and policies that can use those groups. Within this security domain, the tenant has defined multiple security groups as well as a security policy having rules that use those security groups. These security rules are enforced by various network elements within the first on-premises datacenter. In addition, for the networking configuration, the tenant has defined a logical router. In some embodiments, tenants can also define various aspects of the logical router (where any logical router gateways are implemented, stateful services to be applied at such gateways, etc.), as well as additional logical networking constructs underneath the logical router (e.g., logical switches that connect to the logical router). The logical networking configuration is also enforced by various network elements (e.g., software virtual switches and virtual routers operating on host computers as well as network elements on edge gateway devices).

In this example, the tenant has defined a similar main policy configuration 2235 at the second (virtual) datacenter. This policy configuration also includes one security domain with a similar structure of two security groups and a security policy having two rules referencing those groups, as well as a single logical router for the logical networking configuration. For this datacenter, the tenant has not defined any sub-tenants so only the main policy configuration 2235 is defined.

When the tenant defines a datacenter group including these two datacenters at the cloud-based network management system and enables policy management service for this datacenter group, the policy management service retrieves the policy configurations from the local managers at the datacenters (after the sites have registered and authenticated with the network management system). In some embodiments, the local manager at each site is configured with information specifying how to reach the cloud-based network management system and streams its policy configuration data to the site.

Figure 23:
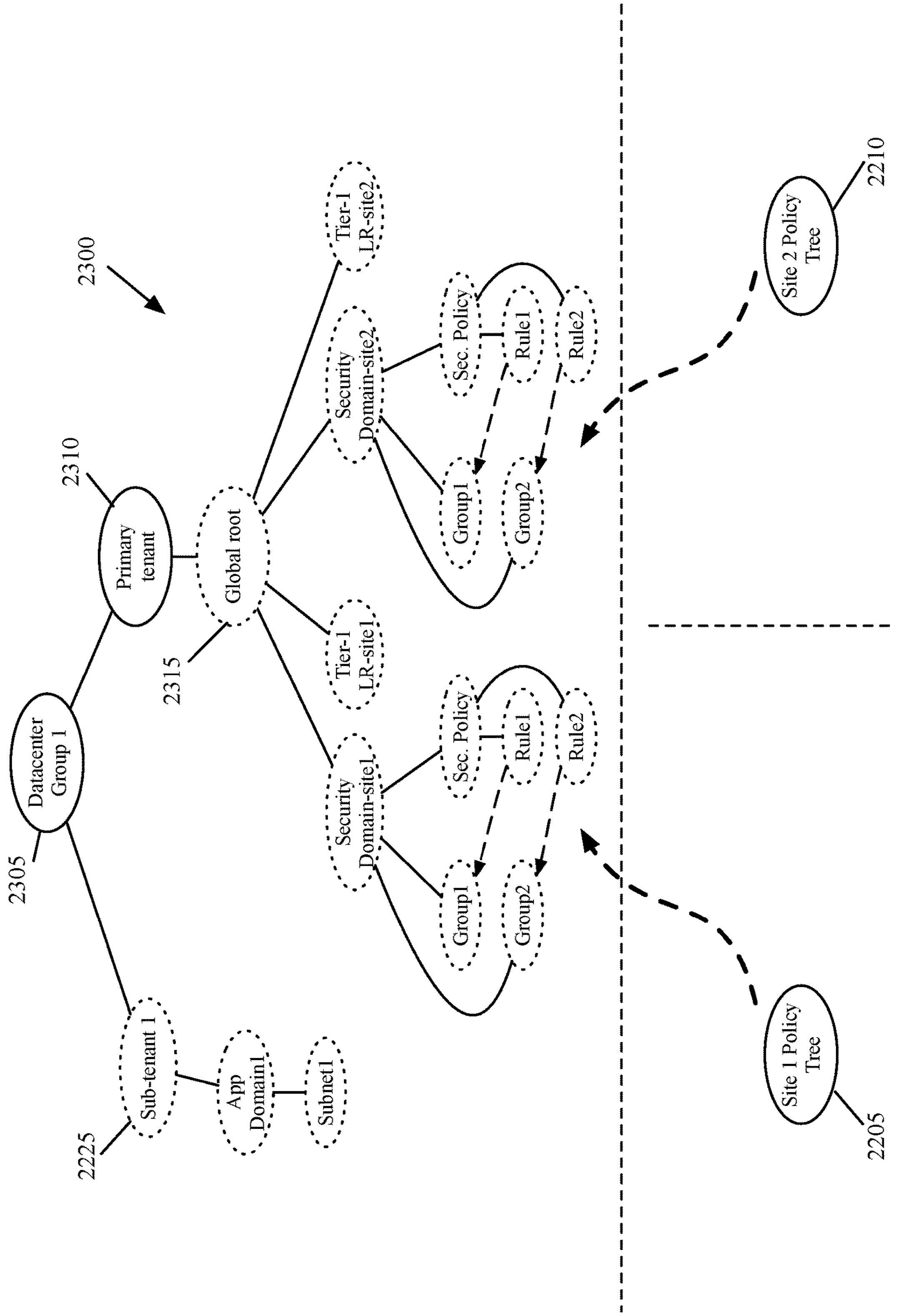
FIG. 23 conceptually illustrates the global policy configuration maintained at the policy manager service instance for the datacenter group after the policy configurations of FIG. 22 have been streamed to the policy manager service.

FIG. 23 conceptually illustrates the global policy configuration 2300 maintained at the policy manager service instance for the datacenter group after the policy configurations 2205 and 2210 have been streamed to the policy manager service. As shown, the first site sends its policy configuration information 2205 and the second site sends its policy configuration information 2210 to the cloud-based policy management service (e.g., as described above by reference to FIG. 9).

The policy manager service incorporates these local policies into a policy configuration tree 2300 for the datacenter group. As shown, this policy configuration starts with a datacenter group root node 2305, under which a primary tenant root node 2310 having its own global root node 2315 is defined. The sub-tenant configuration from the first datacenter is defined separately under its own root node 2225. Any other sub-tenants defined at other datacenters in the group would also be defined separately under their own respective root nodes within the global policy configuration tree 2300.

The policy configuration retrieved from the individual datacenters is shown in this figure using dotted lines within the global policy configuration tree 2300. This represents that while this policy is visible at the cloud-based policy management service (e.g., to a network admin logged into the policy management service), the policy is specified as being owned by one datacenter or the other. In some embodiments, this policy is not editable at the cloud-based service or is only partially editable (e.g., policies can be added but not deleted). In other embodiments, the admin can edit the policy through the cloud-based policy manager service despite the policy being owned by the local manager of one of the datacenters.

It should also be noted that, as in this case, the names used for security and/or networking policy may be the same across different datacenters. For instance, in this example both the structure of the main policy and the names used for security domains, security groups, logical routers, etc. are the same between the two datacenter policy configurations 2205 and 2210. Thus, when storing the policy, the management service of some embodiments appends prefixes or postfixes (as in this example) to the names of the policy configuration nodes. As in this case, some embodiments only use the prefixes/postfixes for the highest-tier policy configuration nodes underneath the global root, as the configuration nodes underneath these nodes are differentiated based on the prefix in the path through the policy configuration tree needed to reach these nodes. Thus, "Security Domain" from the first site is stored as "Security Domain—site1" while "Security Domain" from the second site is stored as "Security Domain—site2", and similarly for the logical router configurations. Some embodiments add these prefixes or postfixes irrespective of whether they are currently needed to differentiate different security and/or networking configuration names, while other embodiments only add the prefixes or postfixes as needed.

Figure 24:
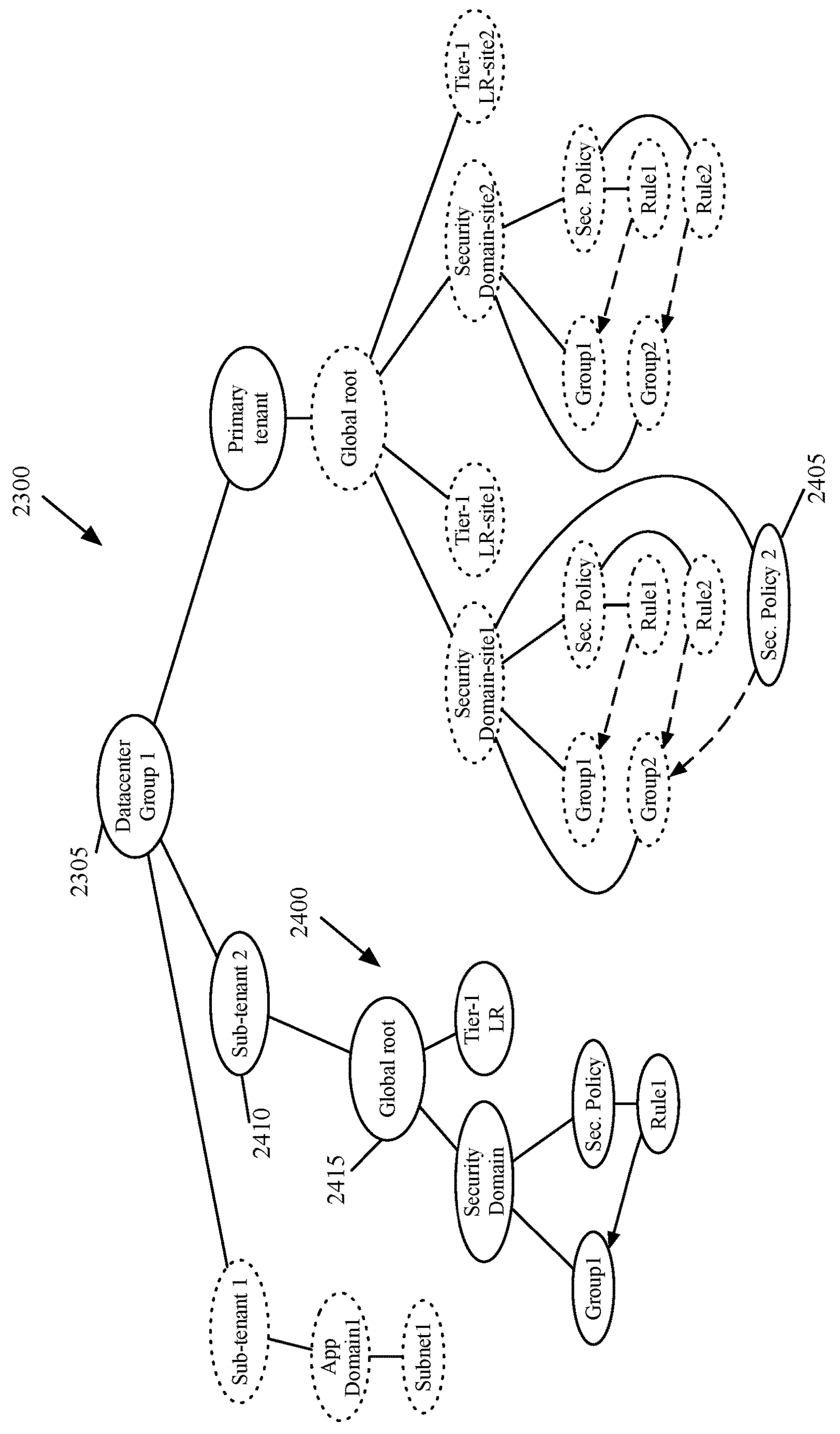
FIG. 24 conceptually illustrates that a user has (i) added a new sub-tenant with its own policy configuration sub-tree and (ii) added a second security policy to the security domain defined at the first site.

Users can also modify the global policy configuration through the policy management service. FIG. 24 conceptually illustrates that a user has (i) added a new sub-tenant with its own policy configuration sub-tree 2400 and (ii) added a second security policy 2405 to the security domain defined at the first site. The policy configuration nodes are shown in the figure using solid lines to represent that they are owned by the global policy manager service rather than by any individual local manager. The security policy 2405 is defined within the first site's security domain and references one of the security groups defined at the local manager for the first site. It should be noted that the primary tenant user, through the global manager service, can also define entirely new security domains and/or logical networking constructs that span the entire datacenter group (or subsets of datacenters) underneath the primary tenant configuration.

The new sub-tenant ("Sub-tenant 2") has its own root node 2410 underneath the datacenter group node 2305, and its own global root 2415 under which security domains and networking policy are defined for the sub-tenant. Either the sub-tenant user or the primary tenant user has defined a security domain (with a security group and a security policy) as well as a logical router for the sub-tenant network. In some embodiments, this sub-tenant network defined by the policy configuration 2405 spans all of the datacenters by default. In other embodiments, either the user for the entire datacenter group or the sub-tenant defines which of the datacenters in the datacenter group the sub-tenant user spans.

Figure 25:
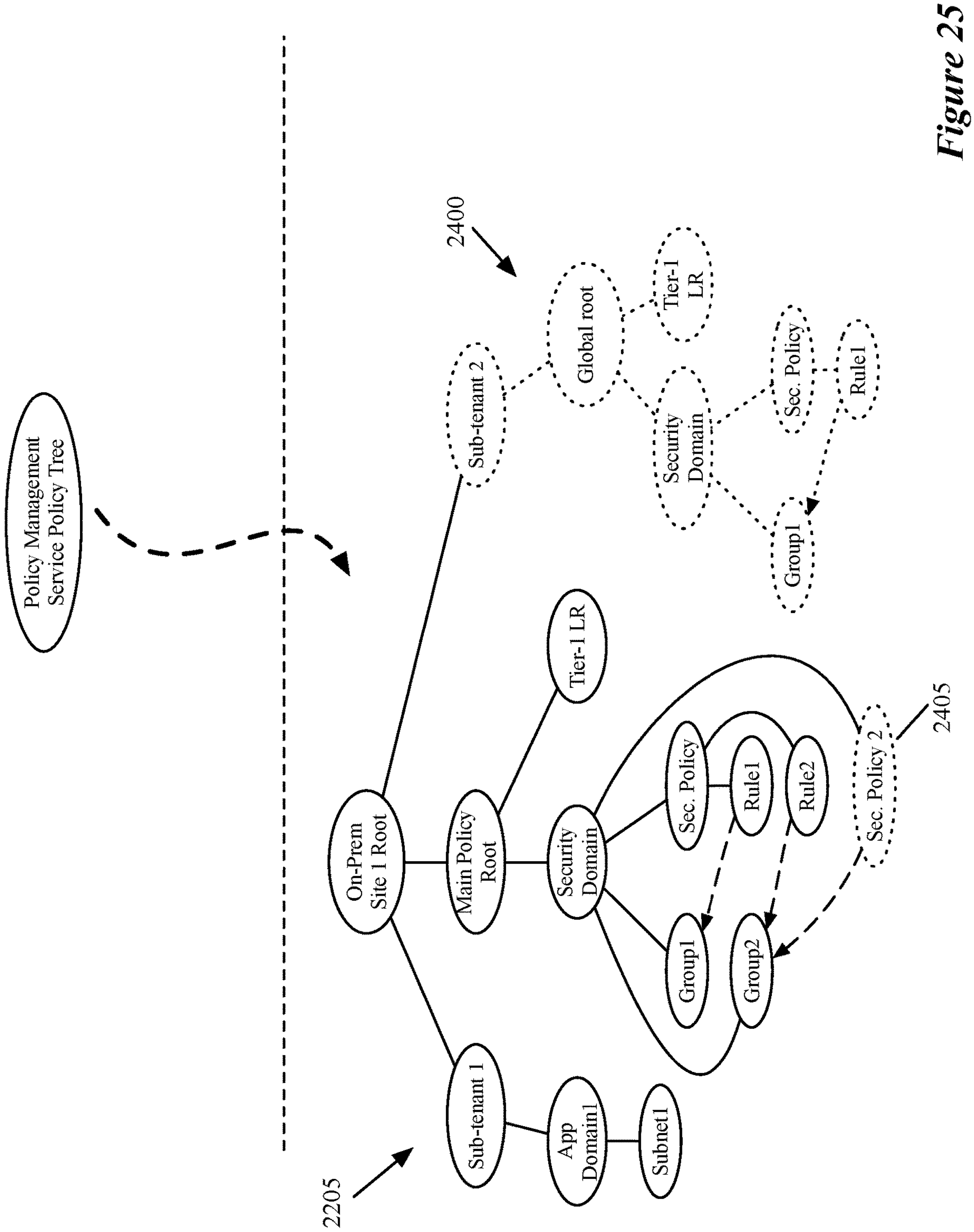
FIGS. 25 and 26 conceptually illustrate the propagation of newly added policy configuration information to the first and second datacenters.
Figure 26:
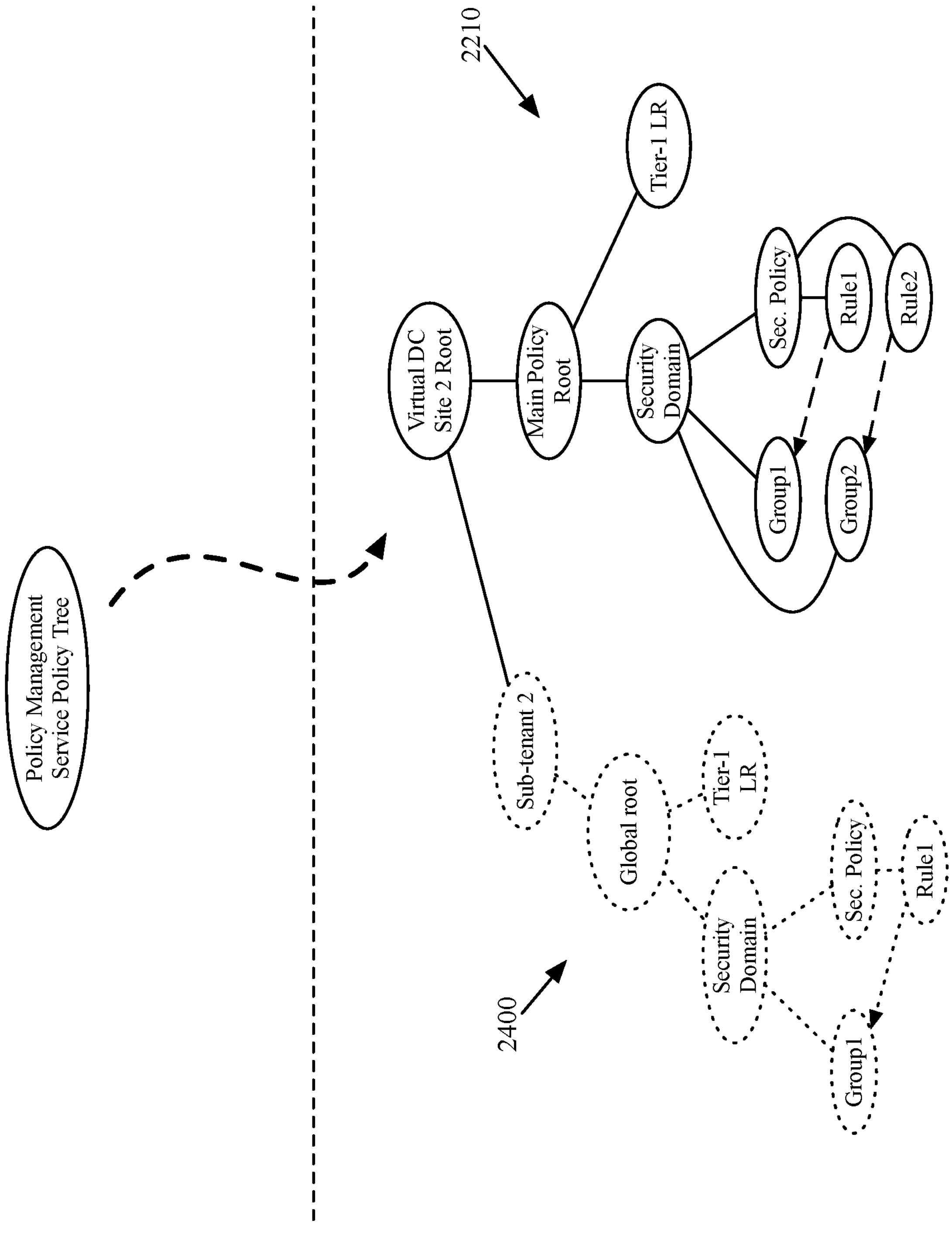

FIGS. 25 and 26 conceptually illustrate the propagation of this newly added policy configuration information to the first and second datacenters, respectively. FIG. 25, specifically, shows the policy configuration tree 2205 for the first datacenter after information is propagated from the policy manager service (e.g., using the open gRPC connection to that datacenter as described above). The policy manager service pushes the newly defined security policy 2405, which is shown in the main policy section of the policy configuration 2205 using a dotted line to represent that this security policy is owned by the global policy manager service. In addition, the entire policy configuration tree 2400 for sub-tenant 2 defined at the global policy manager service is pushed to the first datacenter so that the network elements of the first datacenter can be configured to implement the logical network and policy for this sub-tenant. This entire sub-tenant configuration 2400 is owned by the cloud-based policy manager service and is thus represented using a dotted line.

FIG. 26 shows the policy configuration tree 2210 for the second datacenter after information is propagated from the policy manager service (e.g., using the open gRPC connection to the second datacenter as described above). The policy manager service does not push the newly defined security policy 2405 because this was defined within the security domain for the first site and therefore does not span to the second site. The policy manager service does push the entire policy configuration tree 2400 for sub-tenant 2 defined at the global policy manager service to the second datacenter so that the network elements of the second datacenter can be configured to implement the logical network and policy for this sub-tenant. This entire sub-tenant configuration 2400 is owned by the cloud-based policy manager service and is thus represented using a dotted line at the second datacenter as well. Some embodiments allow certain minor changes to these globally defined policy configurations at the local datacenters.

At least some of the network management system services (e.g., the policy management service, the network monitoring service, etc.) provide user interfaces (e.g., graphical user interfaces) that enable the tenant user (e.g., a network administrator) with appropriate credentials to view information stored by the services and interact with the services (e.g., to modify the policy configuration for the network).

The network monitoring service of some embodiments provides a graphical user interface (GUI) that allows a user to view flow statistics and/or flow topology for a datacenter group (or individual datacenters within that datacenter group) as well as use the flows to auto-generate firewall rules (via microsegmentation techniques).

Figure 27:
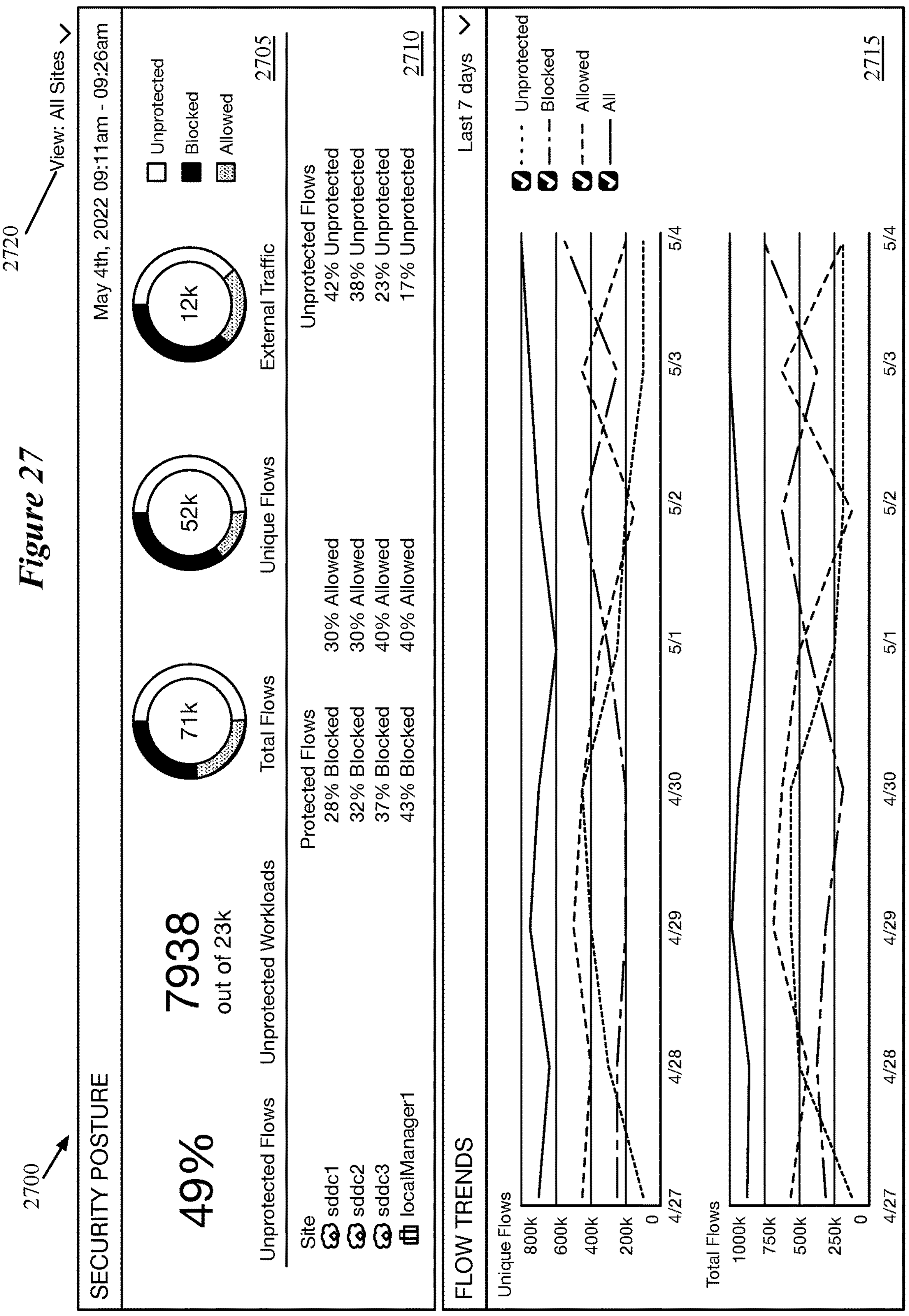
FIG. 27 illustrates an example dashboard GUI of some embodiments for such a network monitoring service.

FIG. 27 illustrates an example dashboard GUI 2700 of some embodiments for such a network monitoring service. The dashboard GUI 2700 provides flow statistics for a datacenter group as well as for individual datacenters within the group. The dashboard GUI 2700 includes an aggregate flow statistics section 2705, an individual datacenter flow statistics section 2710, and a flow trends section 2715.

The aggregate and individual datacenter flow statistics sections 2705 and 2710 provide information about data flows over a recent period of time. In this example, the time period is 15 minutes. In different embodiments, this recent time period may be fixed or configurable by the user. As shown, the aggregate flow statistics section 2705 provides information about the number of data message flows in the datacenter group and the status of those flows. The network monitoring service, in collecting and aggregating flow data, categorizes each flow. In some embodiments, as shown, these groups are unprotected flows (i.e., flows to which only a default firewall rule is applied), blocked flows (i.e., flows that are blocked based on a specific firewall rule), and allowed flows (i.e., flows that are allowed based on a specific firewall rule). The default firewall rule, in some embodiments, either allows or blocks data messages from any source to any destination (either for any destination port or for a specific destination port). The specific firewall rules, in some embodiments, may be generated by the network monitoring application via microsegmentation or generated according to user specification (e.g., via the policy manager service for the datacenter group).

Because the user may want to generate microsegmentation rules to cover unprotected flows (and for workload DCNs that send and/or receive these flows), the aggregate flow statistics section 2705 provides information about data flows during the recent time period that are classified as unprotected (in this case, the percentage of the flows that are classified as such) as well as information about workload DCNs that send and/or receive unprotected flows (in this case, the number of unprotected workloads and an approximate total number of workloads). Graphical displays are also provided for (i) the total flows during the recent time period, (ii) unique flows during the recent time period, and (iii) external traffic flows (i.e., flows between an endpoint within one of the datacenters and an endpoint external to the datacenter) indicating both the total number of such flows as well as the breakdown between unprotected, blocked, and allowed flows for the flow type. In this example, there have been approximately 71000 total flows, of which approximately 52000 are unique (i.e., unique combination of source and destination network addresses and destination port number) and approximately 12000 of which involve an external endpoint.

The individual datacenter flow statistics section 2710, in this case, provides information for each of the datacenters. In this case, there are four datacenters (sddc1, sddc2, sddc3, and localManager1) in the datacenter group monitored by this network monitoring service. For each of these datacenters, the individual datacenter flow statistics section 2710 provides the percentages of data flows that are categorized as blocked, allowed, and unprotected. Other embodiments provide graphical displays such as those shown in the aggregate flow statistics section 2705 for the total flows in each individual datacenter, or otherwise provide this information to the user.

The flow trends section 2715, in some embodiments, displays a graph of different flow categories over a longer period of time. In this example, flow trends are shown for the last 7 days. Via a drop-down menu, however, some embodiments enable the user to change the period of time over which the flow trends are shown. Different options can include the last half day or day, last 30 days, or other time periods. In this case, the flow trends section 2715 includes a graph of total flows (per day) over the recent time period, with separate graph lines for all flows, unprotected flows, blocked flows, and allowed flows. A similar graph is shown for only the unique flows occurring during this time period.

In addition to these sections, the dashboard GUI 2700 includes a drop-down menu item 2720 that allows the user to select the sites for which information is displayed in the dashboard GUI. Currently, all of the sites are selected, and thus with the exception of the individual datacenter flow statistics section 2710, all of the information represents the aggregate of flow data collected from all of the datacenters in the datacenter group.

Figure 28:
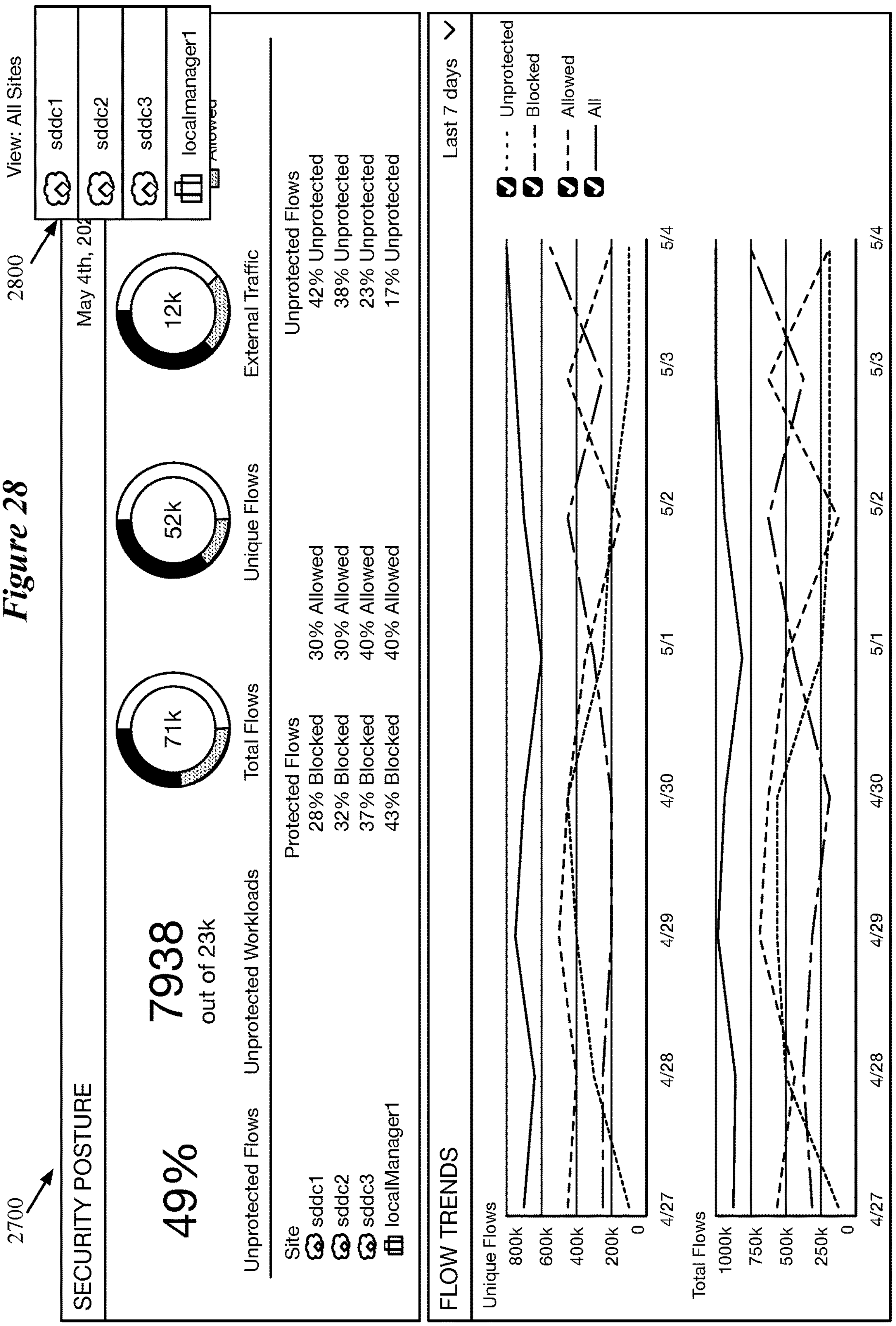
FIG. 28 illustrates that when a user selects a particular menu item, the dashboard GUI displays a drop-down menu that allows a user to select one of the individual datacenters for the dashboard.
Figure 29:
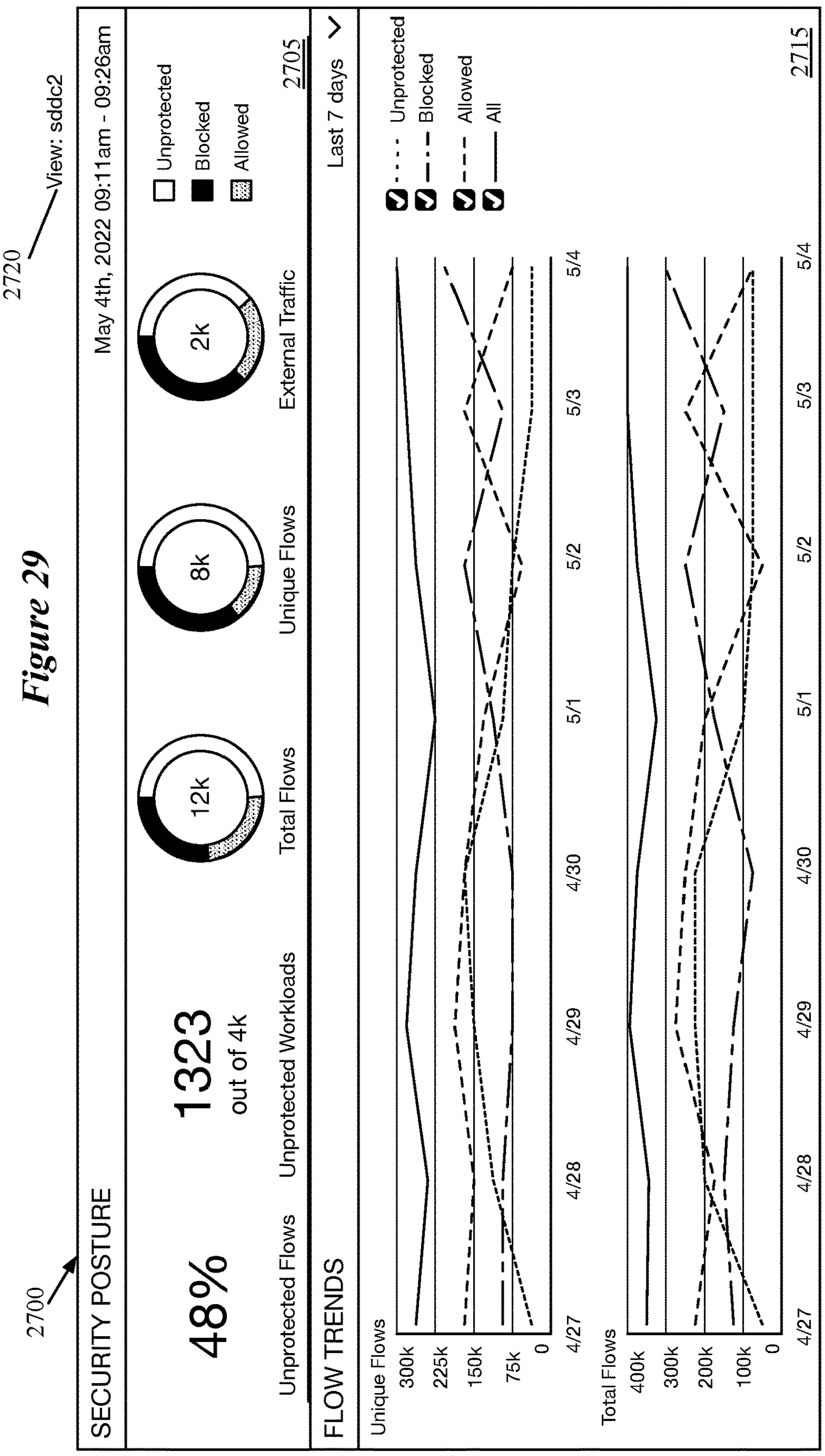
FIG. 29 illustrates the dashboard GUI after the user has selected a particular datacenter.

FIG. 28 illustrates that if a user selects (e.g., with a cursor selection mechanism) this menu item 2720, the GUI 2700 displays a drop-down menu 2800 that allows a user to select one of the individual datacenters for the dashboard. FIG. 29 illustrates the GUI 2700 after the user has selected the datacenter sddc2. In this individual datacenter view, the GUI 2700 displays statistics for only the selected datacenter in the aggregate flow statistics section 2705 and the flow trends section 2715. In some embodiments, as shown, the individual datacenter flow statistics section is removed from the dashboard GUI 2700 when a specific datacenter is selected. In other embodiments, this section remains in the dashboard GUI (either showing information for all of the datacenters or for all but the selected datacenter).

Figure 30:
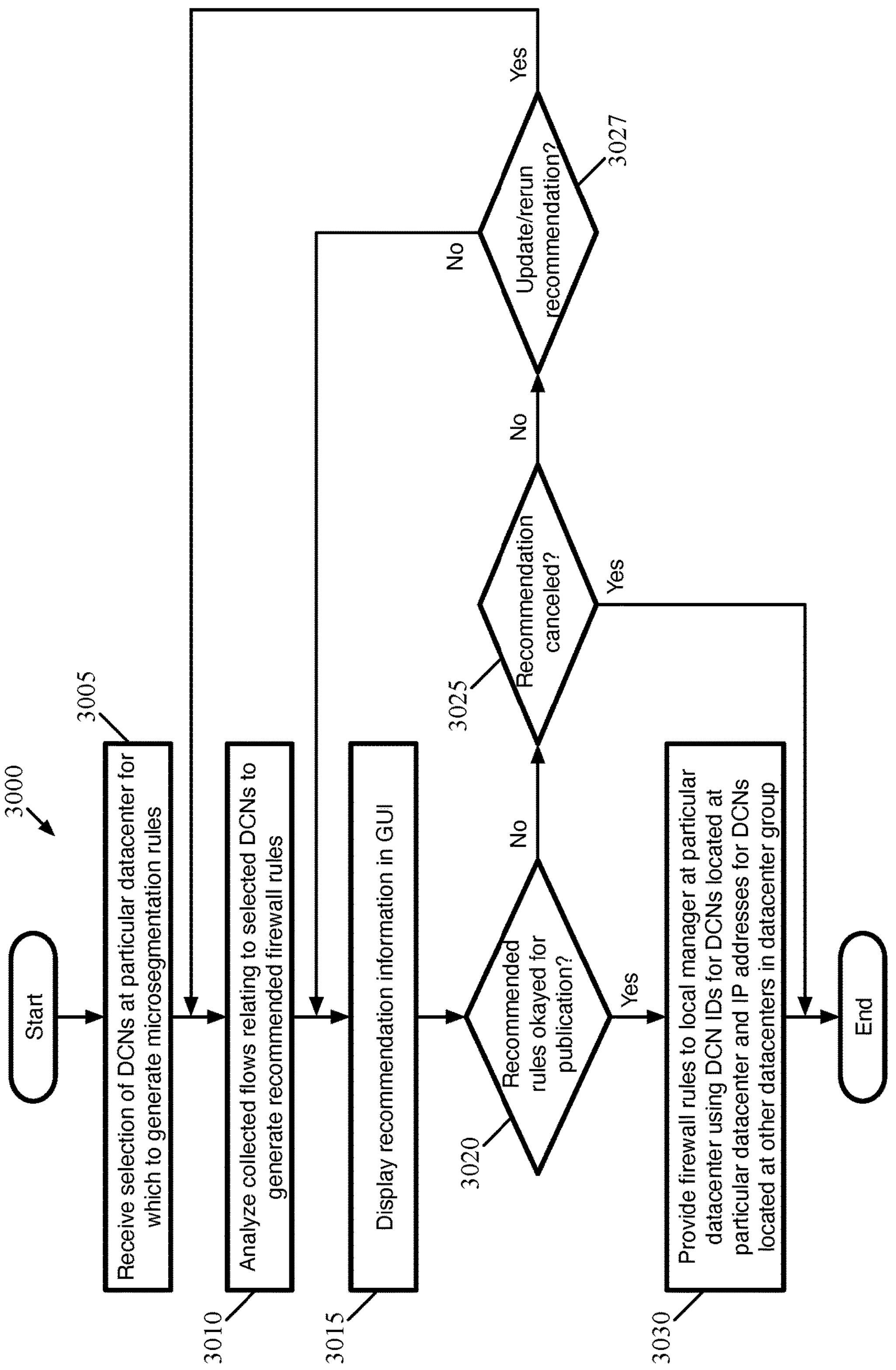
FIG. 30 conceptually allows a process of some embodiments for generating and publishing firewall rule recommendations.

The network monitoring service of some embodiments, as mentioned above, allows users to generate firewall rule recommendations based on microsegmentation. FIG. 30 conceptually allows a process 3000 of some embodiments for generating and publishing such firewall rule recommendations. In some embodiments, the process 3000 is performed by a recommendations service (e.g., a microservice or group of microservices) of a network monitoring service instance of the network management system.

As shown, the process receives (at 3005) a selection of DCNs at a particular datacenter for which to generate microsegmentation rules. In some embodiments, this selection is performed by an authenticated user interacting with the network monitoring system user interface. The network monitoring service provides a GUI that enables the user to generate these firewall rule recommendations as well as to view the status of various such generated recommendations.

Figure 31:
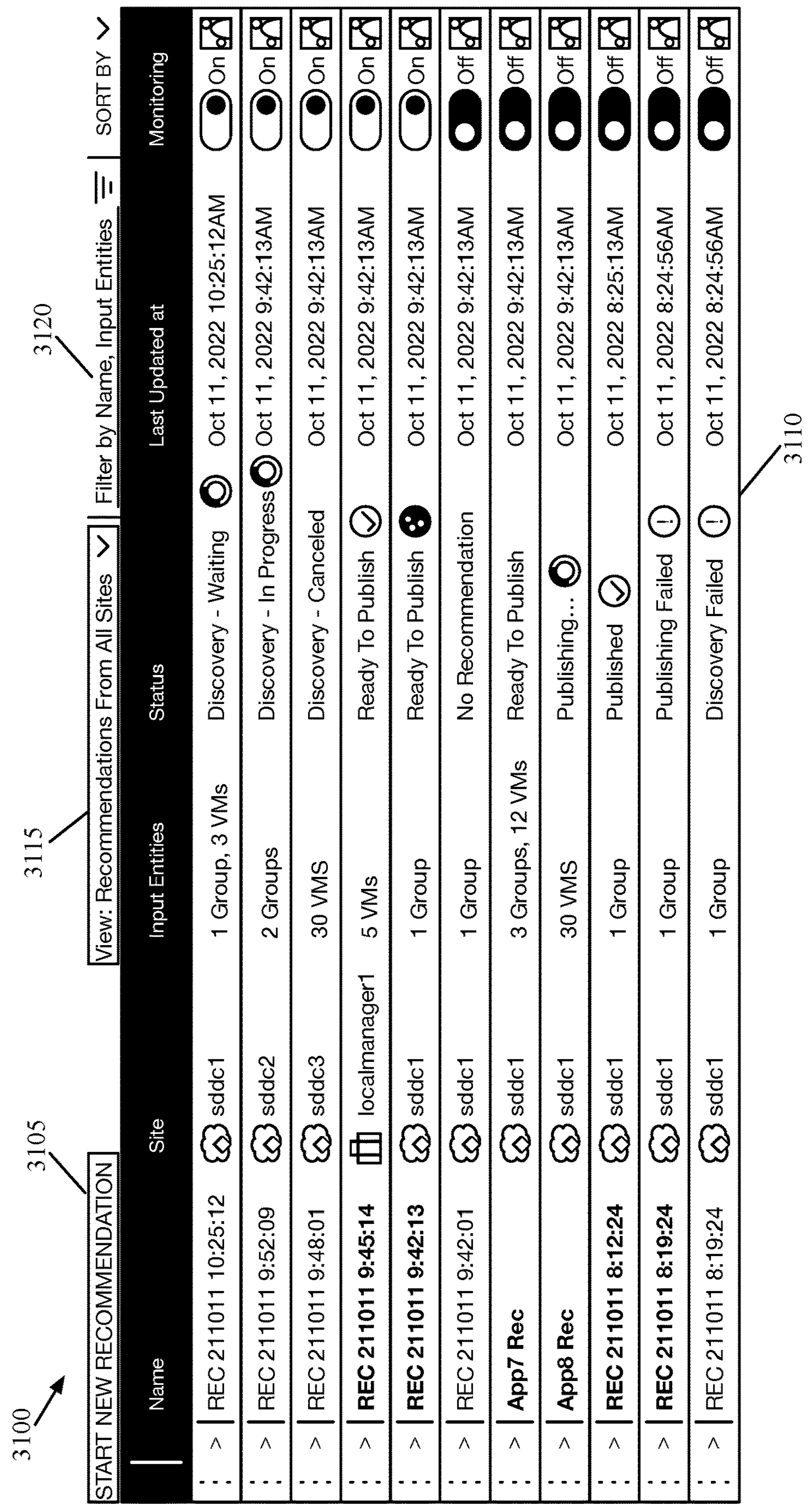
FIG. 31 illustrates a microsegmentation recommendations GUI of some embodiments.

FIG. 31 illustrates such a microsegmentation recommendations GUI 3100 of some embodiments. This microsegmentation recommendations GUI 3100 includes a selectable item 3105 for generating a new set of recommended firewall rules, a recommendations table 3110 that displays a list of recently-generated firewall rule recommendations, a drop-down menu item 3115 for selecting one of the sites for which to view recommendations in the table 3110, and a filtering item 3120 for entering other characteristics that can be used to filter which recommendations are shown in the table 3110.

The selectable item 3105, if selected (e.g., with a cursor selection) provides a GUI display that allows a user to select a set of input entities for generating a new set of recommended firewall rules. In some embodiments, these input entities are restricted to a single datacenter location, so that the generated rules related to these entities can be distributed to that datacenter. In some embodiments, the user can select as input entities a specific set of DCNs (e.g., specific VMs), one or more security groups that include DCNs in the specific datacenter, an application deployed in the datacenter, or combinations thereof. When a security group or application is selected, some embodiments use all DCNs belonging to that group or application located in the selected datacenter as the input entities for the microsegmentation recommendation.

Returning to FIG. 30, the process 3000 then analyzes (at 3010) collected flows relating to the selected DCNs in order to generate a set of recommended firewall rules. In some embodiments, various microservices belonging to the network monitoring system perform a set of operations to identify the flows sent to and from the selected workload DCNs, correlate the sources and destinations of those flows to DCNs (including between pairs of selected DCNs and flows between the selected DCNs and other DCNs in any of the datacenters), and generate recommended firewall rules based on the observed flows. In some embodiments, the microsegmentation rules specify specific rules for which flows should be allowed and which flows should be blocked based on observation of past/existing flows in the network.

Next, the process 3000 displays (at 3015) the recommendation information in the GUI. As shown in FIG. 31, the recommendations table 3110 provides information relating to a set of recently generated firewall rule recommendations. For each of a set of recommendations, the table provides a name that identifies the recommendation, the site to which the recommendation pertains (i.e., the site at which the input entities for the recommendation are located), information about the input entities used to generate the recommendation (i.e., the number of DCNs (e.g., VMs) and/or security groups used for the recommendation generation), the status of the recommendation, the time this status was last updated, and whether monitoring of the entities is turned on or not.

The status of the recommendation can indicate that discovery (the process of collecting and analyzing the flows in order to generate the rule recommendations) has failed, is waiting to start, is in progress, or has canceled. Performing the flow analysis and rule recommendation requires a certain amount of available resources, so the network monitoring service may have to wait for these resources to become available. If the resources do not become available or the flow information could not be collected, then the rule recommendation process may fail. Once the network monitoring service generates a set of recommended rules, the status in the table 3110 for this recommendation changes to ready to publish. In addition, at this point, the recommendation name becomes selectable (shown here in bold) so that the user can view the recommended rules before determining whether to accept (publish) the rules. An additional option for the status is to note if no recommended rules were generated (e.g., because there were no flows identified for the workload DCNs used as input entities for the recommendation).

Once the status has been set as ready to publish (i.e., the rule recommendation has been generated), the process 3000 determines (at 3020) whether the recommended rules have been accepted for publication. If the rules have not yet been accepted for publication by a user of the network monitoring service, the process 3000 determines (at 3025) whether the recommendation has been canceled (i.e., the user affirmatively decides not to publish the generated rules). If the recommendation has been canceled, the process 3000 ends. In some embodiments, it should be noted, a recommendation may only be canceled during the generation process (e.g., during the performance of operation 3010).

If the rules have not been accepted for publication nor has the recommendation been canceled, the process 3000 determines (at 3027) whether the user has specified to rerun or update the recommendation. In some embodiments, the user might want the recommendations service to generate new firewall rule recommendations based on the most recent flows. In addition, the user might specify new criteria for the analysis, such as which flows to include when performing the analysis, the time range over which to analyze flows, etc. If the user specifies to update or rerun the firewall rule generation, the process 3000 returns to 3010 to analyze the collected flows based on the new criteria. On the other hand, if no decision has been made on the rules, the process 3000 returns to 3015 to continue displaying the recommendation information in the GUI (so long as the user does not navigate to a different GUI of the network monitoring service).

It should be understood that the process 3000 is a conceptual process and that the network monitoring service of some embodiments does not continuously check for whether each generated recommendation has been selected for publication. Rather, the network monitoring service generates each set of recommended rules on demand, stores these recommendations, and then publishes them, updates them, or removes them as user input for these operations is received.

When the recommendation is accepted for publication, the process 3000 provides (at 3030) the firewall rules to the local manager at the selected datacenter, then ends. In some embodiments, these firewall rules are published via the open gRPC connection (i.e., as an API request sent to the connection server and pushed onto the connection by the connection server handling the connection for that datacenter). As such, the network monitoring service uses the datacenter ID for the selected datacenter when publishing these firewall rules so that the connection server pushes the firewall rules onto the correct connection to the selected datacenter. In some embodiments, the user selects for the service to publish the recommended rules via viewing the rules and from that UI panel selecting a UI item (e.g., a Publish button) for the service to publish the rules or via an icon displayed next to the status in the recommendations table. Once the network monitoring service sends these rules to the local manager of the datacenter for which the rules are generated, the status in the recommendations table 3110 indicates whether the publishing process is ongoing or, if complete, whether publishing failed or was successful.

The published firewall rules use DCN IDs (e.g., VM IDs) for DCNs located at the particular datacenter but use network addresses (e.g., IP addresses) for DCNs located at other datacenters in the datacenter group (and for any external endpoints). Although some embodiments only allow the input entities used to generate the recommendation to be located in the selected datacenter, the generated firewall rules may include sources and/or destinations located in other datacenters in the datacenter group. These rules are typically defined using DCN identifiers (e.g., VM IDs) for the source and destination match conditions. However, while the network monitoring system is aware of the DCN identifiers for all of the workload DCNs across the datacenter group, the local manager at a particular datacenter will not have this information for workload DCNs located in other datacenters. As such, the network monitoring system translates these DCN identifiers (for workload DCNs in other datacenters) to network addresses when pushing the rules to the local manager at the particular datacenter. For instance, a rule defined for a flow from VM1 at a first datacenter to VM2 at a second datacenter will have the destination VM ID translated into a network address when pushed to the local manager at the first datacenter. If the user subsequently requests a set of recommended rules for a set of workloads at the second datacenter that includes VM2, then a corresponding rule may be generated in this second set of recommended rules. When this second set of rules is pushed to the local manager at the second datacenter, the corresponding rule will use the network address of VM1 and the VM ID for VM2.

Figure 32:
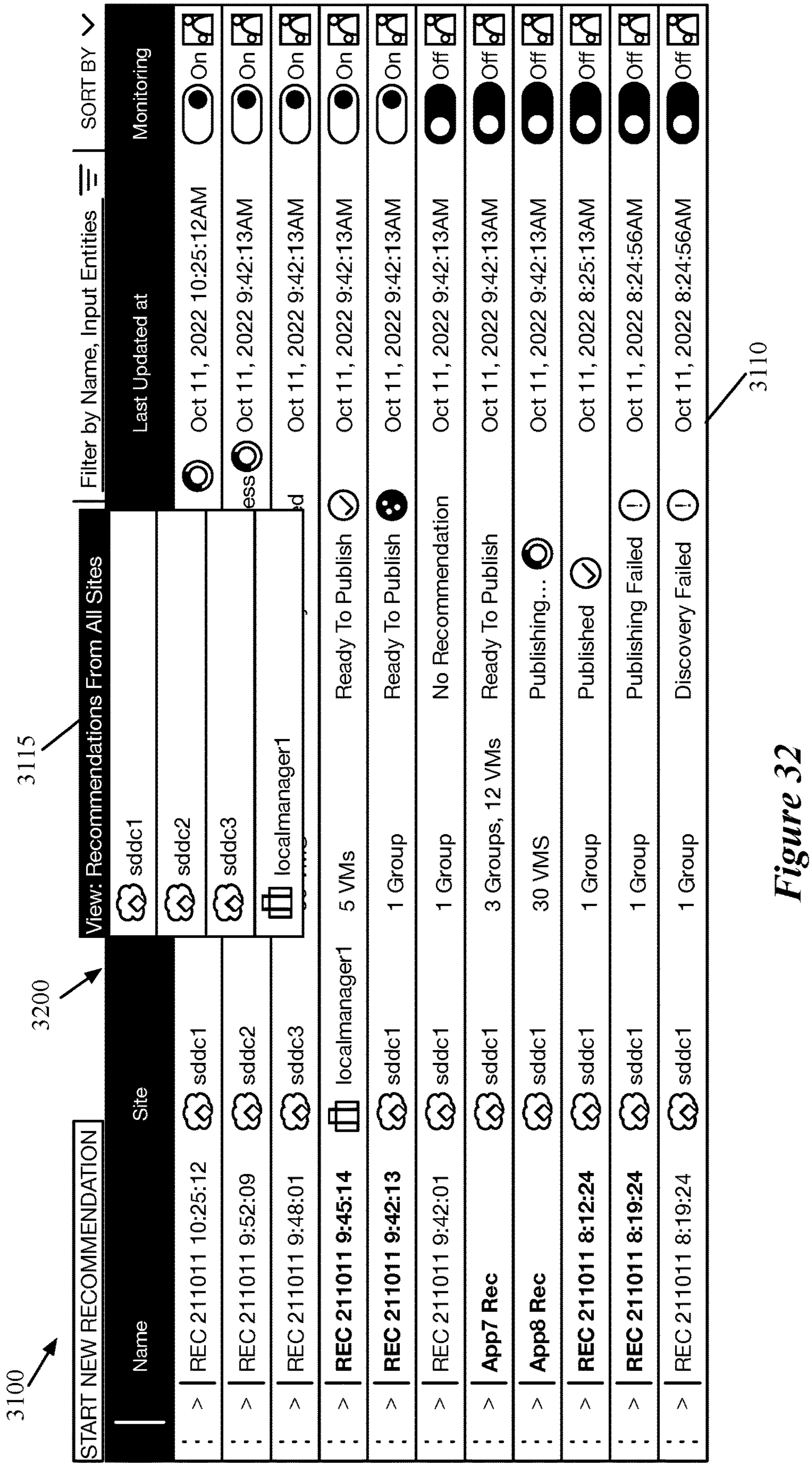
FIG. 32 illustrates the selection of a drop-down menu item in the recommendations GUI, resulting in the display of a drop-down menu that allows a user to select a site so that the table will only display recommendations generated for the selected sites.
Figure 33:
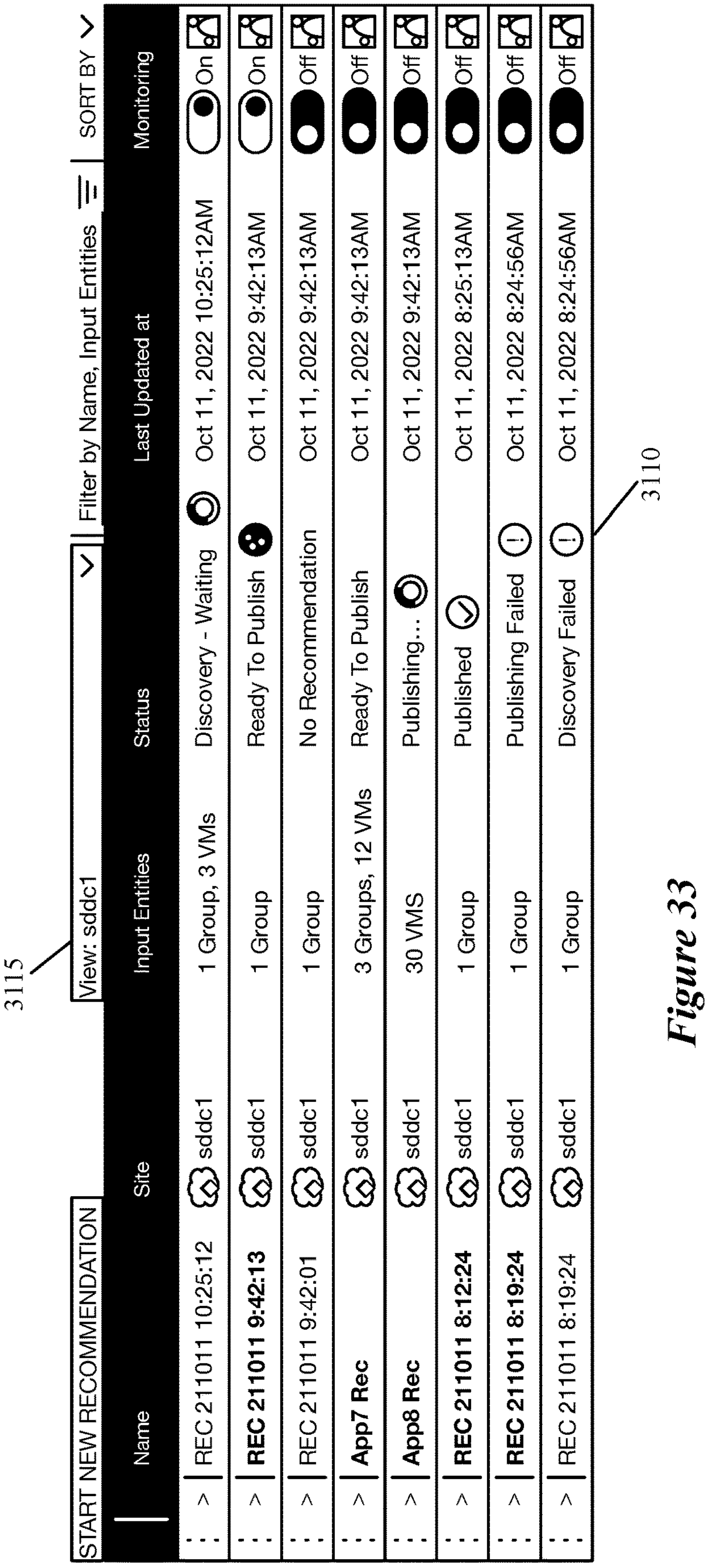
FIG. 33 illustrates the recommendations GUI after the user has selected a particular site so that the table displays only the recommendations generated for entities located in the particular datacenter.

FIG. 32 illustrates the selection (e.g., via a cursor selection) of the drop-down menu item 3115, resulting in the display of a drop-down menu 3200. This allows a user to select one of the four sites (sddc1, sddc2, sddc3, or localmanager1) so that the table 3110 will only display recommendations generated for the selected sites. In FIG. 33, the user has selected sddc1. As a result, the table 3110 now displays only the recommendations generated for entities located in the datacenter sddc1.

While the dashboard GUI 2700 provides a user of the network monitoring service with flow statistics, the network monitoring service of some embodiments also provides the user with the ability to visualize these flows in the network. In some embodiments, the user can view the flows related to groups of workload DCNs in one of the datacenters or flows for specific workload DCNs in one of the datacenters.

Figure 34:
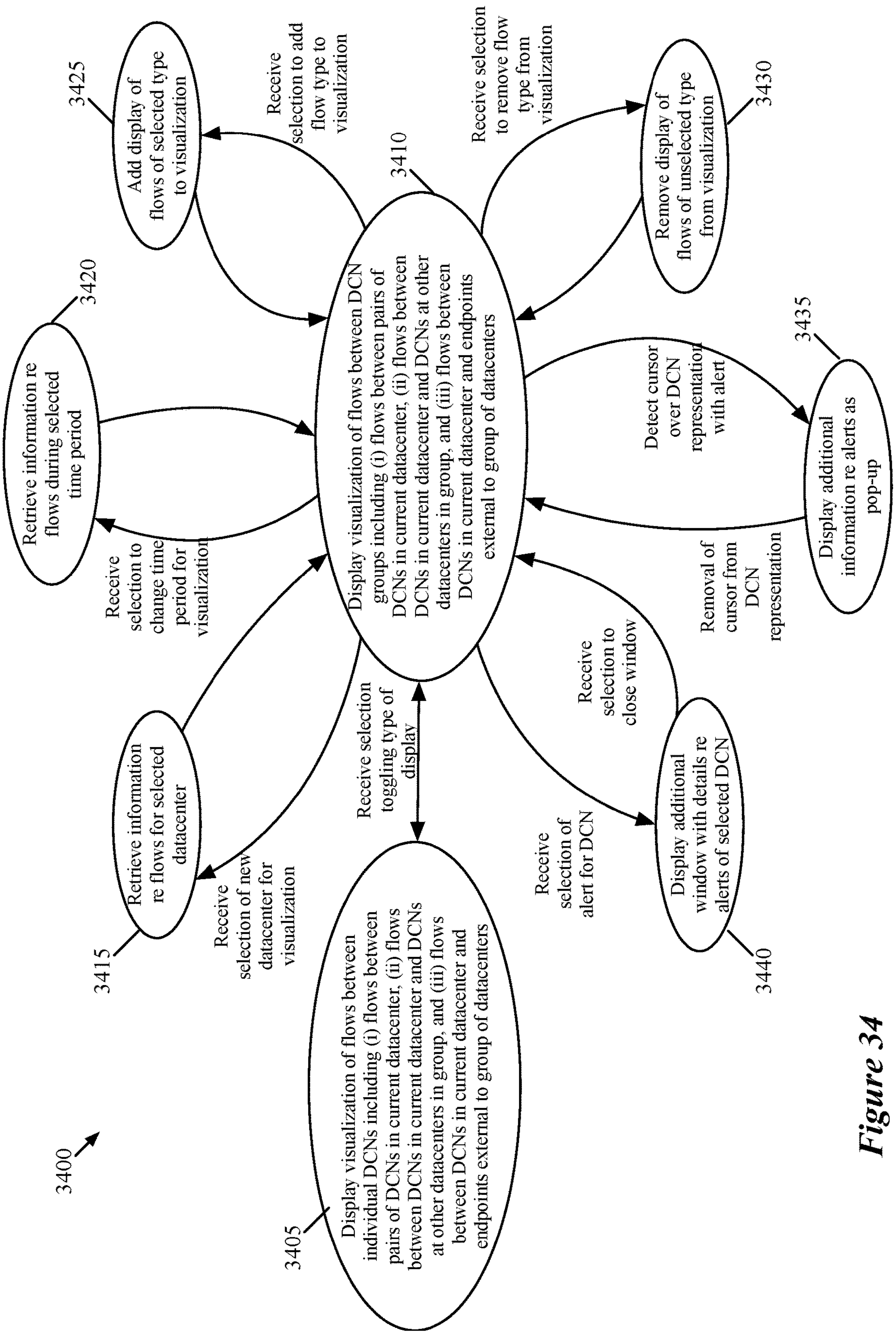
FIG. 34 conceptually illustrates a state diagram showing different states of a flow visualization GUI of some embodiments and transitions between these states.

FIG. 34 conceptually illustrates a state diagram 3400 showing different states of a flow visualization GUI of some embodiments and transitions between these states. This state diagram 3400 will be described by reference to FIGS. 35-39, which illustrate a flow visualization GUI 3500 of some embodiments that displays representations of the flows between workload DCNs in a datacenter.

The flow visualization GUI has two primary states, which can be toggled via a selection item in the GUI of some embodiments. As shown, in state 3405 the flow visualization GUI displays a visualization of flows between individual DCNs including (i) representations of flows between pairs of DCNs in a currently-selected datacenter, (ii) representations of flows between DCNs in the currently-selected datacenter and DCNs at other datacenters in the datacenter group, and (iii) representations of flows between DCNs in the currently-selected datacenter and endpoints external to the datacenter group. In state 3410, the flow visualization GUI displays a visualization of flows between groups of DCNs (e.g., security groups) including (i) representations of flows between pairs of DCNs within a currently-selected datacenter, (ii) representations of flows between DCNs in the currently-selected datacenter and DCNs at other datacenters in the datacenter group, and (iii) representations of flows between DCNs in the currently-selected datacenter and endpoints external to the datacenter group.

Figure 35:
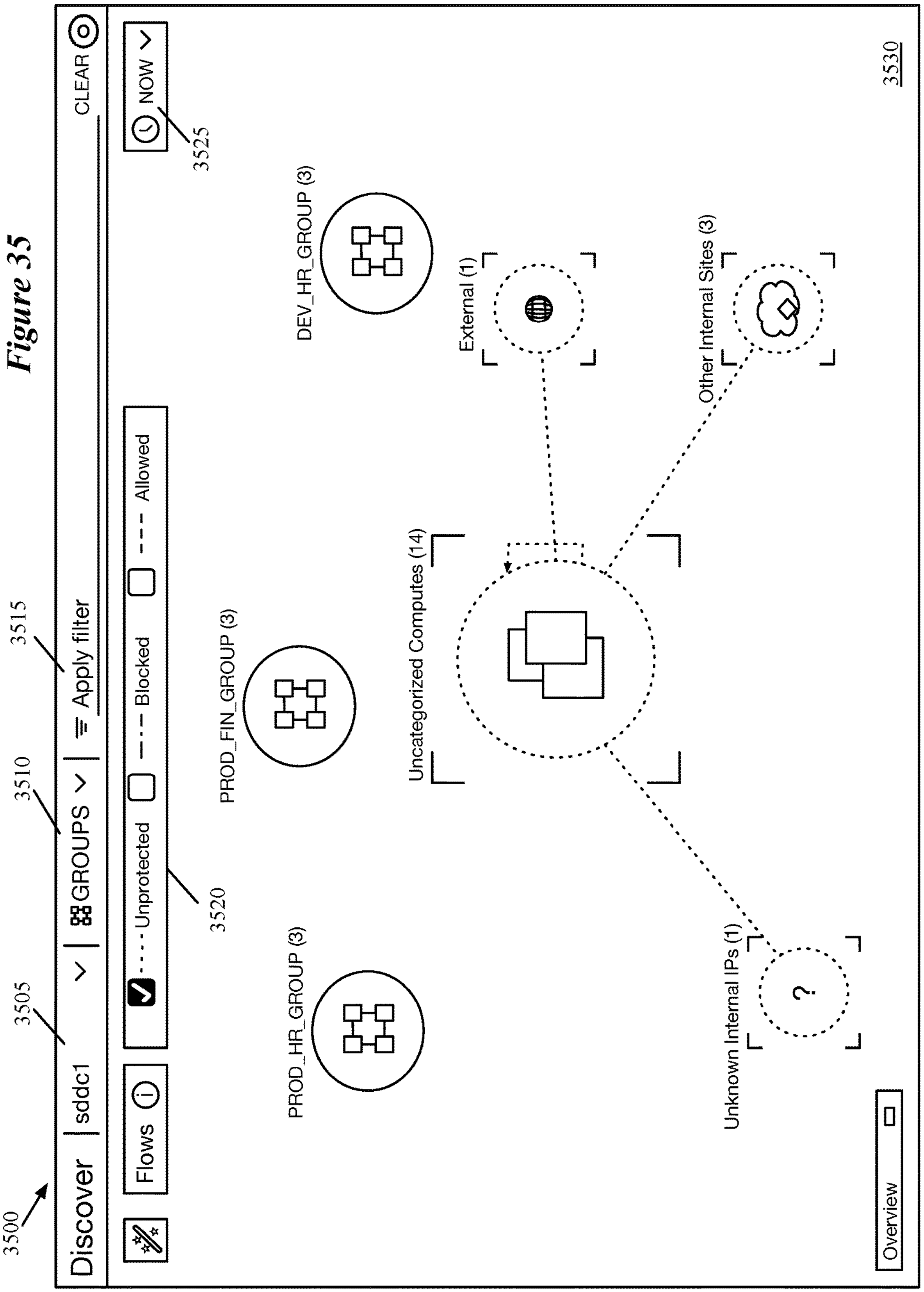
FIG. 35 illustrates a flow visualization GUI of some embodiments, showing the flows between groups of workload DCNs in a datacenter.

FIG. 35 illustrates a flow visualization GUI 3500 of some embodiments that displays representations of the flows between groups of workload DCNs in a datacenter (i.e., in state 3410). As shown, the flow visualization GUI 3500 includes a datacenter selection item 3505, a visualization type selection item 3510, a filter selection item 3515, a group of flow type selection items 3520, a time period selection item 3525, and a flow visualization display 3530. The visualization type selection item 3510 allows the user to specify whether the flow visualization display 3530 should show flows between groups (as in FIG. 35) or individual workload DCNs (as in FIG. 37, described below). As shown in FIG. 34, selection of this item allows a user to toggle between the two states 3405 and 3410.

In some embodiments, from either state 3405 or state 3410, various selection operations can be performed in order to manipulate the flow visualization GUI. While the state diagram 3400 only shows these operations from the DCN group flow visualization state 3410, it should be understood that similar operations can be performed when the GUI is in the individual DCN flow visualization state 3415, but that these are not shown or separately described for simplicity. It should also be understood that some embodiments will have many different states relating to all different types of input events that are not shown here, and that the state diagram 3400 is specifically focused on a subset of these events. That is, many types of operations can be performed in the flow visualization GUI (e.g., filtering of the DCNs displayed in the GUI) that are not described by reference to the state diagram 3400, and that this state diagram should not be construed as limiting the types of interactions available in such a flow visualization GUI for a network monitoring service. Further, it should be understood that various interactions, such as cursor controller gestures and button clicks, keyboard input, touchpad/trackpad input, etc., may be used for selection operations described herein.

In some embodiments, the flow visualization GUI is specific to a single datacenter at a time. If the GUI receives a selection of a new datacenter (i.e., not the currently-selected datacenter), then the GUI transitions to state 3415 to retrieve information about the data message flows for the newly selected datacenter, then returns to state 3410 (or state 3405) to display the flow visualizations for this selected datacenter.

Figure 36:
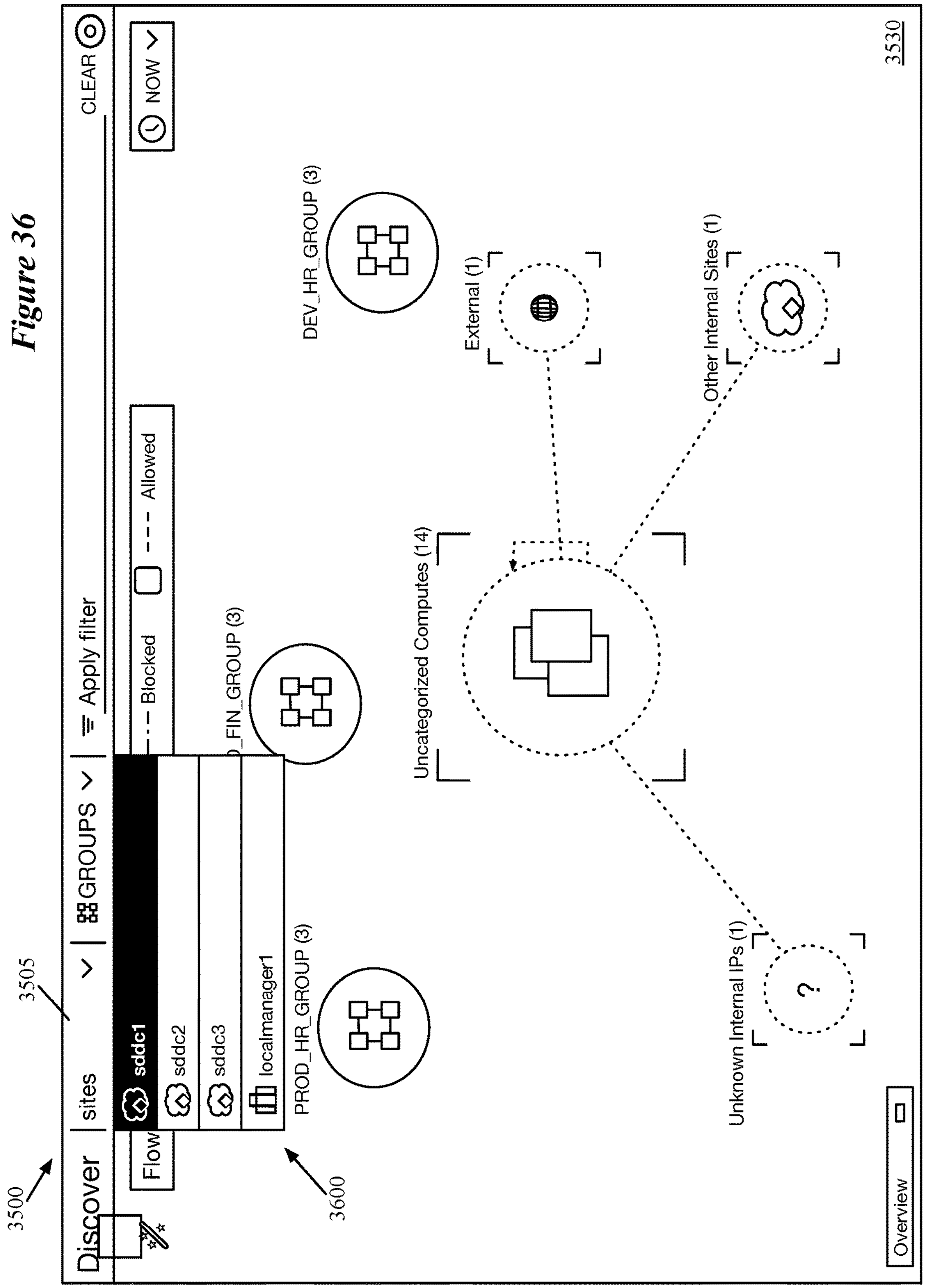
FIG. 36 illustrates that when a user has selected the datacenter selection item, the flow visualization GUI displays a drop-down menu that allows the user to choose one of the datacenters for the flow visualization.

In the GUI 3500, datacenter selection item 3505 allows a user to select for which datacenter in the datacenter group the flow visualization will be displayed. In this example, the user is currently viewing the display for sddc1. Some embodiments (as in this case) require the user to select one of the datacenters in the group of datacenters, while other embodiments also allow the user to view a flow visualization across all of the datacenters in the group. FIG. 36 illustrates that when a user has selected the datacenter selection item 3505, the flow visualization GUI 3500 displays a drop-down menu 3600 that allows the user to choose one of the datacenters for the flow visualization.

In FIG. 35, the flow visualization display 3530 shows three security groups ("PROD_HR_GROUP", "PROD_FIN_GROUP", and "DEV_HR_GROUP") defined in sddc1, the workload DCNs of which are not the sources or destinations of any unprotected flows (which are the only types of flows currently visualized in the GUI). These groups may be the sources and/or destinations of blocked or allowed flows, but those flows are not currently visualized in the GUI. The numbers next to these group names indicate that each of the groups includes three members in the selected datacenter sddc1. The flow visualization display 3530 also shows a group of fourteen uncategorized workloads (i.e., DCNs that are not in any security groups). These uncategorized DCNs are sources and/or destinations of flows to an unknown internal IP address, three workload DCNs at other sites, and an external endpoint.

Some embodiments differentiate in the visualization between endpoints that are external to the datacenter group and workload DCNs located at other datacenters in the datacenter group. For the latter workload DCNs, some embodiments group all such workload DCNs together into one group in the visualization display 3530, while other embodiments display separate items for each other datacenter (e.g., three separate items for sddc2, sddc3, and localmanager1). In either case, the individual DCNs or groups are not shown for the non-selected datacenters in some embodiments, as the flow visualization displays the perspective of a single selected datacenter.

Returning to FIG. 34, a user can also select different time periods for which to see a flow visualization. The time period selection item 3525 in the flow visualization GUI 3500 enables the user to specify the time period from which flows are shown in the flow visualization display 3530. In some embodiments, selection of this item presents options such as current flows (shown in FIG. 35), last hour, last two hours, last 12 hours, last day, last 7 days, etc. When the selection of a different time period is received, the GUI transitions to state 3420 to retrieve information regarding the flows in the currently-selected datacenter during the selected time period, then returns to state 3410 (or 3405) to display these flows.

As mentioned, the flow visualization display can display some or all of blocked, allowed, and unprotected flows. In some embodiments, these different flow types are differentiated visually using different line types, different line colors, etc. In the example shown in FIG. 35, the flow type selection items 3520 allow the user to specify which types of flows should be visualized in the flow visualization display 3530. In this example, only unprotected flows are shown, as the user has unselected the items for both blocked and allowed flows.

When the flow visualization GUI receives a selection of a (previously unselected) flow type to add to the visualization, the GUI transitions to state 3425 to add the display of these flows to the visualization, then returns to state 3410 (or 3405). Similarly, when the flow visualization GUI receives a selection of a (previously selected) flow type to remove from the visualization, the GUI transitions to state 3430 to remove the display of these flows from the visualization, then returns to state 3410 (or 3405).

Figure 37:
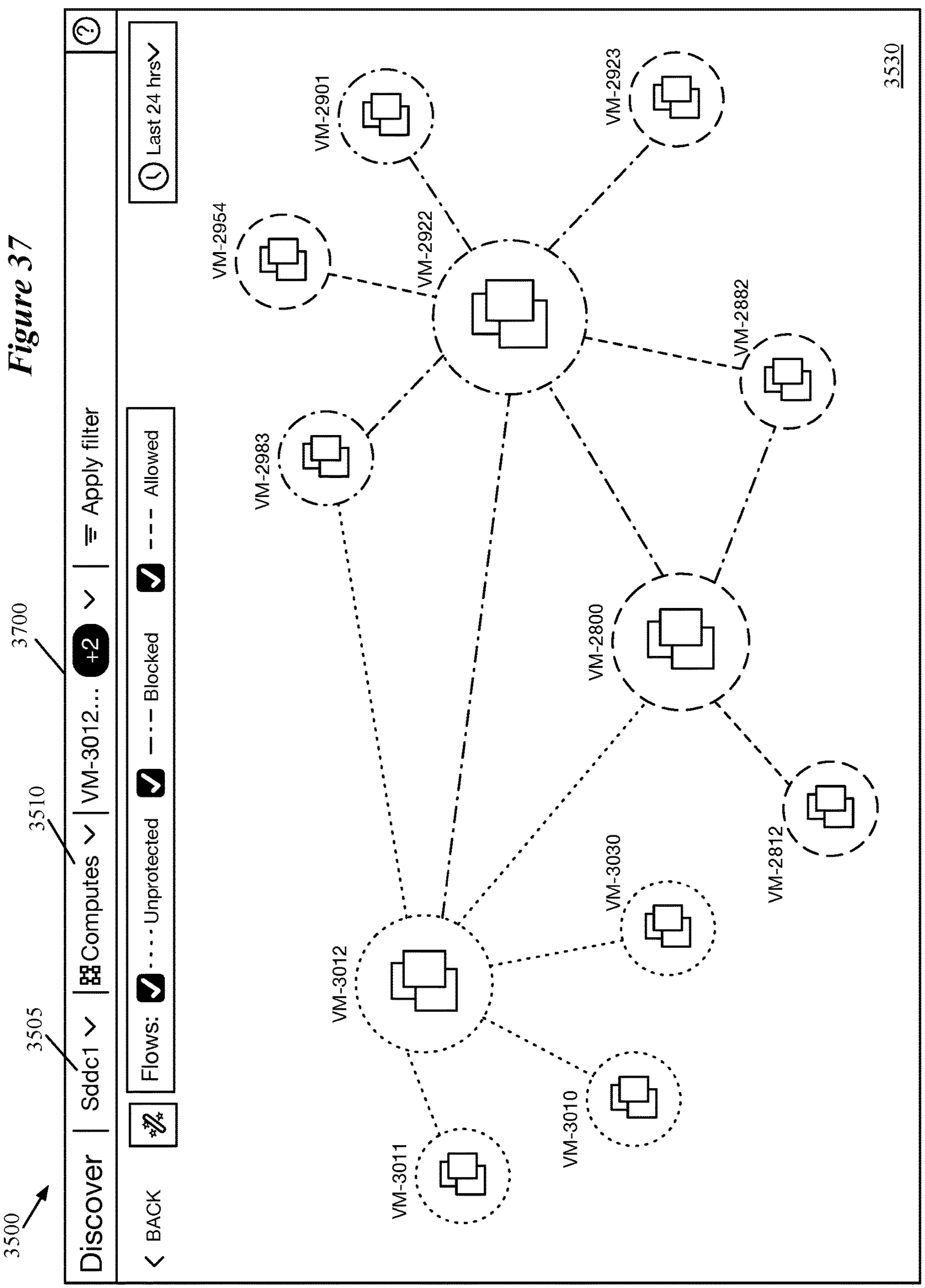
FIG. 37 illustrates the flow visualization GUI of some embodiments with the visualization type selection item specifying that the flow visualization display shows individual workload DCNs ("computes").

Whereas FIG. 35 shows the flow visualization GUI 3500 of some embodiments with only unprotected (unsegmented) flows represented between DCN groups, FIG. 37 illustrates the flow visualization GUI 3500 with the visualization type selection item 3510 specifying that the flow visualization display 3530 show individual workload DCNs ("computes") and all three flow types (blocked, allowed, and unprotected selected) within the last 24 hours. In this view, the different types of flows are represented by different line types, though it should be understood that other differentiators (e.g., different colors) may be used.

When the flow visualization display 3530 shows individual workload DCNs (rather than DCN groups), some embodiments display a DCN selection item 3700 that allows the user to focus the visualization on one or more specific workload DCNs (in this example, VM-3012, VM-2800, and VM-2922 are selected). The current flow visualization display 3530 displays all flows (unprotected, blocked, and allowed) within the last 24 hours between the selected VMs. In some cases, the number of workload DCNs shown in such a visualization may be very large. Though not shown in the state diagram 3400, some embodiments also allow the user to zoom in on the display so as to view only a few of the workload DCNs within the datacenter or to zoom out and view a larger number of the workload DCNs to get a more holistic view of the flows.

Figure 40:
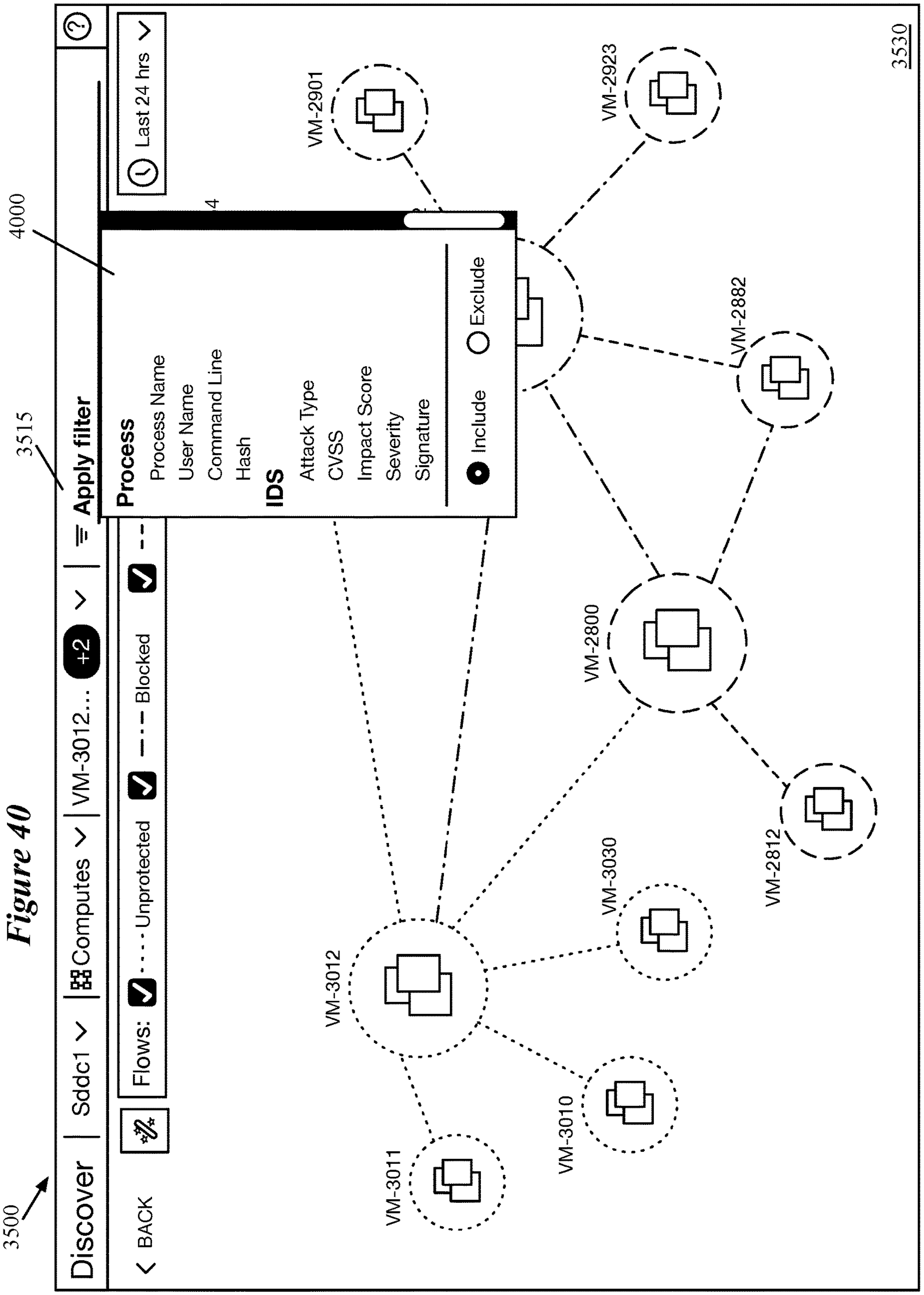
FIG. 40 illustrates the flow visualization GUI along with a filter menu displayed as a result of selecting the filter selection item.

The flow visualization GUI 3500 includes various additional features. The filter selection item 3515, the use of which is shown in FIG. 40 below, enables a user to filter which groups or workload DCNs are shown based on various filtering characteristics. An additional feature is the display of alerts on the workload DCNs, including alerts for intrusion detection (IDS) events. In some embodiments, the network monitoring service analyzes the collected flows to identify anomalies indicative of intrusion events and associates these events with specific workloads (e.g., workloads under attack by such malicious activity).

Figure 38:
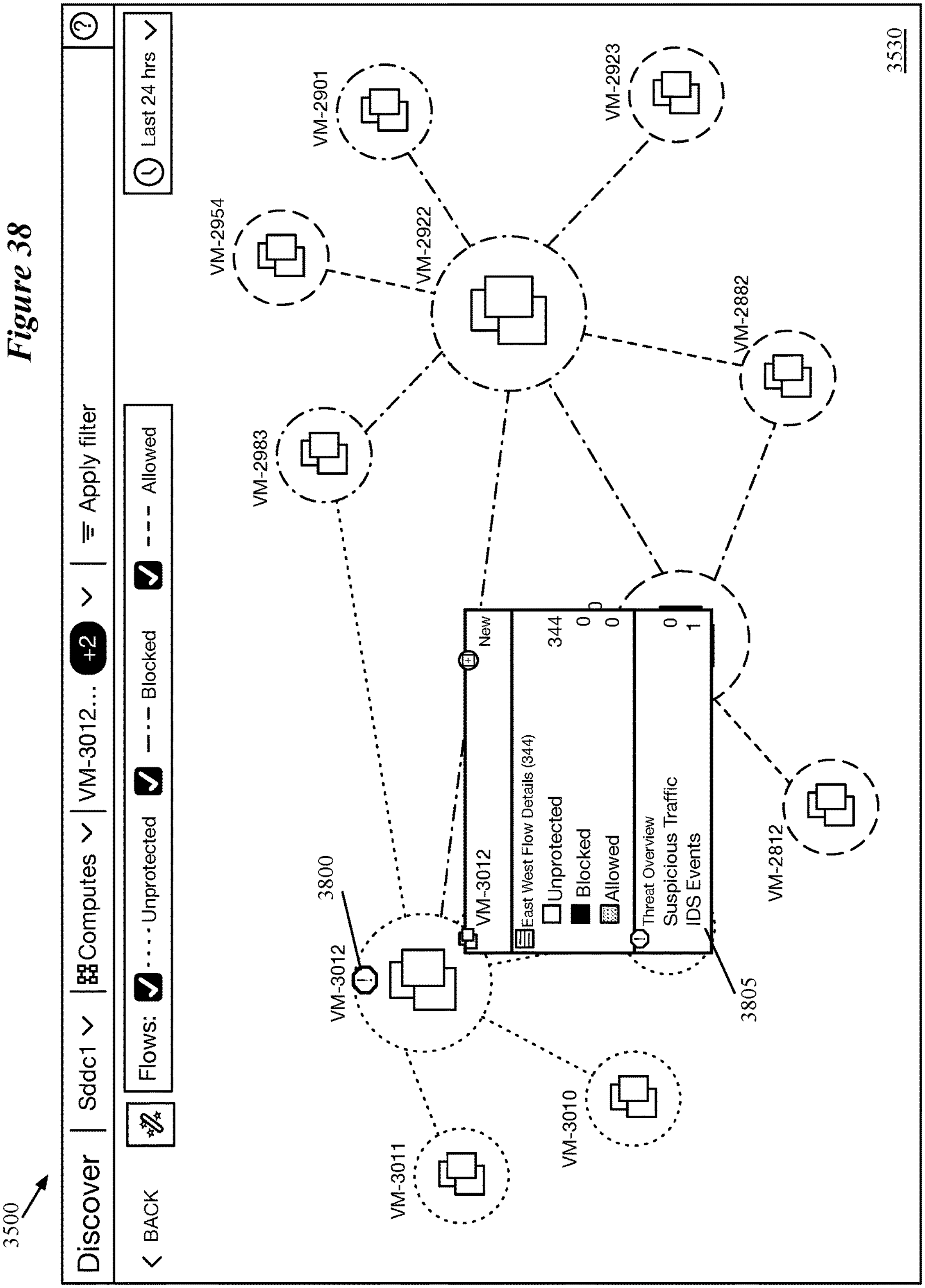
FIG. 38 illustrates the flow visualization GUI with an alert icon for a particular workload DCN displayed over the representation of this DCN in the flow visualization display.

In FIG. 38, the flow visualization GUI 3500 includes an alert icon 3800 for the workload DCN "VM-3012", which is displayed over the representation of this DCN in the flow visualization display 3530. When a user selects a DCN or group with an alert in a particular manner (e.g., by hovering a cursor over the representation of a DCN), the flow visualization GUI transitions to state 3435 to display additional information regarding these alerts in a pop-up display. When the user removes the cursor from the representation, the GUI transitions back to state 3410 (or 3405).

FIG. 38 shows the user hovering a cursor over the representation of the DCN and the GUI 3500 therefore displaying an information window 3805 for the DCN that includes information about threats to the DCN in addition to flow information. The flow information in this case indicates that the VM is the source or destination for 344 unprotected flows (and no blocked or allowed flows). In addition, the threat information indicates that there is no suspicious traffic but that there has been one IDS event detected for the DCN.

In some embodiments, a user can perform another selection operation on the DCN representation (e.g., a right-click or double-click operation) to be provided a set of selectable options, including viewing details regarding the IDS events. As shown, if a user selects to view alert details, the flow visualization GUI transitions to state 3440 to display an additional window with details regarding the alerts of the selected DCN (or security group).

Figure 39:
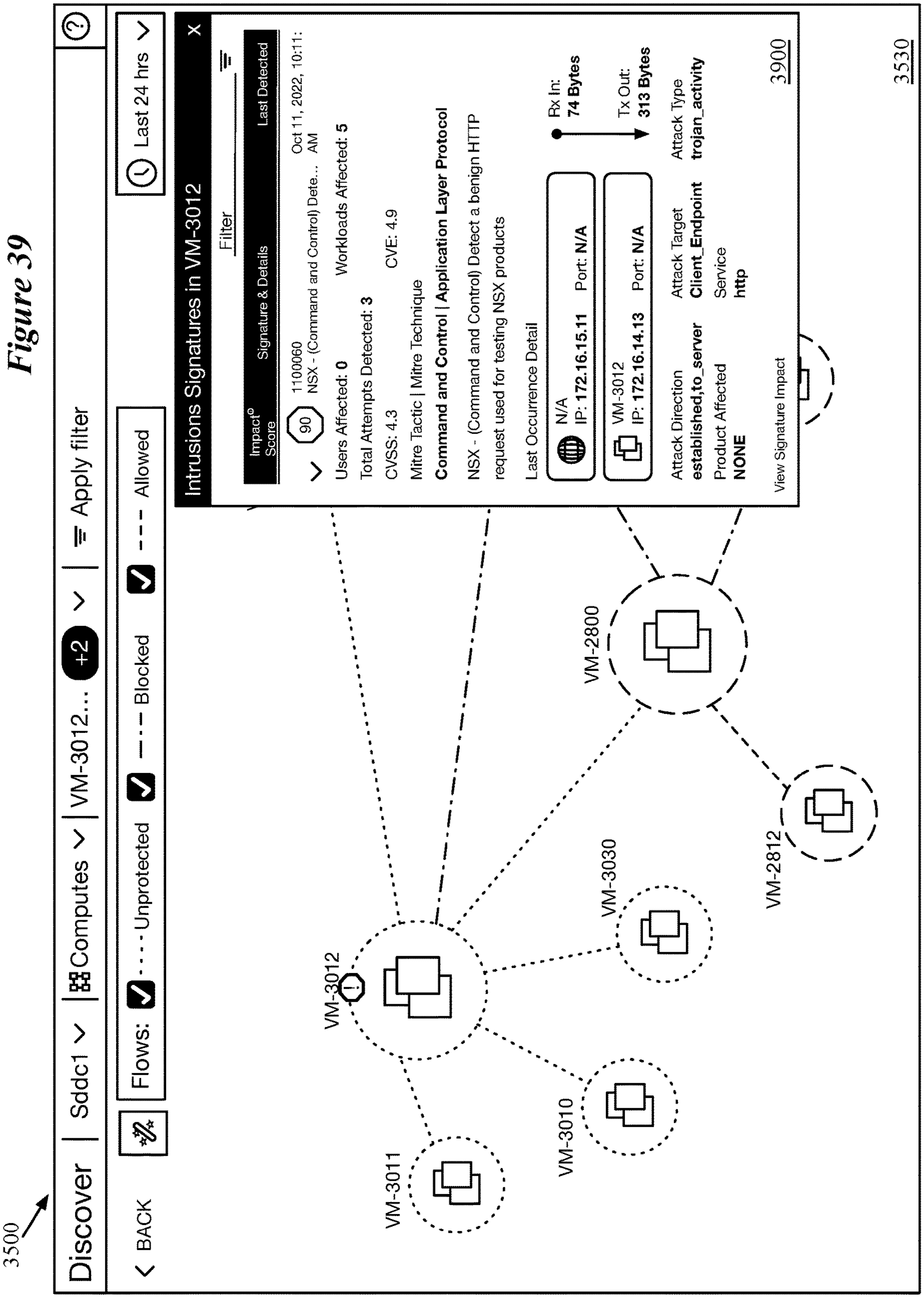
FIG. 39 illustrates the flow visualization GUI with a panel showing details for a selected intrusion event.

FIG. 39 illustrates the flow visualization GUI 3500 with a panel 3900 showing details for a selected intrusion event. This panel can be brought up via interaction with the DCN to which the intrusion event applies. In some embodiments, the panel displays a list of all of the intrusion events detected for the selected workload DCN, along with an impact score (i.e., a measure of the risk to the network and/or application due to the event), an event signature and basic information about the event, and the time the event was detected, as well as the option to display additional details for each event. As shown, these additional details the number of users and workloads affected by the event as well as the number of attempts detected and other risk measurement scores (CVSS and CVE). The additional details also provide further information about the type of attack (e.g., tactics used, how the attack was detected, etc.) and further details about the last occurrence of the attack (e.g., the direction of the attack, its target, etc.).

The filter selection item 3515, as mentioned, enables a user to filter which groups or workload DCNs are shown based on various filtering characteristics. These filtering characteristics can include basic DCN characteristics (e.g., by IP address, DCN name, host computer, operating system, etc.) or flow characteristics (e.g., source or destination IP, destination port, protocol, flow type, related application, etc.). The filtering characteristics may also include, in some embodiments, firewall rules (e.g., to only view flows and/or VMs affected by certain rules), types of suspicious traffic, specific processes, and IDS events.

FIG. 40 illustrates the flow visualization GUI 3500 along with a filter menu 4000 displayed as a result of selecting the filter selection item 3515. As shown, the filter menu provides different types of filter characteristics through which a user can scroll. In this case, the user has scrolled so that the different IDS event filters are displayed. These event filters are attack type (allowing the user to select specific attack types, so that others are excluded from being displayed as alerts), CVSS, impact score, and severity (different score measurements that provide an indication of the risk, so that the user can select IDS events within a specified range), and signature (so that only events with a selected signature are displayed as alerts). In addition, the filter menu 4000 of some embodiments includes include/exclude options. When the include option is selected, then only IDS events matching the filter characteristics are shown (and/or only DCNs matching other specified filter characteristics). On the other hand, when the exclude option is selected, then all IDS events are shown except for those matching the filter characteristics. For instance, if the user specifies a range of severity scores as a filtering characteristic, then with the include option selected only IDS events within that selected range would be shown in the GUI. On the other hand, with the exclude option selected all IDS events outside of the selected range would be shown in the GUI.

Figure 41:
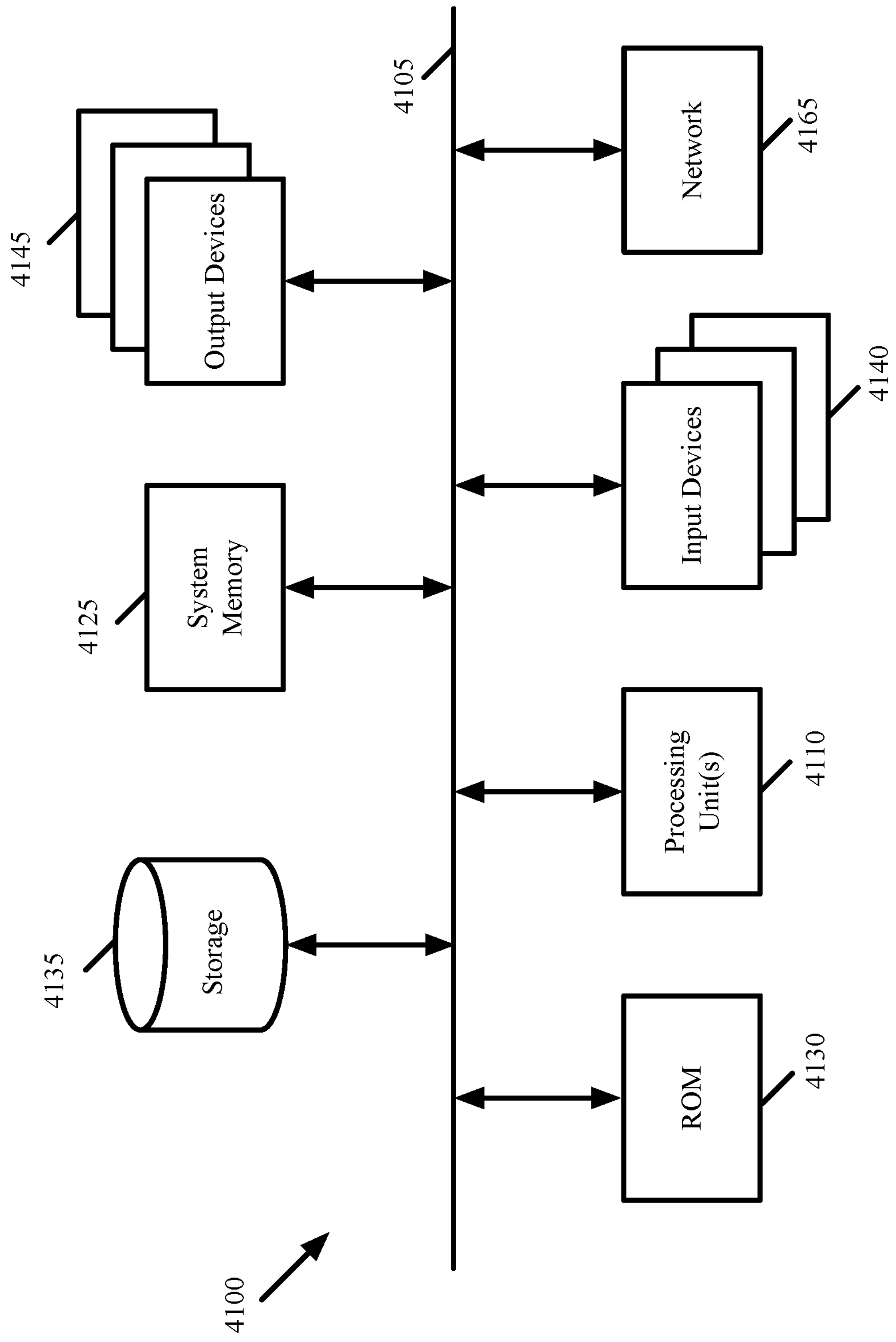
FIG. 41 conceptually illustrates an electronic system with which some embodiments of the invention are implemented.

FIG. 41 conceptually illustrates an electronic system 4100 with which some embodiments of the invention are implemented. The electronic system 4100 may be a computer (e.g., a desktop computer, personal computer, tablet computer, server computer, mainframe, a blade computer etc.), phone, PDA, or any other sort of electronic device. Such an electronic system includes various types of computer-readable media and interfaces for various other types of computer-readable media. Electronic system 4100 includes a bus 4105, processing unit(s) 4110, a system memory 4125, a read-only memory 4130, a permanent storage device 4135, input devices 4140, and output devices 4145.

The bus 4105 collectively represents all system, peripheral, and chipset buses that communicatively connect the numerous internal devices of the electronic system 4100. For instance, the bus 4105 communicatively connects the processing unit(s) 4110 with the read-only memory 4130, the system memory 4125, and the permanent storage device 4135.

From these various memory units, the processing unit(s) 4110 retrieve instructions to execute and data to process in order to execute the processes of the invention. The processing unit(s) may be a single processor or a multi-core processor in different embodiments.

The read-only-memory (ROM) 4130 stores static data and instructions that are needed by the processing unit(s) 4110 and other modules of the electronic system 4100. The permanent storage device 4135, on the other hand, is a read-and-write memory device. This device 4135 is a non-volatile memory unit that stores instructions and data even when the electronic system 4100 is off. Some embodiments of the invention use a mass-storage device (such as a magnetic or optical disk and its corresponding disk drive) as the permanent storage device 4135.

Other embodiments use a removable storage device (such as a floppy disk, flash drive, etc.) as the permanent storage device 4135. Like the permanent storage device 4135, the system memory 4125 is a read-and-write memory device. However, unlike storage device 4135, the system memory 4125 is a volatile read-and-write memory, such as random-access memory. The system memory 4125 stores some of the instructions and data that the processor needs at runtime. In some embodiments, the invention's processes are stored in the system memory 4125, the permanent storage device 4135, and/or the read-only memory 4130. From these various memory units, the processing unit(s) 4110 retrieve instructions to execute and data to process in order to execute the processes of some embodiments.

The bus 4105 also connects to the input and output devices 4140 and 4145. The input devices 4140 enable the user to communicate information and select commands to the electronic system 4100. The input devices 4140 include alphanumeric keyboards and pointing devices (also called "cursor control devices"). The output devices 4145 display images generated by the electronic system. The output devices 4145 include printers and display devices, such as cathode ray tubes (CRT) or liquid crystal displays (LCD). Some embodiments include devices such as a touchscreen that function as both input and output devices.

Finally, as shown in FIG. 41, bus 4105 also couples electronic system 4100 to a network 4165 through a network adapter (not shown). In this manner, the computer can be a part of a network of computers (such as a local area network ("LAN"), a wide area network ("WAN"), or an Intranet, or a network of networks, such as the Internet. Any or all components of electronic system 4100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, are non-VM DCNs that include a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 7, 12, 15, 17, 20, and 30) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for remotely managing a datacenter by a network management system in a public cloud through a connection agent running in the datacenter, the datacenter belonging to a datacenter group managed by the network management system, the datacenter including a local network manager that does not have a publicly routable network address, and the method comprising:

establishing a persistent remote procedure call (RPC) channel between the datacenter and a publicly routable network address of a connection server of the public cloud, wherein the RPC channel is initiated by the connection agent in the datacenter and permits the connection server of the public cloud to push data to the datacenter;

receiving, by the connection server of the public cloud from the network management system, an application programming interface (API) request for the local network manager, wherein the API request is received by the connection server in a first structured data format used by an API of the local network manager;

translating, by the connection server of the public cloud, the API request into a second structured data format used by the RPC channel;

sending, by the connection server of the public cloud to the connection agent in the datacenter via the RPC channel, the translated API request in the second structured data format, wherein the connection agent in the datacenter is configured to translate the API request into the first structured data format for execution of the API request by the local network manager;

receiving, by the connection server of the public cloud from the connection agent in the datacenter via the RPC channel, a response to the API request in the second structured data format; and translating the received response into the first structured data format and providing the translated response in the first structured data format to an initiator of the API request.

2. The method of claim 1, wherein the API request is a representational state transfer (REST) API request, the first structured data format is a JavaScript Object Notation (JSON) format, the second structured data format is a gRPC remote procedure call (gRPC) format that uses protocol buffers (protobuf) to transfer data, and the RPC channel is an http/2 connection that carries protobuf data.

3. The method of claim 1, wherein the API request is automatically initiated by a network management service of the network management system, the network management service performing management operations for the datacenter from the public cloud.

4. The method of claim 1, wherein the API request is initiated by a network administrator through a user interface of a network management service of the network management system, the network management service performing management operations for the datacenter from the public cloud.

5. The method of claim 1, further comprising:

upon the connection server of the public cloud receiving the API request from the network management system, storing a finite state machine to track a status of the API request; and updating the status of the API request in the finite state machine upon the connection server of the public cloud sending the translated API request in the second structured data format to the connection agent in the datacenter.

6. The method of claim 5, further comprising:

receiving a query for the status of the API request from the initiator of the API request; and providing a response to the query to the initiator of the API request based on the status of the API request in the finite state machine.

7. The method of claim 5, further comprising:

receiving a plurality of API requests from a plurality of different services of the network management system operating in the public cloud; and storing a respective finite state machine for each of the plurality of API requests.

8. The method of claim 7, wherein for each of the plurality of API requests, the respective finite state machine is associated with a respective request identifier, the method further comprising:

providing the respective request identifiers for the plurality of API requests to respective initiators of the plurality of API requests.

9. A non-transitory machine-readable medium storing a connection server program which, when executed by at least one processing unit, causes the at least one processing unit to perform a method for remotely managing a datacenter by a network management system in a public cloud through a connection agent running in the datacenter, the datacenter belonging to a datacenter group managed by the network management system, the datacenter including a local network manager that does not have a publicly routable network address, and the method comprising:

establishing a persistent remote procedure call (RPC) channel between the datacenter and a publicly routable network address of a connection server of the public cloud, wherein the RPC channel is initiated by the connection agent in the datacenter and permits the connection server of the public cloud to push data to the datacenter;

receiving, by the connection server of the public cloud from the network management system, an application programming interface (API) request for the local network manager, wherein the API request is received by the connection server in a first structured data format used by an API of the local network manager;

translating, by the connection server of the public cloud, the API request into a second structured data format used by the RPC channel;

sending, by the connection server of the public cloud to the connection agent in the datacenter via the RPC channel, the translated API request in the second structured data format, wherein the connection agent in the datacenter is configured to translate the API request into the first structured data format for execution of the API request by the local network manager;

receiving, by the connection server of the public cloud from the connection agent in the datacenter via the RPC channel, a response to the API request in the second structured data format; and translating the received response into the first structured data format and providing the translated response in the first structured data format to an initiator of the API request.

10. The non-transitory machine-readable medium of claim 9, wherein the API request is automatically initiated by a network management service of the network management system, the network management service performing management operations for the datacenter from the public cloud.

11. The non-transitory machine-readable medium of claim 9, wherein the API request is initiated by a network administrator through a user interface of a network management service of the network management system, the network management service performing management operations for the datacenter from the public cloud.

12. The non-transitory machine-readable medium of claim 9, wherein the method further comprises:

upon the connection server of the public cloud receiving the API request from the network management system, storing a finite state machine to track a status of the API request; and updating the status of the API request in the finite state machine upon the connection server of the public cloud sending the translated API request in the second structured data format to the connection agent in the datacenter.

13. The non-transitory machine-readable medium of claim 12, wherein the method further comprises:

receiving a query for the status of the API request from the initiator of the API request; and providing a response to the query to the initiator of the API request based on the status of the API request in the finite state machine.

14. The non-transitory machine-readable medium of claim 12, wherein the method further comprises:

receiving a plurality of API requests from a plurality of different services of the network management system operating in the public cloud; and storing a respective finite state machine for each of the plurality of API requests.

15. The non-transitory machine-readable medium of claim 14, wherein for each of the plurality of API requests, the respective finite state machine is associated with a respective request identifier, the method further comprising:

providing the respective request identifiers for the plurality of API requests to respective initiators of the plurality of API requests.

16. A computer system comprising:

a public cloud including one or more physical host computers for a network management system and a connection server; and a datacenter including one or more physical host computers for a connection agent and a local network manager, the datacenter belonging to a datacenter group managed by the network management system, and the local network manager not having a publicly routable network address, wherein the computer system is configured to perform the following steps for the network management system to remotely manage the datacenter through the connection agent in the datacenter:

establishing a persistent remote procedure call (RPC) channel between the datacenter and a publicly routable network address of the connection server of the public cloud, the RPC channel being initiated by the connection agent in the datacenter and permitting the connection server of the public cloud to push data to the datacenter;

receiving, by the connection server of the public cloud from the network management system, an application programming interface (API) request for the local network manager, the API request being received by the connection server in a first structured data format used by an API of the local network manager;

translating, by the connection server of the public cloud, the API request into a second structured data format used by the RPC channel;

sending, by the connection server of the public cloud to the connection agent in the datacenter via the RPC channel, the translated API request in the second structured data format;

translating, by the connection agent in the datacenter, the API request into the first structured data format;

executing the translated API request in the first structured data format by the local network manager;

sending, by the connection agent in the datacenter to the connection server of the public cloud via the RPC channel, a response to the API request in the second structured data format; and translating, by the connection server of the public cloud, the response into the first structured data format, and providing the translated response in the first structured data format to an initiator of the API request.

17. The computer system of claim 16, wherein the API request is automatically initiated by a network management service of the network management system, the network management service performing management operations for the datacenter from the public cloud.

18. The computer system of claim 16, wherein the API request is initiated by a network administrator through a user interface of a network management service of the network management system, the network management service performing management operations for the datacenter from the public cloud.

19. The computer system of claim 16, wherein the steps further comprise:

upon the connection server of the public cloud receiving the API request from the network management system, storing a finite state machine to track a status of the API request; and updating the status of the API request in the finite state machine upon the connection server of the public cloud sending the translated API request in the second structured data format to the connection agent in the datacenter.

20. The computer system of claim 19, wherein the steps further comprise:

receiving a query for the status of the API request from the initiator of the API request; and providing a response to the query to the initiator of the API request based on the status of the API request in the finite state machine.

21. The computer system of claim 19, wherein the steps further comprise:

receiving a plurality of API requests from a plurality of different services of the network management system operating in the public cloud; and storing a respective finite state machine for each of the plurality of API requests.

* * * * *